(12) United States Patent
Rasmus-Vorrath et al.

(10) Patent No.: US 12,124,147 B2
(45) Date of Patent: Oct. 22, 2024

(54) CONTROL METHODS AND SYSTEMS USING EXTERNAL 3D MODELING AND NEURAL NETWORKS

(71) Applicant: View, Inc., Milpitas, CA (US)

(72) Inventors: Jack Rasmus-Vorrath, Mountain House, CA (US); Jason David Zedlitz, Rancho Cordova, CA (US); Ranojoy Dutta, San Jose, CA (US); Yuyang Ying, San Jose, CA (US); Erich R. Klawuhn, Santa Barbara, CA (US); Dhairya Shrivastava, Los Altos, CA (US)

(73) Assignee: View, Inc., San Jose, CA (US)

( * ) Notice: Subject to any disclaimer, the term of this patent is extended or adjusted under 35 U.S.C. 154(b) by 575 days.

(21) Appl. No.: 17/250,586

(22) PCT Filed: Aug. 14, 2019

(86) PCT No.: PCT/US2019/046524
§ 371 (c)(1),
(2) Date: Feb. 5, 2021

(87) PCT Pub. No.: WO2020/037055
PCT Pub. Date: Feb. 20, 2020

(65) Prior Publication Data
US 2021/0294172 A1 Sep. 23, 2021

Related U.S. Application Data

(63) Continuation-in-part of application No. PCT/US2019/023268, filed on Mar. 20, 2019, which
(Continued)

(51) Int. Cl.
*G02F 1/163* (2006.01)
*G05B 19/048* (2006.01)
(Continued)

(52) U.S. Cl.
CPC .......... *G02F 1/163* (2013.01); *G05B 19/048* (2013.01); *E06B 2009/2464* (2013.01); *G02B 5/20* (2013.01)

(58) Field of Classification Search
CPC .................. G02F 1/163; G05B 19/048; E06B 2009/2464; E06B 9/24; G02B 5/20
See application file for complete search history.

(56) References Cited

U.S. PATENT DOCUMENTS 7,747,070 B2  6/2010 Puri
8,249,731 B2  8/2012 Tran et al.
(Continued)

FOREIGN PATENT DOCUMENTS

CN  103562962 A  2/2014
CN  106164973 A  11/2016
(Continued)

OTHER PUBLICATIONS

International Search Report and Written Opinion (ISA/EP) dated Jan. 31, 2020 in PCT Application No. PCT/US2019/046824.
(Continued)

*Primary Examiner* — Zhipeng Wang
(74) *Attorney, Agent, or Firm* — Weaver Austin Villeneuve & Sampson LLP; Brian D. Griedel

(57) ABSTRACT

A system for controlling tinting of one or more zones of windows in a building based on predictions of future environmental conditions.

28 Claims, 32 Drawing Sheets

Related U.S. Application Data is a continuation-in-part of application No. 16/013,770, filed on Jun. 20, 2018, now Pat. No. 10,802,372, which is a continuation of application No. 15/347,677, filed on Nov. 9, 2016, now Pat. No. 10,048,561, which is a continuation-in-part of application No. PCT/US2015/029675, filed on May 7, 2015, said application No. 15/347,677 is a continuation-in-part of application No. 13/772,969, filed on Feb. 21, 2013, now Pat. No. 9,638,978, application No. 17/250,586 is a continuation-in-part of application No. 16/438,177, filed on Jun. 11, 2019, now Pat. No. 11,405,465, which is a continuation of application No. 14/391,122, filed as application No. PCT/US2013/036456 on Apr. 12, 2013, now Pat. No. 10,365,531.

(60) Provisional application No. 62/805,841, filed on Feb. 14, 2019, provisional application No. 62/745,920, filed on Oct. 15, 2018, provisional application No. 62/764,821, filed on Aug. 15, 2018, provisional application No. 62/646,260, filed on Mar. 21, 2018, provisional application No. 62/666,572, filed on May 3, 2018, provisional application No. 61/991,375, filed on May 9, 2014, provisional application No. 61/624,175, filed on Apr. 13, 2012.

(51) Int. Cl.
*E06B 9/24* (2006.01)
*G02B 5/20* (2006.01)

(56) References Cited

U.S. PATENT DOCUMENTS

| | | | |
|---|---|---|---|
| 8,254,013 | B2 | 8/2012 | Mehtani et al. |
| 8,270,059 | B2 | 9/2012 | Friedman et al. |
| 8,300,298 | B2 | 10/2012 | Wang et al. |
| 8,432,603 | B2 | 4/2013 | Wang et al. |
| 8,582,193 | B2 | 11/2013 | Wang et al. |
| 8,705,162 | B2 | 4/2014 | Brown et al. |
| 8,764,950 | B2 | 7/2014 | Wang et al. |
| 8,764,951 | B2 | 7/2014 | Wang et al. |
| 9,224,091 | B2 | 12/2015 | Arsovski |
| 9,547,821 | B1 | 1/2017 | Loreggia et al. |
| 9,664,974 | B2 | 5/2017 | Kozlowski et al. |
| 10,289,094 | B2 | 5/2019 | Ashdown et al. |
| 10,359,681 | B2 | 7/2019 | Brown |
| 10,365,531 | B2 | 7/2019 | Shrivastava et al. |
| 10,458,863 | B2 | 10/2019 | Bernhard et al. |
| 10,495,939 | B2 | 12/2019 | Brown et al. |
| 10,533,892 | B2 | 1/2020 | Brown et al. |
| 10,539,456 | B2 | 1/2020 | Klawuhn et al. |
| 2002/0144831 | A1* | 10/2002 | Kalt ................... E06B 9/24 52/200 |
| 2005/0046584 | A1* | 3/2005 | Breed ................. G06F 3/0237 340/13.31 |
| 2006/0252348 | A1 | 11/2006 | Lin et al. |
| 2010/0152905 | A1 | 6/2010 | Kusiak |
| 2010/0243427 | A1 | 9/2010 | Kozlowski et al. |
| 2010/0245973 | A1 | 9/2010 | Wang et al. |
| 2010/0274366 | A1 | 10/2010 | Fata et al. |
| 2010/0313476 | A1* | 12/2010 | Sethuraman ........ G02B 17/006 49/31 |
| 2011/0066302 | A1* | 3/2011 | McEwan ................ E06B 9/32 700/295 |
| 2011/0266137 | A1 | 11/2011 | Wang et al. |
| 2011/0266138 | A1 | 11/2011 | Wang et al. |
| 2011/0267674 | A1 | 11/2011 | Wang et al. |
| 2011/0267675 | A1 | 11/2011 | Wang et al. |
| 2012/0033287 | A1 | 2/2012 | Friedman et al. |
| 2012/0033288 | A1* | 2/2012 | Lee ..................... G02F 1/0147 359/288 |
| 2012/0062975 | A1 | 3/2012 | Mehtani et al. |
| 2013/0011315 | A1* | 1/2013 | Ahmed .................. F24S 50/80 52/173.3 |
| 2013/0038093 | A1* | 2/2013 | Snider .................... B62D 25/06 296/219 |
| 2013/0057937 | A1* | 3/2013 | Berman ................. G05B 13/04 359/245 |
| 2013/0271812 | A1 | 10/2013 | Brown et al. |
| 2013/0271813 | A1 | 10/2013 | Brown |
| 2013/0271814 | A1 | 10/2013 | Brown |
| 2013/0271815 | A1 | 10/2013 | Brown et al. |
| 2014/0236323 | A1 | 8/2014 | Brown |
| 2015/0097944 | A1 | 4/2015 | Palm et al. |
| 2015/0116811 | A1* | 4/2015 | Shrivastava ............. H04Q 9/00 359/275 |
| 2015/0129140 | A1* | 5/2015 | Dean ...................... E06B 9/24 160/5 |
| 2015/0195644 | A1 | 7/2015 | Wilson et al. |
| 2015/0338713 | A1 | 11/2015 | Brown |
| 2016/0062332 | A1* | 3/2016 | Call ...................... F24F 11/83 236/51 |
| 2016/0203403 | A1 | 7/2016 | Nagel et al. |
| 2016/0258209 | A1* | 9/2016 | Berman ................. E06B 9/32 |
| 2016/0376831 | A1 | 12/2016 | Plummer |
| 2017/0075183 | A1 | 3/2017 | Brown |
| 2017/0122802 | A1 | 5/2017 | Brown et al. |
| 2017/0242315 | A1* | 8/2017 | Ash ...................... B60J 3/04 |
| 2017/0276542 | A1 | 9/2017 | Klawuhn et al. |
| 2017/0328121 | A1* | 11/2017 | Purdy ................... E06B 3/677 |
| 2018/0114079 | A1 | 4/2018 | Myers et al. |
| 2018/0119973 | A1 | 5/2018 | Rothman et al. |
| 2018/0141414 | A1* | 5/2018 | Lota ...................... B60Q 1/50 |
| 2018/0162203 | A1* | 6/2018 | Boehm .................. B60Q 9/00 |
| 2018/0181085 | A1 | 6/2018 | Gabriel et al. |
| 2018/0187484 | A1* | 7/2018 | Hebeisen ............... G05B 17/02 |
| 2018/0189647 | A1 | 7/2018 | Calvo et al. |
| 2018/0195752 | A1 | 7/2018 | Sasaki et al. |
| 2018/0225585 | A1 | 8/2018 | Dong et al. |
| 2018/0306609 | A1 | 10/2018 | Agarwal et al. |
| 2018/0373111 | A1 | 12/2018 | Brown |
| 2019/0025661 | A9 | 1/2019 | Brown et al. |
| 2019/0317458 | A1 | 10/2019 | Shrivastava et al. |
| 2019/0346734 | A1 | 11/2019 | Shrivastava et al. |
| 2019/0356508 | A1 | 11/2019 | Trikha et al. |
| 2020/0061975 | A1 | 2/2020 | Pradhan et al. |
| 2020/0067870 | A1 | 2/2020 | Nagel et al. |
| 2021/0084056 | A1 | 3/2021 | Abbaszadeh et al. |
| 2021/0088867 | A1 | 3/2021 | Nagel et al. |
| 2021/0173969 | A1 | 6/2021 | Abbey et al. |
| 2022/0113184 | A1* | 4/2022 | Zedlitz ................. E06B 3/6715 |
| 2023/0076947 | A1 | 3/2023 | Rasmus-Vorrath et al. |
| 2024/0013162 | A1 | 1/2024 | Rasmus-Vorrath et al. |

FOREIGN PATENT DOCUMENTS

| | | |
|---|---|---|
| CN | 107709688 A | 2/2018 |
| CN | 109275336 A | 1/2019 |
| CN | 110214293 A | 9/2019 |
| EP | 3328000 A1 | 5/2018 |
| KR | 101542684 B1 | 8/2015 |
| KR | 20160127762 A | 11/2016 |
| WO | WO2013/155467 | 10/2013 |
| WO | WO2015/171886 | 11/2015 |
| WO | WO2017/007942 A1 | 1/2017 |
| WO | WO2017/120262 A1 | 7/2017 |
| WO | WO2018/067996 | 4/2018 |
| WO | WO2018/098089 | 5/2018 |
| WO | WO2019/183232 | 9/2019 |
| WO | WO2019/183289 | 9/2019 |
| WO | WO2020/037055 | 2/2020 |
| WO | WO-2021163287 A1 | 8/2021 |

OTHER PUBLICATIONS

Caliński, T. and J. Harabasz, "A dendrite method for cluster analysis", Communications in Statistics—theory and Methods, (Jan. 1, 1974), 3(1):1-27.

(56) References Cited

OTHER PUBLICATIONS

Rousseeuw, P.J., "Silhouettes: a graphical aid to the interpretation and validation of cluster analysis", Journal of computational and applied mathematics, (Nov. 1, 1987), 20:53-65.
CN Office Action dated Jan. 12, 2023 in Application No. CN201980064161.8 with English translation.
CN Office Action dated Jun. 29, 2022 in Application No. CN201980064161.8 with English translation.
CN Office Action dated May 10, 2023, in application No. CN201980064161.8 with English translation.
European Office Action dated Mar. 3, 2023 for EP Application No. EP19759832.9.
International Preliminary Report on Patentability and written opinion dated Aug. 25, 2022 in Application PCT/2021/US17603.
International Preliminary Report on Patentability dated Feb. 25, 2021 in PCT Application No. PCT/US2019/046524.
International Search Report and Written Opinion (ISA/EP) dated Jul. 27, 2021 in PCT Application No. PCT/US2021/017603.
U.S. Appl. No. 63/106,058, inventors Rasmus-Vorrath et al., filed on Oct. 27, 2020.
U.S. Appl. No. 18/033,517, inventors Rasmus-Vorrath J.K., et al., filed on Apr. 24, 2023.
International Preliminary Report on Patentability dated May 11, 2023 in PCT Application No. PCT/US2021/056103.
International Search Report and Written Opinion dated Feb. 11, 2022 issued in Application No. PCT/US2021/056103.
EP Partial Supplementary European Search report dated Feb. 8, 2024, in EP Application No. 21754072.3.
CN Office Action dated Mar. 27, 2024 in CN Application No. 202180087451.1 with English translation.
EP Extended European Search Report dated Apr. 29, 2024 in EP Application No. 21754072.3.
U.S. Non-Final Office Action dated Feb. 29, 2024 in U.S. Appl. No. 18/033,517.
U.S. Non-Final Office Action dated Mar. 20, 2024 in U.S. Appl. No. 17/760,474.

* cited by examiner

Table 1

| Time | Zone 1 Glare | Zone 1 Reflection | Zone 1 Passive Heat |
|---|---|---|---|
| 7:30:00 AM | 0 | 0 | 1 |
| 7:40:00 AM | 0 | 0 | 1 |
| 7:50:00 AM | 0 | 0 | 1 |
| 8:00:00 AM | 0 | 0 | 1 |
| 8:10:00 AM | 0 | 0 | 1 |
| 8:20:00 AM | 0 | 1 | 1 |
| 8:30:00 AM | 0 | 1 | 1 |
| 8:40:00 AM | 0 | 1 | 1 |
| 8:50:00 AM | 0 | 1 | 1 |
| 9:00:00 AM | 0 | 1 | 1 |
| 9:10:00 AM | 1 | 1 | 0 |
| 9:20:00 AM | 1 | 1 | 0 |
| 9:30:00 AM | 1 | 1 | 0 |
| 9:40:00 AM | 1 | 1 | 0 |
| 9:50:00 AM | 1 | 1 | 0 |
| 10:00:00 AM | 1 | 1 | 0 |
| 10:10:00 AM | 1 | 1 | 0 |
| 10:20:00 AM | 1 | 1 | 0 |
| 10:30:00 AM | 1 | 1 | 0 |
| 10:40:00 AM | 1 | 1 | 0 |
| 10:50:00 AM | 1 | 1 | 0 |

Table of binary values of glare, direct reflection, and passive heat conditions for Zone 1 at time intervals during the morning. The condition values are binary values 0/1:
0 - Condition does not exist
1 - Condition does exist

FIG. 12

Table 2: For each zone, tint state used for each condition

| Zone | Glare | Reflection | Passive Heat |
|---|---|---|---|
| Zone 1 | 4 | 3 | 2 |
| Zone 2 | 4 | 3 | 2 |
| Zone 3 | 3 | 2 | 2 |
| Zone 4 | 3 | 2 | 2 |
| Zone 5 | 4 | 3 | 2 |
| Zone 6 | 4 | 3 | 2 |
| Zone 7 | 4 | 3 | 2 |
| Zone 8 | 4 | 3 | 2 |
| Zone 9 | 4 | 3 | 2 |
| Zone 10 | 4 | 3 | 2 |

Table 3: Table of Configurable Priority data for applying glare, direct reflection, and passive heat conditions to each zone of a building.

|  | Glare | Reflection | Passive heat |
|---|---|---|---|
| Zone 1 | 1 | 2 | 3 |
| Zone 2 | 1 | 2 | 3 |
| Zone 3 | 1 | 2 | 3 |
| Zone 4 | 1 | 2 | 3 |
| Zone 5 | 1 | 2 | 3 |
| Zone 6 | 1 | 2 | 3 |
| Zone 7 | 1 | 2 | 3 |
| Zone 8 | 1 | 2 | 3 |
| Zone 9 | 1 | 2 | 3 |
| Zone 10 | 1 | 2 | 3 |

FIG. 12 (Cont'd)

CONTROL METHODS AND SYSTEMS USING EXTERNAL 3D MODELING AND NEURAL NETWORKS

PRIORITY DATA

This application claims benefit of and priority to U.S. Provisional Patent Application No. 62/764,821, filed on Aug. 15, 2018 and titled "CONTROL METHODS AND SYSTEMS USING EXTERNAL 3D MODELING AND NEURAL NETWORKS," to U.S. Provisional Patent Application No. 62/745,920, filed on Oct. 15, 2018 and titled "CONTROL METHODS AND SYSTEMS USING EXTERNAL 3D MODELING AND NEURAL NETWORKS," and to U.S. Provisional Patent Application No. 62/805,841 filed on Feb. 14, 2019 and titled "CONTROL METHODS AND SYSTEMS USING EXTERNAL 3D MODELING AND NEURAL NETWORKS;" this application is also a continuation-in-part of International PCT application PCT/US19/23268, filed on Mar. 20, 2019 and titled "CONTROL METHODS AND SYSTEMS USING EXTERNAL 3D MODELING AND SCHEDULE-BASED," which claims benefit of and priority to U.S. Provisional Patent Application No. 62/646,260 filed on Mar. 21, 2018 and titled "METHODS AND SYSTEMS FOR CONTROLLING TINTABLE WINDOWS WITH CLOUD DETECTION" and U.S. Provisional Patent Application No. 62/666,572 filed on May 3, 2018 and titled "CONTROL METHODS AND SYSTEMS USING EXTERNAL 3D MODELING AND SCHEDULE-BASED COMPUTING;" International PCT application PCT/US19/23268 is a continuation-in-part of U.S. patent application Ser. No. 16/013,770, filed on Jun. 20, 2018 and titled "CONTROL METHOD FOR TINTABLE WINDOWS," which is a continuation of U.S. patent application Ser. No. 15/347,677, titled "CONTROL METHOD FOR TINTABLE WINDOWS" and filed on Nov. 9, 2016; U.S. patent application Ser. No. 15/347,677 is a continuation-in-part of International PCT application PCT/US15/29675 filed on May 7, 2015 and titled "CONTROL METHOD FOR TINTABLE WINDOWS," which claims benefit and priority to 61/991,375 filed on May 9, 2014 and titled "CONTROL METHOD FOR TINTABLE WINDOWS;" U.S. patent application Ser. No. 15/347,677 is also a continuation-in-part of U.S. patent application Ser. No. 13/772,969, filed on Feb. 21, 2013 and titled "CONTROL METHOD FOR TINTABLE WINDOWS;" this application is also a continuation-in-part of U.S. patent application Ser. No. 16/438,177, titled "APPLICATIONS FOR CONTROLLING OPTICALLY SWITCHABLE DEVICES" and filed on Jun. 11, 2019, which is a continuation of U.S. patent application Ser. No. 14/391,122, filed on Oct. 7, 2014 and titled "APPLICATIONS FOR CONTROLLING OPTICALLY SWITCHABLE DEVICES;" U.S. patent application Ser. No. 14/391,122 is a national stage application under 35 U.S.C. § 371 of International PCT Application PCT/US2013/036456, titled "APPLICATIONS FOR CONTROLLING OPTICALLY SWITCHABLE DEVICES" and filed on Apr. 12, 2013, which claims priority to and benefit of U.S. Provisional 61/624,175, titled APPLICATIONS FOR CONTROLLING OPTICALLY SWITCHABLE DEVICES" and filed on Apr. 13, 2012; each of these applications is hereby incorporated by reference in its entirety and for all purposes.

FIELD

The embodiments disclosed herein relate generally to window controllers and related control logic for implementing methods of controlling tint and other functions of tintable windows (e.g., electrochromic windows).

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

SUMMARY

In one embodiment, the present invention comprises a control system comprising: a tintable window; a window controller coupled to the tintable window; and one or more forecasting module coupled to the window controller, wherein the one or more forecasting module comprises control logic configured to process signals from at least one sensor and to provide one or more output indicative of a forecast of an environmental condition at a future time and/or a desired window tint for the tintable window at the future time, and wherein the window controller comprises control logic configured to control the tintable window based on the one or more output. In one embodiment, the one or more forecasting module comprises a neural network. In one embodiment, the neural network comprises an LSTM network. In one embodiment, the neural network comprises a DNN network. In one embodiment, the forecast of an environmental condition comprises a short term environmental condition and a relatively longer term environmental condition. In one embodiment, the one or more forecasting module is configured to implement machine learning. In one embodiment, the at least one sensor comprises a photosensor and/or an infrared sensor. In one embodiment, the environmental condition comprises a weather condition. In one embodiment, the environmental condition comprises a position of the sun. In one embodiment, the one or more output is based on a rolling mean of maximum photosensor values and/or a rolling median of minimum infrared sensor values. In one embodiment, the one or more forecasting modules are configured to calculate Barycenter Averages from a times series of the readings.

In one embodiment, the present invention comprises a control system comprising: a plurality of tintable windows; one or more window controller coupled to the plurality of tintable windows: at least one sensor configured to provide a first output representative of one or more environmental condition; and one or more neural network coupled to the one or more window controller, wherein neural network comprises control logic configured to process the first output and to provide a second output representative of a forecast of a future environmental condition, and wherein the one or more window controller comprises control logic configured to control tint states of the plurality of tintable windows based on the second output. In one embodiment, the future environmental condition comprises a weather condition. In one embodiment, the neural network comprises a supervised neural network. In one embodiment, the neural network comprises an LSTM neural network and a DNN neural network. In one embodiment, the at least one sensor comprises at least one photosensor and at least one infrared sensor, and wherein the first output comprises a rolling mean of maximum photosensor readings and a rolling median of minimum infrared sensor readings. In one embodiment, the second output is based on a majority agreement between the LSTM neural network and the DNN neural network.

In one embodiment, the present invention comprises a method of controlling at least one tintable window comprising steps of: using one or more sensor to provide an output representative of a recent environmental condition; coupling the output to control logic; using the control logic to forecast a future environmental condition; and using the control logic to control a tint of the at least one tintable window based on the forecast of the future environmental condition. In one embodiment, the one or more sensor comprises one or more photosensor and one or more infrared sensor. In one embodiment, the control logic comprises at least one of an LSTM and a DNN neural network. In one embodiment the output comprises a rolling mean of maximum photosensor readings and a rolling median of minimum infrared sensor readings.

In one embodiment, the present invention comprises a method of controlling a tintable window using site specific and seasonally differentiated weather data, comprising: at the site, obtaining environmental readings from at least one sensor over a period N days; storing the readings on a computer readable medium; on a day that is the most recent of the N days, or on a day that is subsequent to the day that is most recent of the N days, processing the readings with control logic configured to provide a first output representative of a distribution of a likely future range of environmental readings from the at least one sensor; and controlling a tint of the tintable window based at least in part on the first output. In one embodiment, the control logic comprises an unsupervised classifier. In one embodiment, the invention further comprises: using the control logic to forecast an environmental condition at the site on the day that is the most recent of the N days, or on the day that is subsequent to the day that is most recent of the N days. In one embodiment, the control logic comprises a neural network. In one embodiment, the control logic comprises one or more forecasting module configured to process signals from the at least one sensor and to provide a second output indicative of a desired window tint for the tintable window at a future time, and wherein the method further comprises controlling the tint of the tintable window based at least in part on the second output. In one embodiment, the one or more forecasting module comprises a neural network. In one embodiment, the neural network comprises an LSTM network. In one embodiment, the neural network comprises a DNN network. In one embodiment, the second output is based on a majority agreement between an LSTM neural network and a DNN neural network.

In one embodiment, the present invention comprises a building control system, comprising: at least one sensor configured to take environmental readings; storage for storing the environmental readings; and control logic configured to process the environmental readings and to provide a first output representative of a likely future range of environmental readings from the at least one sensor, wherein the first output is used at least in part to control a system of the building. In one embodiment, the system comprises at least one tintable window and at least one tintable window controller. In one embodiment, the control logic comprises one or more neural network configured to process recent environmental readings and to provide a second output representative of a forecast of a future environmental condition at a future time. In one embodiment, at least one window controller is configured to control a tint state of the at least one tintable window based at least in part on the first or second output. In one embodiment, the at least one sensor is located on a roof or a wall of the building. In one embodiment, the stored environmental readings comprise readings taken over multiple days and where the recent environmental readings comprise readings taken on the same day. In one embodiment, the readings taken on the same day comprise readings taken over a window of time that is on the order of minutes. In one embodiment, the window of time is 5 minutes. In one embodiment, the second output is comprised of at least one rule indicative of a desired window tint for the at least one tintable window at the future time, and, using the at least one tintable window controller to control the at least one tintable window to achieve the desired window tint at the future time. In one embodiment, the second output is based on a majority agreement between an LSTM neural network and a DNN neural network. In one embodiment, the control logic comprises an unsupervised classifier.

One aspect pertains to a control system comprising a tintable window, a window controller in communication with the tintable window, and another controller or a server in communication with the window controller, and comprising one or more forecasting modules, wherein the one or more forecasting modules comprises control logic configured to use readings from at least one sensor to determine one or more output including a forecast of an environmental condition at a future time and/or a tint level for the tintable window at the future time, and wherein the window controller is configured to transition the tintable window based on the one or more output. In one example, the one or more forecasting modules comprises a neural network (e.g., a dense neural network or a long short-term memory (LSTM) network).

One aspect pertains to a control system a plurality of tintable windows, one or more window controllers configured to control the plurality of tintable windows, at least one sensor configured to provide a first output, and one or more processors including at least one neural network, and in communication with the one or more window controllers, wherein the at least one neural network is configured to process the first output and to provide a second output including a forecast of a future environmental condition, and wherein the one or more window controllers are configured to control tint states of the plurality of tintable windows based on the second output.

One aspect pertains to a method of controlling at least one tintable window. The method comprises steps of: receiving output from one or more sensors, using control logic to forecast a future environmental condition, and determining a control a tint of the at least one tintable window based on the forecast of the future environmental condition.

One aspect pertains to a method of controlling a tintable window using site specific and seasonally differentiated weather data, the method comprising: receiving environmental readings from at least one sensor at the site over a period N days, storing the readings on a computer readable medium on a day that is the most recent of the N days, or on a day that is subsequent to the day that is most recent of the N days, processing the readings with control logic to determine a first output representative of a distribution of a likely future range of environmental readings from the at least one sensor, and sending tint instructions to transition the tintable window to a tint level determined at least in part on the first output.

One aspect pertains to a building control system comprising at least one sensor configured to take environmental readings, a memory for storing the environmental readings, and control logic stored on the memory, and configured to process the environmental readings to determine a first output representative of a likely future range of environmental readings from the at least one sensor, wherein the first output is used at least in part to control a system of the building.

One aspect pertains to a control system for controlling tintable windows at a building. The control system comprises one or more window controllers and a server or another controller configured to receive historical sensor readings associated with a current or past weather condition, the server or other controller having control logic with at least one neural network configured to forecast a future weather condition based on the historical sensor readings and determine the tint schedule instructions based on the future environmental condition. The one or more window controllers are configured to control tint level of the one or more tintable windows of a building based on one of tint schedule instructions received from the server or other controller and tint schedule instructions received from a geometric model and a clear sky model.

One aspect pertains to a method of determining tint states for one or more tintable windows. The method comprises: (a) determining a current or future external condition that affects choices of tint states of the one or more tintable windows, (b) selecting from a suite of models a first model determined to perform better than other models from the suite of models under the current or future external conditions, wherein the models of the suite of models are machine learning models trained to determine the tint states, or information used to determine the tint states, of the one or more tintable windows under multiple sets of external conditions and (c) executing the first model and using outputs of the first model to determine current or future tint states for the one or more tintable windows.

One aspect pertains to a system configured to determine tint states for one or more tintable windows. The system comprising a processor and memory configured to: (a) determine a current or future external condition that affects choices of tint states of the one or more tintable windows (b) select from a suite of models a first model determined to perform better than other models from the suite of models under the current or future external conditions, wherein the models of the suite of models are machine learning models trained to determine the tint states, or information used to determine the tint states, of the one or more tintable windows under multiple sets of external conditions, and (c) execute the first model and using outputs of the first model to determine current or future tint states for the one or more tintable windows.

One aspect pertains to a method of generating a computational system for determining tint states for one or more tintable windows. The comprises (a) clustering or classifying different types of external conditions based on historical radiation profiles or patterns and (b) training a machine learning model for each of the different types of external conditions, wherein the machine learning models are trained to determine the tint states, or information used to determine the tint states, of the one or more tintable windows under multiple sets of external conditions.

One aspect pertains to a method of identifying a subset of feature inputs for a machine learning model configured to determine tint states, or information used to determine the tint states, of one or more tintable windows under multiple sets of external conditions. The method comprises (a) performing a feature elimination procedure on a set of available feature inputs for the machine learning model to thereby remove one or more of the available feature inputs and produce a subset of feature inputs and (b) initializing the machine learning model with the subset of feature inputs.

One aspect pertains to a system configured to identify a subset of feature inputs for a machine learning model configured to determine tint states, or information used to determine the tint states, of one or more tintable windows under multiple sets of external conditions. The system comprises a processor and memory configured to (a) perform a feature elimination procedure on a set of available feature inputs for the machine learning model to thereby remove one or more of the available feature inputs and produce a subset of feature inputs and (b) initialize the machine learning model with the subset of feature inputs.

These and other features and embodiments will be described in more detail below with reference to the drawings.

DETAILED DESCRIPTION

In the following description, numerous specific details are set forth in order to provide a thorough understanding of the presented embodiments. The disclosed embodiments may be practiced without some or these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments. It should be understood that while disclosed embodiments focus on electrochromic windows (also referred to as smart windows), the aspects disclosed herein may apply to other types of tintable windows. For example, a tintable window incorporating a liquid crystal device or a suspended particle device, instead of an electrochromic device could be incorporated in any of the disclosed embodiments.

1. Overview of Electrochromic Devices and Window Controllers

In order to orient the reader to the embodiments of systems and methods disclosed herein, a brief discussion of electrochromic devices and window controllers is provided. This initial discussion is provided for context only, and the subsequently described embodiments of systems, window controllers, and methods are not limited to the specific features and fabrication processes of this initial discussion.

A. Electrochromic Devices

Figure 1A:
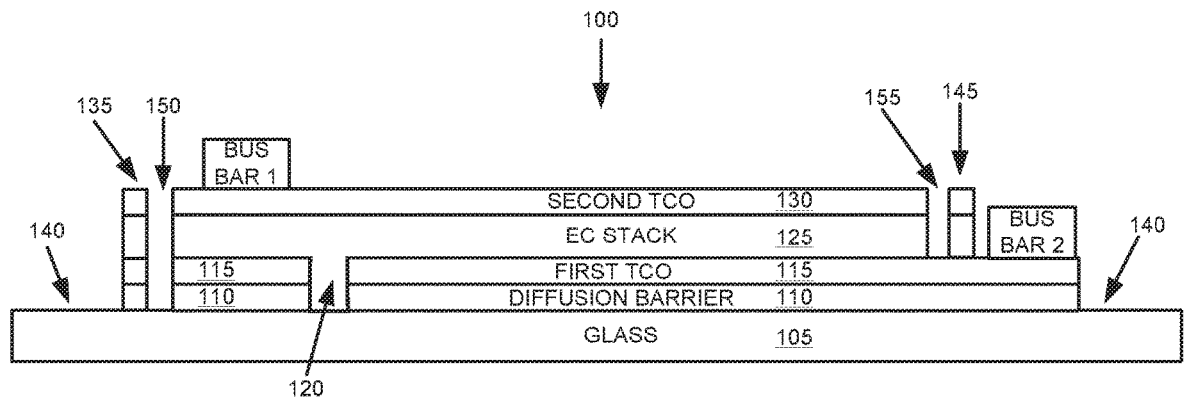
FIGS. 1A-1C show schematic diagrams of electrochromic devices formed on glass substrates, i.e., electrochromic lites.
Figure 1B:
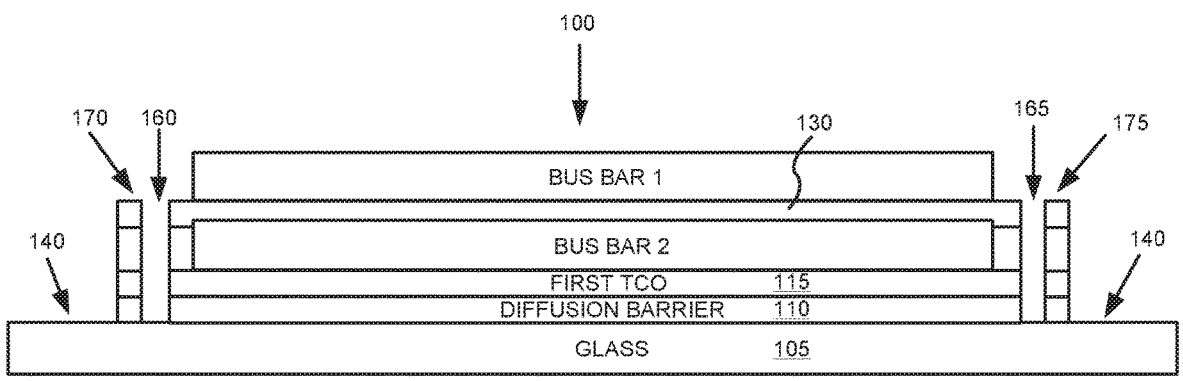
Figure 1C:
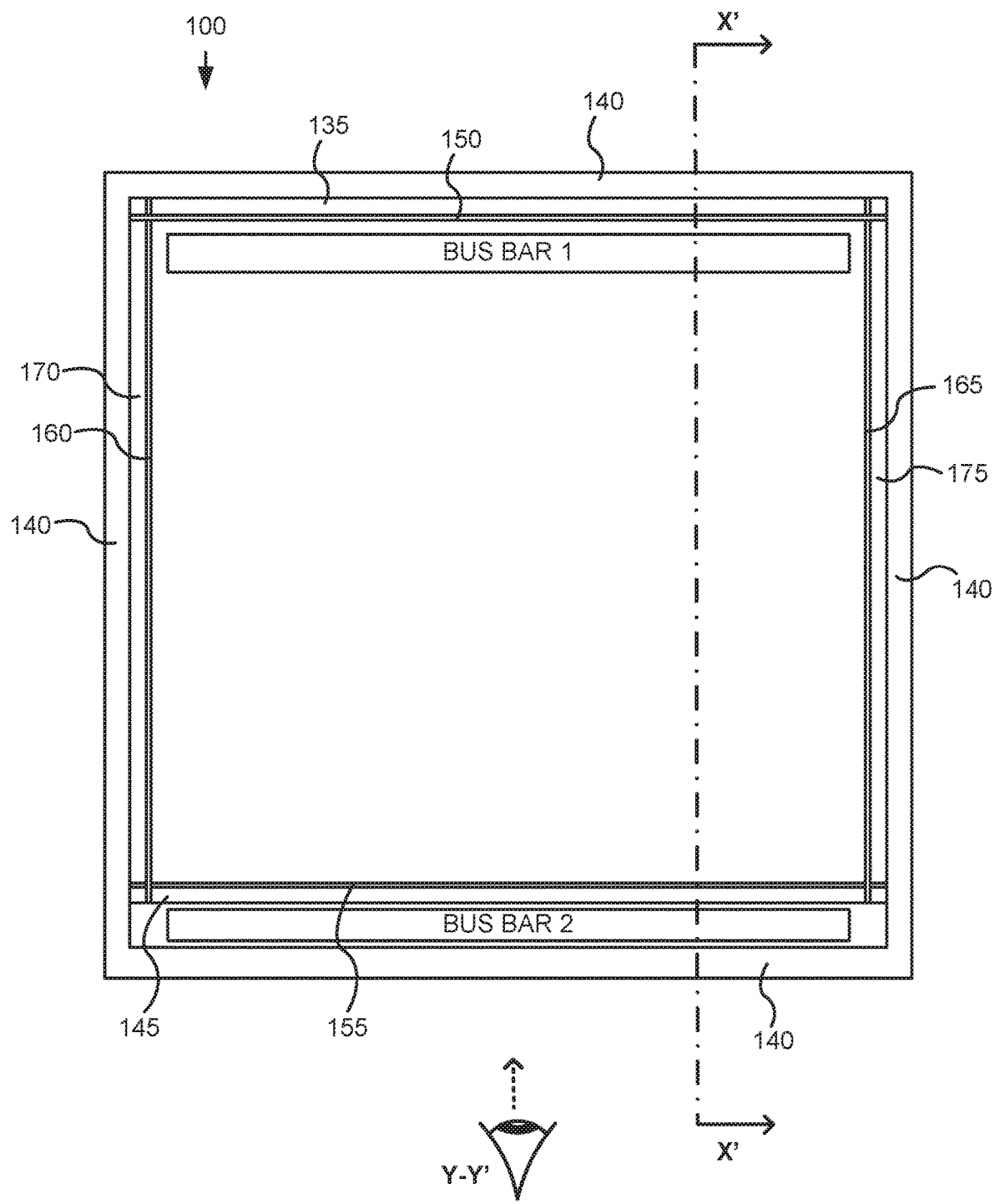

A particular example of an electrochromic lite is described with reference to FIGS. 1A-1C, in order to illustrate embodiments described herein. FIG. 1A is a cross-sectional representation (see section cut X'-X' of FIG. 1C) of an electrochromic lite 100, which is fabricated starting with a glass sheet 105. FIG. 1B shows an end view (see viewing perspective Y-Y' of FIG. 1C) of electrochromic lite 100, and FIG. 1C shows a top-down view of electrochromic lite 100. FIG. 1A shows the electrochromic lite after fabrication on glass sheet 105, edge deleted to produce area 140, around the perimeter of the lite. The electrochromic lite has also been laser scribed and bus bars have been attached. The glass lite 105 has a diffusion barrier 110, and a first transparent conducting oxide layer (TCO) 115, on the diffusion barrier. In this example, the edge deletion process removes both TCO 115 and diffusion barrier 110, but in other embodiments only the TCO is removed, leaving the diffusion barrier intact. The TCO 115 is the first of two conductive layers used to form the electrodes of the electrochromic device fabricated on the glass sheet. In this example, the glass sheet includes underlying glass and the diffusion barrier layer.

Thus, in this example, the diffusion barrier is formed, and then the first TCO, an electrochromic stack 125, (e.g., having electrochromic, ion conductor, and counter electrode layers), and a second TCO 130, are formed. In one embodiment, the electrochromic device (electrochromic stack and second TCO) is fabricated in an integrated deposition system where the glass sheet does not leave the integrated deposition system at any time during fabrication of the stack. In one embodiment, the first TCO layer is also formed using the integrated deposition system where the glass sheet does not leave the integrated deposition system during deposition of the electrochromic stack and the (second) TCO layer. In one embodiment, all the layers (diffusion barrier, first TCO, electrochromic stack, and second TCO) are deposited in the integrated deposition system where the glass sheet does not leave the integrated deposition system during deposition. In this example, prior to deposition of electrochromic stack 125, an isolation trench 120, is cut through TCO 115 and diffusion barrier 110. Trench 120 is made in contemplation of electrically isolating an area of TCO 115 that will reside under bus bar 1 after fabrication is complete (see FIG. 1A). This is done to avoid charge buildup and coloration of the electrochromic device under the bus bar, which can be undesirable.

After formation of the electrochromic device, edge deletion processes and additional laser scribing are performed. FIG. 1A depicts areas 140 where the device has been removed, in this example, from a perimeter region surrounding laser scribe trenches 150, 155, 160, and 165. Trenches 150, 160 and 165 pass through the electrochromic stack and also through the first TCO and diffusion barrier. Trench 155 passes through second TCO 130 and the electrochromic stack, but not the first TCO 115. Laser scribe trenches 150, 155, 160, and 165 are made to isolate portions of the electrochromic device, 135, 145, 170, and 175, which were potentially damaged during edge deletion processes from the operable electrochromic device. In this example, laser scribe trenches 150, 160, and 165 pass through the first TCO to aid in isolation of the device (laser scribe trench 155 does not pass through the first TCO, otherwise it would cut off bus bar 2's electrical communication with the first TCO and thus the electrochromic stack). The laser or lasers used for the laser scribe processes are typically, but not necessarily, pulse-type lasers, for example, diode-pumped solid-state lasers. For example, the laser scribe processes can be performed using a suitable laser from IPG Photonics (of Oxford, Massachusetts), or from Ekspla (of Vilnius, Lithuania). Scribing can also be performed mechanically, for example, by a diamond tipped scribe. One of ordinary skill in the art would appreciate that the laser scribing processes can be performed at different depths and/or performed in a single process whereby the laser cutting depth is varied, or not, during a continuous path around the perimeter of the electrochromic device. In one embodiment, the edge deletion is performed to the depth of the first TCO.

After laser scribing is complete, bus bars are attached. Non-penetrating bus bar 1 is applied to the second TCO. Non-penetrating bus bar 2 is applied to an area where the device was not deposited (e.g., from a mask protecting the first TCO from device deposition), in contact with the first TCO or, in this example, where an edge deletion process (e.g., laser ablation using an apparatus having a XY or XYZ galvanometer) was used to remove material down to the first TCO. In this example, both bus bar 1 and bus bar 2 are non-penetrating bus bars. A penetrating bus bar is one that is typically pressed into and through the electrochromic stack to make contact with the TCO at the bottom of the stack. A non-penetrating bus bar is one that does not penetrate into the electrochromic stack layers, but rather makes electrical and physical contact on the surface of a conductive layer, for example, a TCO.

The TCO layers can be electrically connected using a non-traditional bus bar, for example, a bus bar fabricated with screen and lithography patterning methods. In one embodiment, electrical communication is established with the device's transparent conducting layers via silk screening (or using another patterning method) a conductive ink followed by heat curing or sintering the ink. Advantages to using the above described device configuration include simpler manufacturing, for example, and less laser scribing than conventional techniques which use penetrating bus bars.

After the bus bars are connected, the device is integrated into an insulated glass unit (IGU), which includes, for example, wiring the bus bars and the like. In some embodiments, one or both of the bus bars are inside the finished IGU, however in one embodiment one bus bar is outside the seal of the IGU and one bus bar is inside the IGU. In the former embodiment, area 140 is used to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer.

As described above, after the bus bars are connected, the electrochromic lite is integrated into an IGU, which includes, for example, wiring for the bus bars and the like. In the embodiments described herein, both of the bus bars are inside the primary seal of the finished IGU.

Figure 2A:
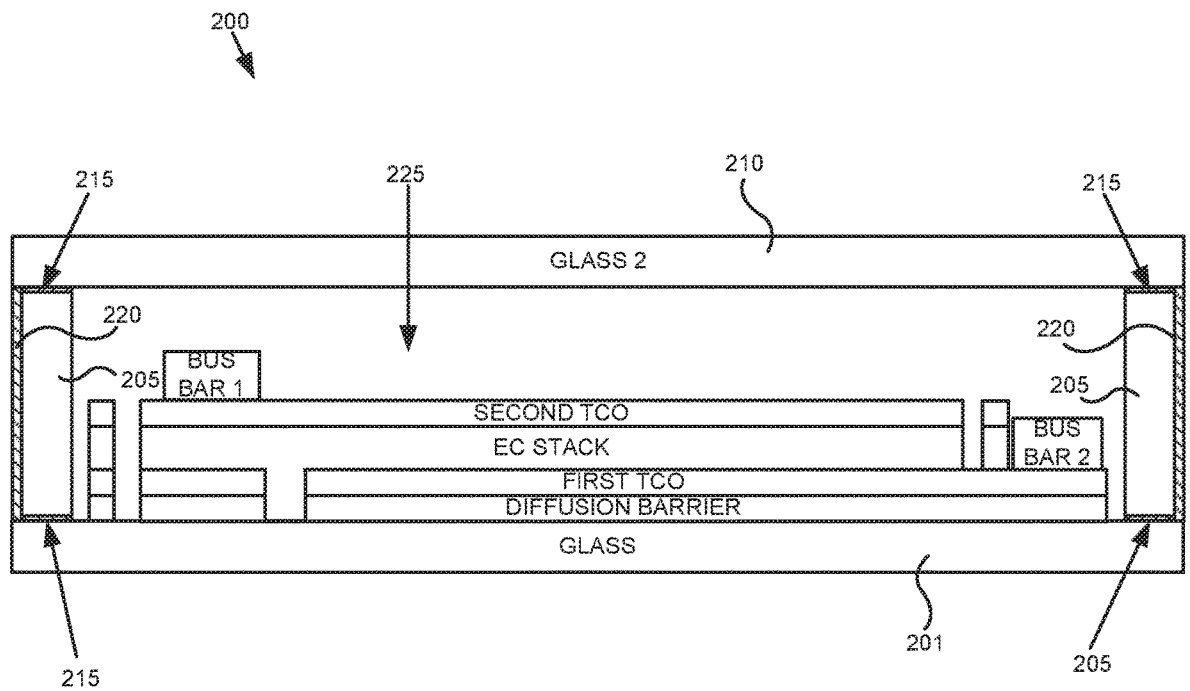
FIGS. 2A and 2B show cross-sectional schematic diagrams of the electrochromic lites as described in relation to FIGS. 1A-1C integrated into an insulated glass unit.
Figure 2B:
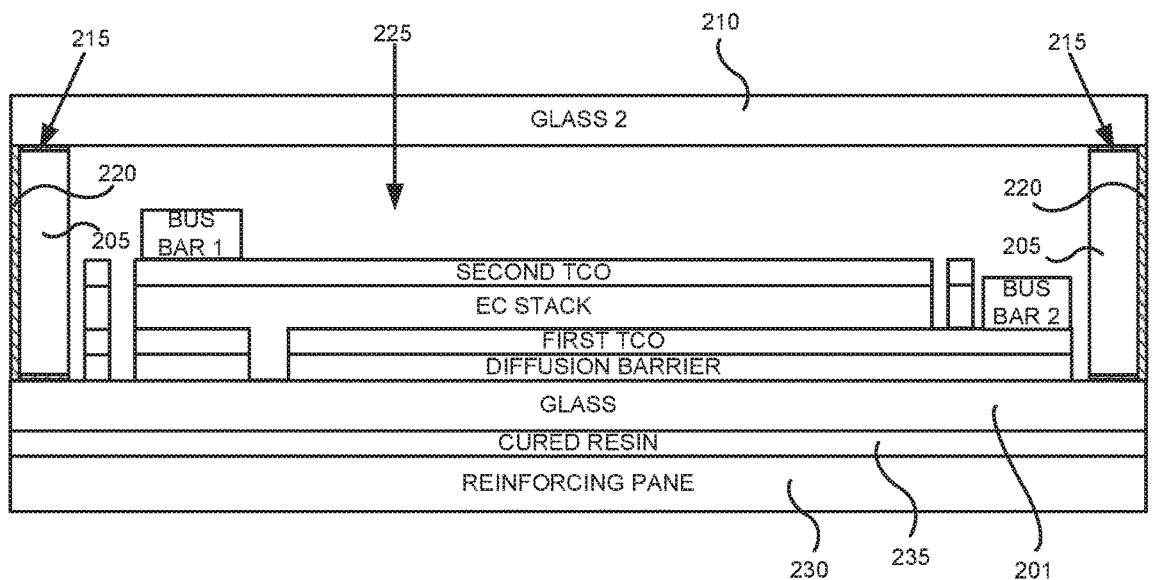

FIG. 2A shows a cross-sectional schematic diagram of the electrochromic window as described in relation to FIGS. 1A-1C integrated into an IGU 200. A spacer 205 is used to separate the electrochromic lite from a second lite 210. Second lite 210 in IGU 200 is a non-electrochromic lite, however, the embodiments disclosed herein are not so limited. For example, lite 210 can have an electrochromic device thereon and/or one or more coatings such as low-E coatings and the like. Lite 201 can also be laminated glass, such as depicted in FIG. 2B (lite 201 is laminated to reinforcing pane 230, via resin 235). Between spacer 205 and the first TCO layer of the electrochromic lite is a primary seal material 215. This primary seal material is also between spacer 205 and second glass lite 210. Around the perimeter of spacer 205 is a secondary seal 220. Bus bar wiring/leads traverse the seals for connection to a controller. Secondary seal 220 may be much thicker that depicted. These seals aid in keeping moisture out of an interior space 225, of the IGU. They also serve to prevent argon or other gas in the interior of the IGU from escaping.

Figure 3A:
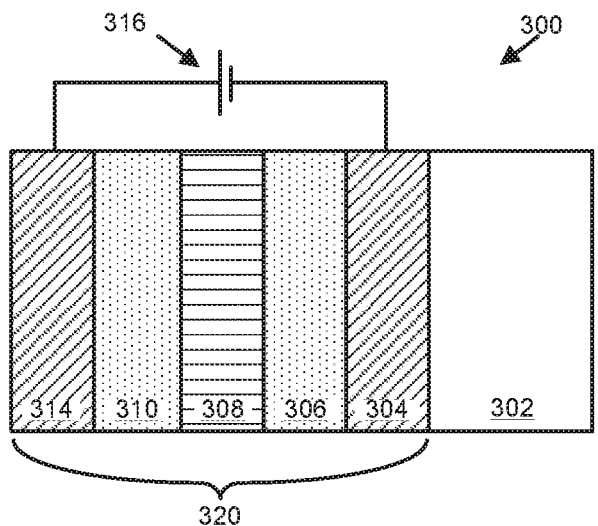
FIG. 3A depicts a schematic cross-section of an electrochromic device.

FIG. 3A schematically depicts an electrochromic device 300, in cross-section. Electrochromic device 300 includes a substrate 302, a first conductive layer (CL) 304, an electrochromic layer (EC) 306, an ion conducting layer (IC) 308, a counter electrode layer (CE) 310, and a second conductive layer (CL) 314. Layers 304, 306, 308, 310, and 314 are collectively referred to as an electrochromic stack 320. A voltage source 316 operable to apply an electric potential across electrochromic stack 320 effects the transition of the electrochromic device from, for example, a bleached state to a colored state (depicted). The order of layers can be reversed with respect to the substrate.

Electrochromic devices having distinct layers as described can be fabricated as all solid-state devices and/or all inorganic devices. Such devices and methods of fabricating them are described in more detail in U.S. patent application Ser. No. 12/645,111, entitled "Fabrication of Low-Defectivity Electrochromic Devices," filed on Dec. 22, 2009, and naming Mark Kozlowski et al. as inventors, and in U.S. patent application Ser. No. 12/645,159, entitled, "Electrochromic Devices," filed on Dec. 22, 2009 and naming Zhongchun Wang et al. as inventors, both of which are hereby incorporated by reference in their entireties. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

Additionally, it should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 320 such that available ions in the stack reside primarily in the counter electrode 310. When the potential on the electrochromic stack is reversed, the ions are transported across the ion conducting layer 308 to the electrochromic material 306 and cause the material to transition to the colored state. In a similar way, the electrochromic device of embodiments described herein can be reversibly cycled between different tint levels (e.g., bleached state, darkest colored state, and intermediate levels between the bleached state and the darkest colored state).

Referring again to FIG. 3A, voltage source 316 may be configured to operate in conjunction with radiant and other environmental sensors. As described herein, voltage source 316 interfaces with a device controller (not shown in this figure). Additionally, voltage source 316 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 302. Such substrates include, for example, glass, plastic, and mirror materials. Suitable glasses include either clear or tinted soda lime glass, including soda lime float glass. The glass may be tempered or untempered.

In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, for example, as large as about 80 inches by 120 inches. Architectural glass is typically at least about 2 mm thick, typically between about 3 mm and about 6 mm thick. Of course, electrochromic devices are scalable to substrates smaller or larger than architectural glass. Further, the electrochromic device may be provided on a mirror of any size and shape.

On top of substrate 302 is conductive layer 304. In certain embodiments, one or both of the conductive layers 304 and 314 is inorganic and/or solid. Conductive layers 304 and 314 may be made from a number of different materials, including conductive oxides, thin metallic coatings, conductive metal nitrides, and composite conductors. Typically, conductive layers 304 and 314 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used, as well as combinations of TCO's and metallic coatings.

The function of the conductive layers is to spread an electric potential provided by voltage source 316 over surfaces of the electrochromic stack 320 to interior regions of the stack, with relatively little ohmic potential drop. The electric potential is transferred to the conductive layers though electrical connections to the conductive layers. In some embodiments, bus bars, one in contact with conductive layer 304 and one in contact with conductive layer 314, provide the electric connection between the voltage source 316 and the conductive layers 304 and 314. The conductive layers 304 and 314 may also be connected to the voltage source 316 with other conventional means.

Overlaying conductive layer 304 is electrochromic layer 306. In some embodiments, electrochromic layer 306 is inorganic and/or solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, electrochromic layer 306 transfers ions to and receives ions from counter electrode layer 310 to cause optical transitions.

Generally, the colorization (or change in any optical property—e.g., absorbance, reflectance, and transmittance) of the electrochromic material is caused by reversible ion insertion into the material (e.g., intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions (Li+) and hydrogen ions (H+) (that is, protons). In some cases, however, other ions will be suitable. In various embodiments, lithium ions are used to produce the electrochromic phenomena. Intercalation of lithium ions into tungsten oxide ($WO_{3-y}$ (0<y<~0.3)) causes the tungsten oxide to change from transparent (bleached state) to blue (colored state).

Referring again to FIG. 3A, in electrochromic stack 320, ion conducting layer 308 is sandwiched between electrochromic layer 306 and counter electrode layer 310. In some embodiments, counter electrode layer 310 is inorganic and/or solid. The counter electrode layer may include one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue.

When charge is removed from a counter electrode 310 made of nickel tungsten oxide (that is, ions are transported from counter electrode 310 to electrochromic layer 306), the counter electrode layer will transition from a transparent state to a colored state.

In the depicted electrochromic device, between electrochromic layer 306 and counter electrode layer 310, there is the ion conducting layer 308. Ion conducting layer 308 serves as a medium through which ions are transported (in the manner of an electrolyte) when the electrochromic device transitions between the bleached state and the colored state. Preferably, ion conducting layer 308 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 308 is inorganic and/or solid.

Examples of suitable ion conducting layers (for electrochromic devices having a distinct IC layer) include silicates, silicon oxides, tungsten oxides, tantalum oxides, niobium oxides, and borates. These materials may be doped with different dopants, including lithium. Lithium doped silicon oxides include lithium silicon-aluminum-oxide. In some embodiments, the ion conducting layer includes a silicate-based structure. In some embodiments, a silicon-aluminum-oxide (SiAlO) is used for the ion conducting layer 308.

Electrochromic device 300 may include one or more additional layers (not shown), such as one or more passive layers. Passive layers used to improve certain optical properties may be included in electrochromic device 300. Passive layers for providing moisture or scratch resistance may also be included in electrochromic device 300. For example, the conductive layers may be treated with anti-reflective or protective oxide or nitride layers. Other passive layers may serve to hermetically seal electrochromic device 300.

Figure 3B:
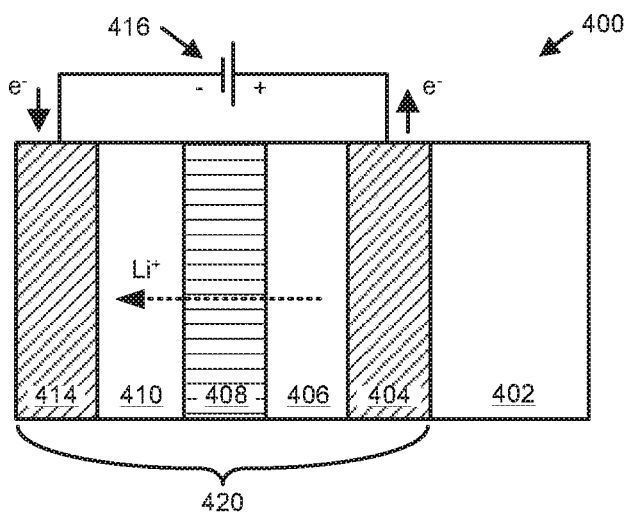
FIG. 3B depicts a schematic cross-section of an electrochromic device in a bleached state (or transitioning to a bleached state).

FIG. 3B is a schematic cross-section of an electrochromic device in a bleached state (or transitioning to a bleached state). In accordance with specific embodiments, an electrochromic device 400 includes a tungsten oxide electrochromic layer (EC) 406 and a nickel-tungsten oxide counter electrode layer (CE) 410. Electrochromic device 400 also includes a substrate 402, a conductive layer (CL) 404, an ion conducting layer (IC) 408, and conductive layer (CL) 414.

A power source 416 is configured to apply a potential and/or current to an electrochromic stack 420 through suitable connections (e.g., bus bars) to the conductive layers 404 and 414. In some embodiments, the voltage source is configured to apply a potential of a few volts in order to drive a transition of the device from one optical state to another. The polarity of the potential as shown in FIG. 3A is such that the ions (lithium ions in this example) primarily reside (as indicated by the dashed arrow) in nickel-tungsten oxide counter electrode layer 410

Figure 3C:
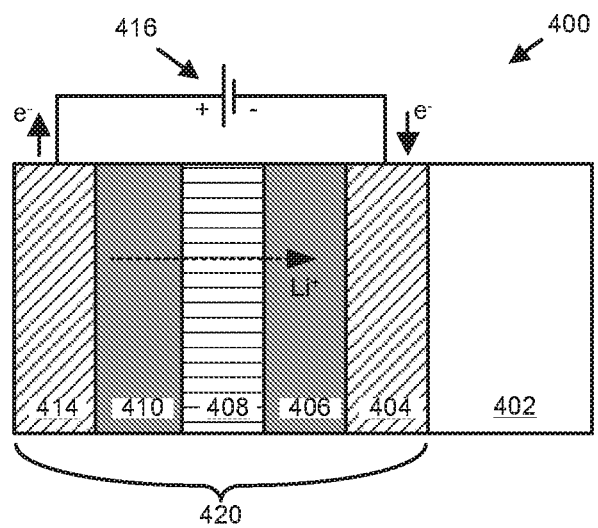
FIG. 3C depicts a schematic cross-section of the electrochromic device shown in FIG. 3B, but in a colored state (or transitioning to a colored state).

FIG. 3C is a schematic cross-section of electrochromic device 400 shown in FIG. 3B but in a colored state (or transitioning to a colored state). In FIG. 3C, the polarity of voltage source 416 is reversed, so that the electrochromic layer is made more negative to accept additional lithium ions, and thereby transition to the colored state. As indicated by the dashed arrow, lithium ions are transported across ion conducting layer 408 to tungsten oxide electrochromic layer 406. Tungsten oxide electrochromic layer 406 is shown in the colored state. Nickel-tungsten oxide counter electrode 410 is also shown in the colored state. As explained, nickel-tungsten oxide becomes progressively more opaque as it gives up (deintercalates) lithium ions. In this example, there is a synergistic effect where the transition to colored states for both layers 406 and 410 are additive toward reducing the amount of light transmitted through the stack and substrate.

As described above, an electrochromic device may include an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed. Such devices, and methods of fabricating them, are described in U.S. Pat. No. 8,300,298 and U.S. patent application Ser. No. 12/772,075 filed on Apr. 30, 2010, and U.S. patent application Ser. Nos. 12/814,277 and 12/814,279, filed on Jun. 11, 2010—each of the three patent applications and patent is entitled "Electrochromic Devices," each names Zhongchun Wang et al. as inventors, and each is incorporated by reference herein in its entirety.

B. Window Controllers

A window controller is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to four or more tint levels. Certain electrochromic windows allow intermediate tint levels by using two (or more) electrochromic lites in a single IGU, where each lite is a two-state lite. This is described in reference to FIGS. 2A and 2B in this section.

As noted above with respect to FIGS. 2A and 2B, in some embodiments, an electrochromic window can include an electrochromic device 400 on one lite of an IGU 200 and another electrochromic device 400 on the other lite of the IGU 200. If the window controller is able to transition each electrochromic device between two states, a bleached state and a colored state, the electrochromic window is able to attain four different states (tint levels), a colored state with both electrochromic devices being colored, a first intermediate state with one electrochromic device being colored, a second intermediate state with the other electrochromic device being colored, and a bleached state with both electrochromic devices being bleached. Embodiments of multi-pane electrochromic windows are further described in U.S. Pat. No. 8,270,059, naming Robin Friedman et al. as inventors, titled "MULTI-PANE ELECTROCHROMIC WINDOWS," which is hereby incorporated by reference in its entirety.

In some embodiments, the window controller is able to transition an electrochromic window having an electrochromic device capable of transitioning between two or more tint levels. For example, a window controller may be able to transition the electrochromic window to a bleached state, one or more intermediate levels, and a colored state. In some other embodiments, the window controller is able to transition an electrochromic window incorporating an electrochromic device between any number of tint levels between the bleached state and the colored state. Embodiments of methods and controllers for transitioning an electrochromic window to an intermediate tint level or levels are further described in U.S. Pat. No. 8,254,013, naming Disha Mehtani et al. as inventors, titled "CONTROLLING TRANSITIONS IN OPTICALLY SWITCHABLE DEVICES," which is hereby incorporated by reference in its entirety.

In some embodiments, a window controller can power one or more electrochromic devices in an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the controller has its own power source and directs application of power from the window power source to the window. However, it is convenient to include a power source with the window controller and to configure the controller to power the window directly, because it obviates the need for separate wiring for powering the electrochromic window.

Further, the window controllers described in this section are described as standalone controllers which may be configured to control the functions of a single window or a plurality of electrochromic windows, without integration of the window controller into a building control network or a building management system (BMS). Window controllers, however, may be integrated into a building control network or a BMS, as described further in the Building Management System section of this disclosure.

Figure 4:
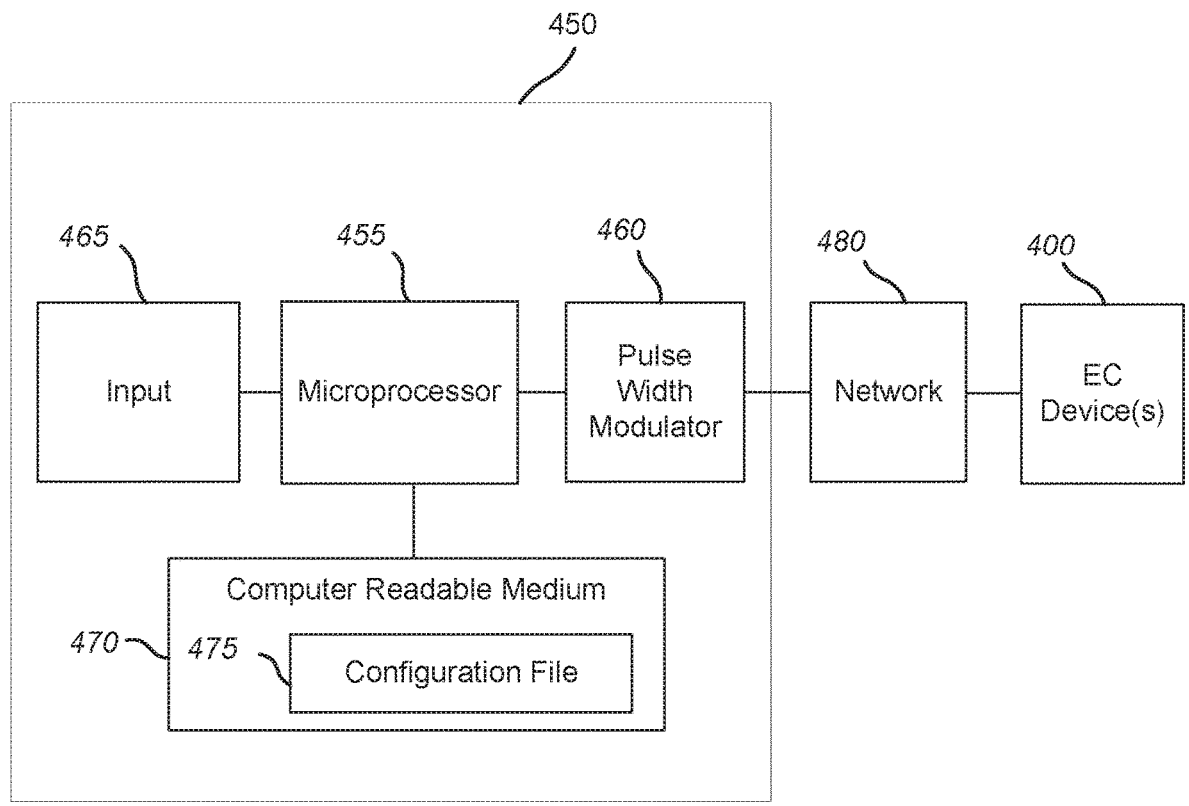
FIG. 4 depicts a simplified block diagram of components of a window controller.

FIG. 4 depicts a simplified block diagram of some components of a window controller 450 and other components of a window controller system of disclosed embodiments. More detail of components of window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 4, the illustrated components of the window controller 450 include a microprocessor 455 or other processor, a pulse width modulator 460, one or more input 465, and a computer readable medium (e.g., memory) having a configuration file 475. Window controller 450 is in electronic communication with one or more electrochromic devices 400 in an electrochromic window through network 480 (wired or wireless) to send instructions to the one or more electrochromic devices 400. In some embodiments, the window controller 450 may be a local window controller in communication through a network (wired or wireless) to a master window controller.

In disclosed embodiments, a building may have at least one room having an electrochromic window between the exterior and interior of a building. One or more sensors may be located to the exterior of the building and/or inside the room. In embodiments, outputs from the one or more sensors are used to control electrochromic devices 400. Although the sensors of depicted embodiments are shown as located on the outside vertical wall of the building, this is for the sake of simplicity, and the sensors may be in other locations, such as inside the room, the roof, or on other surfaces to the exterior, as well. In some cases, two or more sensors may be used to measure the same input, which can provide redundancy in case one sensor fails or has an otherwise erroneous reading.

Figure 5:
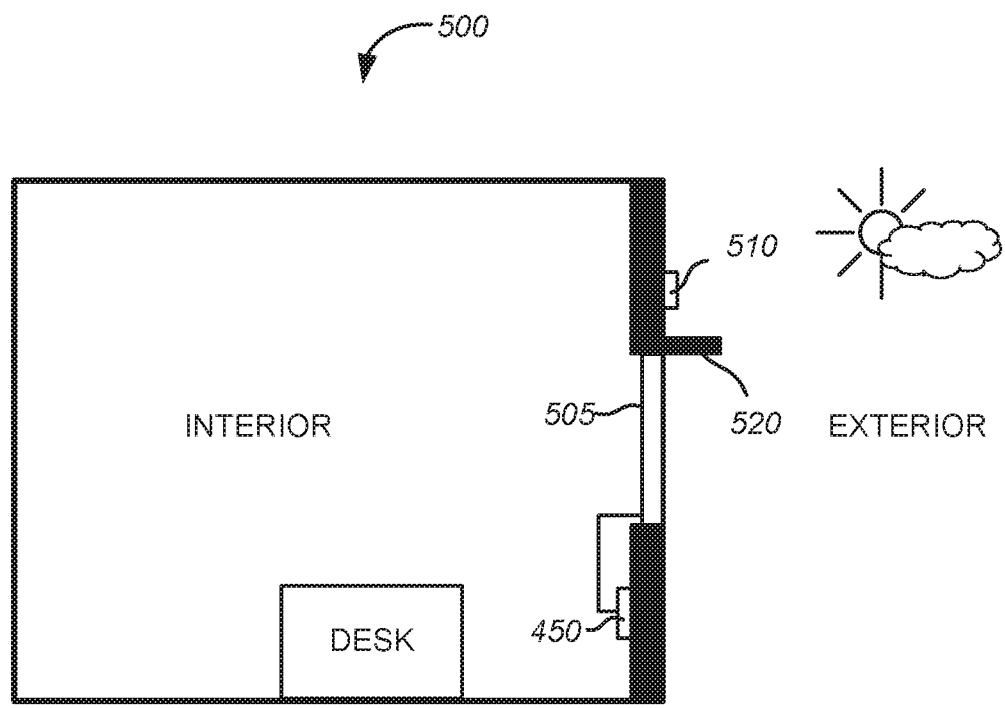
FIG. 5 is a schematic diagram of a room including a tintable window and at least one sensor, according to disclosed embodiments.

FIG. 5 depicts a schematic (side view) diagram of a room 500 having an electrochromic window 505 with at least one electrochromic device. The electrochromic window 505 is located between the exterior and the interior of a building, which includes the room 500. The room 500 also includes a window controller 450 connected to and configured to control the tint level of the electrochromic window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/m$^2$ or other similar units. In other cases, the device may detect light in the visible range of wavelengths in units of foot candles or similar units. In many cases, there is a linear relationship between these values of irradiance and visible light.

In some embodiments, exterior sensor 510 is configured to measure infrared light. In some embodiments, an exterior photosensor is configured to measure infrared light and/or visible light. In some embodiments, an exterior photosensor 510 may also include sensors for measuring temperature and/or humidity data. In some embodiments, intelligence logic may determine the presence of an obstructing cloud and/or quantify the obstruction caused by a cloud using one or more parameters (e.g., visible light data, infrared light data, humidity data, and temperature data) determined using an exterior sensor or received from an external network (e.g., a weather station). Various methods of detecting clouds using infrared sensors are described in International Patent Application No. PCT/US17/55631, titled "INFRARED CLOUD DETECTOR SYSTEMS AND METHODS," and filed, Oct. 6, 2017 which designates the United States and is incorporated herein in its entirety.

Irradiance values from sunlight can be predicted based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single electrochromic window 505. Output from the one or more exterior sensors 510 could be compared to each other to determine, for example, if one of exterior sensors 510 is shaded by an object, such as by a bird that landed on exterior sensor 510. In some cases, it may be desirable to use relatively few sensors because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In disclosed embodiments, window controller 450 can instruct the PWM 460, to apply a voltage and/or current to electrochromic window 505 to transition it to any one of four or more different tint levels. In disclosed embodiments, electrochromic window 505 can be transitioned to at least eight different tint levels described as: 0 (lightest), 5, 10, 15, 20, 25, 30, and 35 (darkest). The tint levels may linearly correspond to visual transmittance values and solar heat gain coefficient (SHGC) values of light transmitted through the electrochromic window 505. For example, using the above eight tint levels, the lightest tint level of 0 may correspond to an SHGC value of 0.80, the tint level of 5 may correspond to an SHGC value of 0.70, the tint level of 10 may correspond to an SHGC value of 0.60, the tint level of 15 may correspond to an SHGC value of 0.50, the tint level of 20 may correspond to an SHGC value of 0.40, the tint level of 25 may correspond to an SHGC value of 0.30, the tint level of may correspond to an SHGC value of 0.20, and the tint level of 35 (darkest) may correspond to an SHGC value of 0.10.

Window controller 450 or a master controller in communication with the window controller 450 may employ any one or more predictive control logic components to determine a desired tint level based on signals from the exterior sensor 510 and/or other input. The window controller 450 can instruct the PWM 460 to apply a voltage and/or current to electrochromic window 505 to transition it to the desired tint level.

Building Management System (BMS)

The window controllers described herein also are suited for integration with or are within/part of a BMS. A BMS is a computer-based control system installed in a building that monitors and controls the building's mechanical and electrical equipment such as ventilation, lighting, power systems, elevators, fire systems, and security systems. A BMS consists of hardware, including interconnections by communication channels to a computer or computers, and associated software for maintaining conditions in the building according to preferences set by the occupants and/or by the building manager. For example, a BMS may be implemented using a local area network, such as Ethernet. The software can be based on, for example, internet protocols and/or open standards. One example is software from Tridium, Inc. (of Richmond, Virginia). One communications protocol commonly used with a BMS is BACnet (building automation and control networks).

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window controller is integrated with a BMS, where the window controller is configured to control one or more electrochromic windows (e.g., 505) or other tintable windows. In other embodiments, the window controller is within or part of the BMS and the BMS controls both the tintable windows and the functions of other systems of the building. In one example, the BMS may control the functions of all the building systems including the one or more zones of tintable windows in the building.

Figure 6:
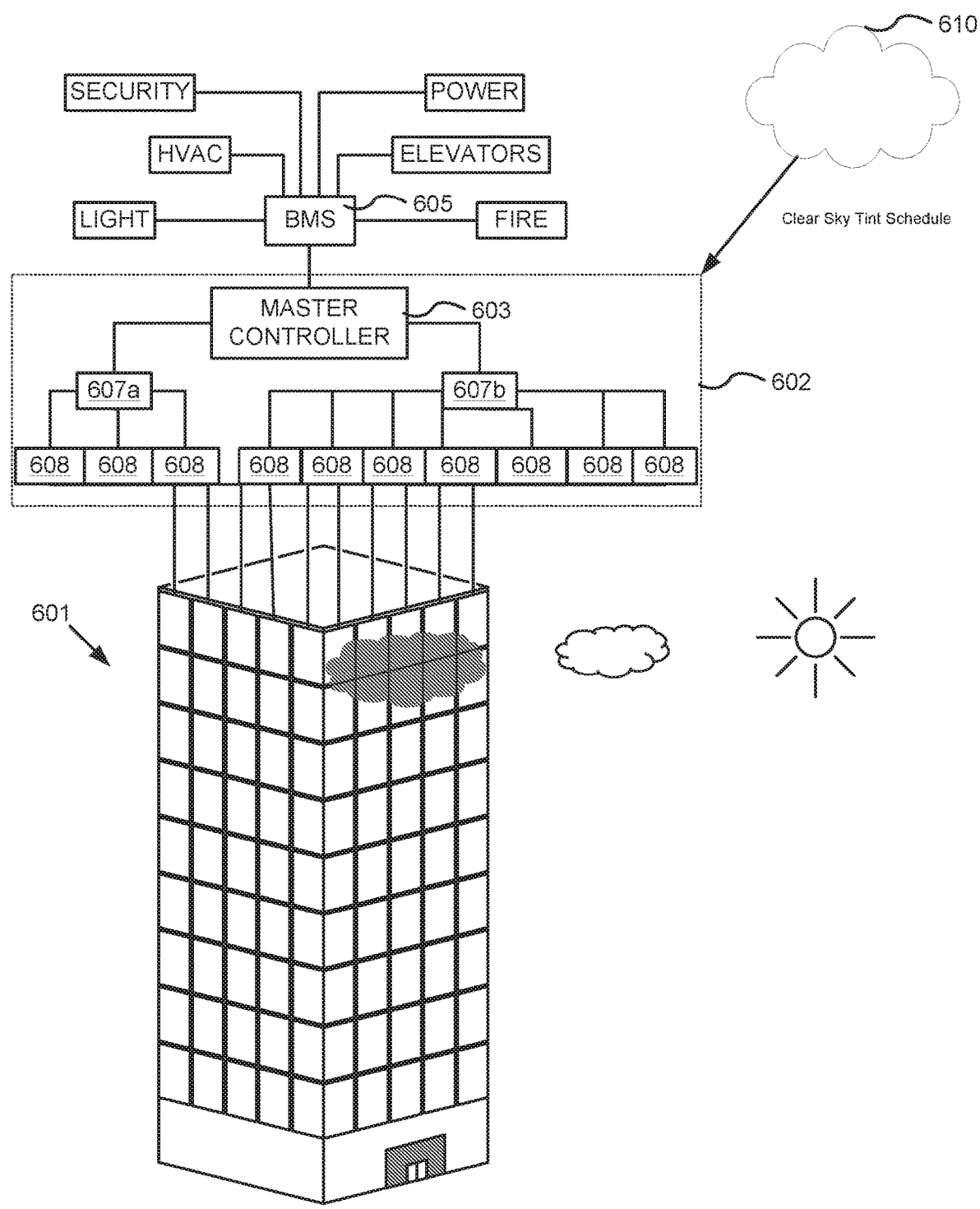
FIG. 6 is a schematic diagram of an example of a building and a building management system (BMS), according to certain implementations.

In some embodiments, each tintable window of the one or more zones includes at least one solid state and inorganic electrochromic device. In one embodiment, each of the tintable windows of the one or more zones is an electrochromic window having one or more solid state and inorganic electrochromic devices. In one embodiment, the one or more tintable windows include at least one all solid state and inorganic electrochromic device, but may include more than one electrochromic device, e.g. where each lite or pane of an IGU is tintable. In one embodiment, the electrochromic windows are multistate electrochromic windows, as described in U.S. patent application Ser. No. 12/851,514, filed on Aug. 5, 2010, and entitled "Multipane Electrochromic Windows." FIG. 6 depicts a schematic diagram of an example of a building 601 and a BMS 605 that manages a number of building systems including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, the BMS 605 manages a window control system 602. The window control system 602 is a distributed network of window controllers including a master controller, 603, network controllers, 607a and 607b, and end or leaf controllers 608. End or leaf controllers 608 may be similar to window controller 450 described with respect to FIG. 4. For example, master controller 603 may be in proximity to the BMS 605, and each floor of building 601 may have one or more network controllers 607a and 607b, while each window of the building has its own end controller 608. In this example, each of controllers 608 controls a specific electrochromic window of building 601. Window control system 602 is in communication with a cloud network 610 to received data. For example, the window control system 602 can receive schedule information from clear sky models maintained on cloud network 610. Although, master controller 603 is described in FIG. 6 as separate from the BMS 605, in another embodiment, the master controller 603 is part of or within the BMS 605.

Each of controllers 608 can be in a separate location from the electrochromic window that it controls, or be integrated into the electrochromic window. For simplicity, only ten electrochromic windows of building 601 are depicted as controlled by master window controller 602. In a typical setting there may be a large number of electrochromic windows in a building controlled by window control system 602. Advantages and features of incorporating electrochromic window controllers as described herein with BMSs are described below in more detail and in relation to FIG. 6, where appropriate.

One aspect of the disclosed embodiments is a BMS including a multipurpose electrochromic window controller as described herein. By incorporating feedback from a electrochromic window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of, and higher productivity from, staff, and various combinations of these, because the electrochromic windows can be automatically controlled. In some embodiments, a BMS may not be present or a BMS may be present but may not communicate with a master controller or communicate at a high level with a master controller. In certain embodiments, maintenance on the BMS would not interrupt control of the electrochromic windows.

In some cases, the systems of BMS 605 or building network 1200 may run according to daily, monthly, quarterly, or yearly schedules. For example, the lighting control system, the window control system, the HVAC, and the security system may operate on a 24 hour schedule accounting for when people are in the building during the work day. At night, the building may enter an energy savings mode, and during the day, the systems may operate in a manner that minimizes the energy consumption of the building while providing for occupant comfort. As another example, the systems may shut down or enter an energy savings mode over a holiday period.

The BMS schedule may be combined with geographical information. Geographical information may include the latitude and longitude of the building. Geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a building, for example, like building 601 in FIG. 6, including a building network or a BMS, tintable windows for the exterior windows of the building (i.e., windows separating the interior of the building from the exterior of the building), and a number of different sensors. Light from exterior windows of a building generally has an effect on the interior lighting in the building about 20 feet or about 30 feet from the windows. That is, space in a building that is more that about 20 feet or about 30 feet from an exterior window receives little light from the exterior window. Such spaces away from exterior windows in a building are lit by lighting systems of the building.

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

For exterior sensors, the building may include exterior sensors on the roof of the building. Alternatively, the building may include an exterior sensor associated with each exterior window (e.g., as described in relation to FIG. 5, room 500) or an exterior sensor on each side of the building. An exterior sensor on each side of the building could track the irradiance on a side of the building as the sun changes position throughout the day.

In some embodiments, the output signals received include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to the determined level of tint. For example, referring to FIG. 6, this may include master controller 603 issuing commands to one or more network controllers 607a and 607b, which in turn issue commands to end controllers 608 that control each window of the building. End controllers 608 may apply voltage and/or current to the window to drive the change in tint pursuant to the instructions.

In some embodiments, a building including electrochromic windows and a BMS may be enrolled in or participate in a demand response program run by the utility or utilities providing power to the building. The program may be a program in which the energy consumption of the building is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by the BMS of the building or by window controllers configured to control the electrochromic windows in the building. This warning signal can be an override mechanism that disengages window controllers from the system. The BMS can then instruct the window controller(s) to transition the appropriate electrochromic device in the electrochromic windows 505 to a dark tint level aid in reducing the power draw of the cooling systems in the building at the time when the peak load is expected.

In some embodiments, tintable windows for the exterior windows of the building (i.e., windows separating the interior of the building from the exterior of the building), may be grouped into zones, with tintable windows in a zone being instructed in a similar manner. For example, groups of electrochromic windows on different floors of the building or different sides of the building may be in different zones. For example, on the first floor of the building, all of the east facing electrochromic windows may be in zone 1, all of the south facing electrochromic windows may be in zone 2, all of the west facing electrochromic windows may be in zone 3, and all of the north facing electrochromic windows may be in zone 4. As another example, all of the electrochromic windows on the first floor of the building may be in zone 1, all of the electrochromic windows on the second floor may be in zone 2, and all of the electrochromic windows on the third floor may be in zone 3. As yet another example, all of the east facing electrochromic windows may be in zone 1, all of the south facing electrochromic windows may be in zone 2, all of the west facing electrochromic windows may be in zone 3, and all of the north facing electrochromic windows may be in zone 4. As yet another example, east facing electrochromic windows on one floor could be divided into different zones. Any number of tintable windows on the same side and/or different sides and/or different floors of the building may be assigned to a zone. In embodiments where individual tintable windows have independently controllable zones, tinting zones may be created on a building façade using combinations of zones of individual windows, e.g. where individual windows may or may not have all of their zones tinted.

In some embodiments, electrochromic windows in a zone may be controlled by the same window controller or same set of window controllers. In some other embodiments, electrochromic windows in a zone may be controlled by different window controller(s).

In some embodiments, electrochromic windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, electrochromic windows in a zone that includes the windows on a single side of the building may be controlled by a window controller or controllers that receive an output signal from a transmissivity sensor.

In some embodiments, a building manager, occupants of rooms in the second zone, or other person may manually instruct (using a tint or clear command or a command from a user console of a BMS, for example) the electrochromic windows in the second zone (i.e., the slave control zone) to enter a tint level such as a colored state (level) or a clear state. In some embodiments, when the tint level of the windows in the second zone is overridden with such a manual command, the electrochromic windows in the first zone (i.e., the master control zone) remain under control of an output received from a transmissivity sensor. The second zone may remain in a manual command mode for a period of time and then revert back to be under control of an output from the transmissivity sensor. For example, the second zone may stay in a manual mode for one hour after receiving an override command, and then may revert back to be under control of the output from the transmissivity sensor.

In some embodiments, a building manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the electrochromic windows in the second zone (i.e., the slave control zone) remain under control outputs from the exterior sensor. The first zone may remain in a manual command mode for a period of time and then revert back to be under control of the output from the transmissivity sensor. For example, the first zone may stay in a manual mode for one hour after receiving an override command, and then may revert back to be under control of an output from the transmissivity sensor. In some other embodiments, the electrochromic windows in the second zone may remain in the tint level that they are in when the manual override for the first zone is received. The first zone may remain in a manual command mode for a period of time and then both the first zone and the second zone may revert back to be under control of an output from the transmissivity sensor.

Any of the methods described herein of control of a tintable window, regardless of whether the window controller is a standalone window controller or is interfaced with a building network, may be used control the tint of a tintable window.

Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions.

A separate communication node for wireless communications can be, for example, another wireless window controller, an end, intermediate, or master window controller, a remote-control device, or a BMS. Wireless communication is used in the window controller for at least one of the following operations: programming and/or operating the electrochromic window 505, collecting data from the EC window 505 from the various sensors and protocols described herein, and using the electrochromic window 505 as a relay point for wireless communication. Data collected from electrochromic windows 505 also may include count data such as number of times an EC device has been activated, efficiency of the EC device over time, and the like. These wireless communication features is described in more detail below.

In one embodiment, wireless communication is used to operate the associated electrochromic windows 505, for example, via an infrared (IR), and/or radio frequency (RF) signal. In certain embodiments, the controller will include a wireless protocol chip, such as Bluetooth, EnOcean, WiFi, Zigbee, and the like. Window controllers may also have wireless communication via a network. Input to the window controller can be manually input by an end user at a wall switch, either directly or via wireless communication, or the input can be from a BMS of a building of which the electrochromic window is a component.

In one embodiment, when the window controller is part of a distributed network of controllers, wireless communication is used to transfer data to and from each of a plurality of electrochromic windows via the distributed network of controllers, each having wireless communication components. For example, referring again to FIG. 6, master controller 603, communicates wirelessly with each of network controllers 607a and 607b, which in turn communicate wirelessly with end controllers 608, each associated with an electrochromic window. Master controller 603 may also communicate wirelessly with the BMS 605. In one embodiment, at least one level of communication in the window controller is performed wirelessly.

In some embodiments, more than one mode of wireless communication is used in the window controller distributed network. For example, a master window controller may communicate wirelessly to intermediate controllers via WiFi or Zigbee, while the intermediate controllers communicate with end controllers via Bluetooth, Zigbee, EnOcean, or other protocol. In another example, window controllers have redundant wireless communication systems for flexibility in end user choices for wireless communication.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

Example of System for Controlling Functions of Tintable Windows

Figure 7:
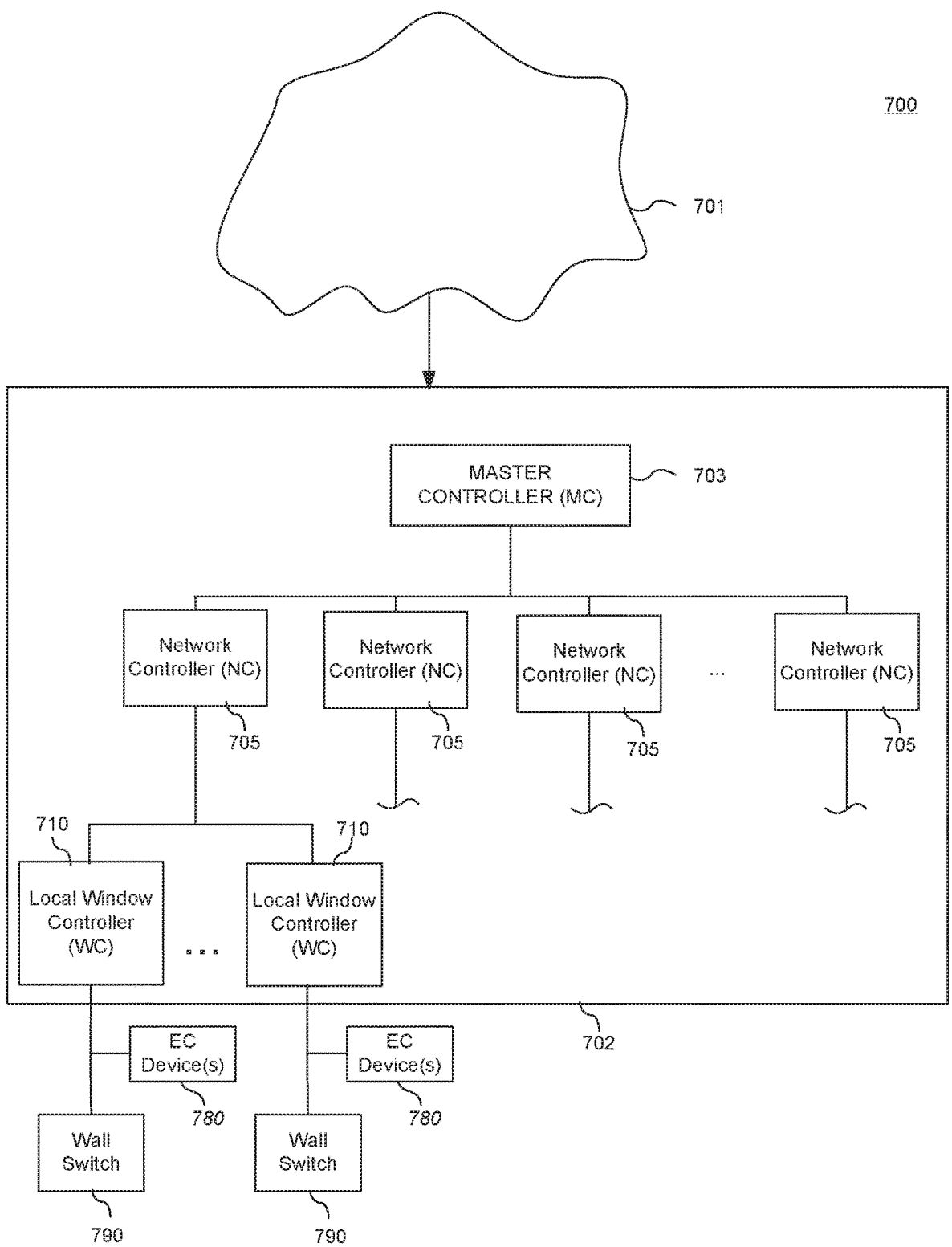
FIG. 7 is a block diagram of components of a system for controlling functions of one or more tintable windows of a building according to certain implementations.

FIG. 7 is a block diagram of components of a system 700 for controlling functions (e.g., transitioning to different tint levels) of one or more tintable windows of a building (e.g., building 601 shown in FIG. 6), according to embodiments. System 700 may be one of the systems managed by a BMS (e.g., BMS 605 shown in FIG. 6) or may operate independently of a BMS.

System 700 includes a window control system 702 having a network of window controllers that can send control signals to the tintable windows to control its functions. System 700 also includes a network 701 in electronic communication with master controller 703. The predictive control logic, other control logic and instructions for controlling functions of the tintable window(s), sensor data, and/or schedule information regarding clear sky models can be communicated to the master controller 703 through the network 701. The network 701 can be a wired or wireless network (e.g. a cloud network). In one embodiment, network 701 may be in communication with a BMS to allow the BMS to send instructions for controlling the tintable window (s) through network 701 to the tintable window(s) in a building.

System 700 also includes EC devices 780 of the tintable windows (not shown) and optional wall switches 790, which are both in electronic communication with master controller 703. In this illustrated example, master controller 703 can send control signals to EC device(s) 780 to control the tint level of the tintable windows having the EC device(s) 780. Each wall switch 790 is also in communication with EC device(s) 780 and master controller 703. An end user (e.g., occupant of a room having the tintable window) can use the wall switch 790 to input an override tint level and other functions of the tintable window having the EC device(s) 780.

In FIG. 7, the window control system 702 is depicted as a distributed network of window controllers including a master controller 703, a plurality of network controllers 705 in communication with the master controller 703, and multiple pluralities of end or leaf window controllers 710. Each plurality of end or leaf window controllers 710 is in communication with a single network controller 705. The components of the system 700 in FIG. 7 may be similar in some respects to components described with respect to FIG. 6. For example, master controller 703 may be similar to master controller 603 and network controllers 705 may be similar to network controllers 607. Each of the window controllers in the distributed network of FIG. 7 may include a processor (e.g., microprocessor) and a computer readable medium in electrical communication with the processor.

In FIG. 7, each leaf or end window controller 710 is in communication with EC device(s) 780 of a single tintable window to control the tint level of that tintable window in the building. In the case of an IGU, the leaf or end window controller 710 may be in communication with EC devices 780 on multiple lites of the IGU control the tint level of the IGU. In other embodiments, each leaf or end window controller 710 may be in communication with a plurality of tintable windows. The leaf or end window controller 710 may be integrated into the tintable window or may be separate from the tintable window that it controls. Leaf and end window controllers 710 in FIG. 7 may be similar to the end or leaf controllers 608 in FIG. 6 and/or may also be similar to window controller 450 described with respect to FIG. 4.

Signals from the wall switch 790 may override signals from window control system 702 in some cases. In other cases (e.g., high demand cases), control signals from the window control system 702 may override the control signals from wall switch 1490. Each wall switch 790 is also in communication with the leaf or end window controller 710 to send information about the control signals (e.g. time, date, tint level requested, etc.) sent from wall switch 790 back to master window controller 703. In some cases, wall switches 790 may be manually operated. In other cases, wall switches 790 may be wirelessly controlled by the end user using a remote device (e.g., cell phone, tablet, etc.) sending wireless communications with the control signals, for example, using infrared (IR), and/or radio frequency (RF) signals. In some cases, wall switches 790 may include a wireless protocol chip, such as Bluetooth, EnOcean, WiFi, Zigbee, and the like. Although wall switches 790 depicted in FIG. 7 are located on the wall(s), other embodiments of system 700 may have switches located elsewhere in the room.

II. General System Architecture

Conventional smart window and/or shade control systems actively model shadows and reflections on a building, which is cumbersome and inefficient to computing resources at the building. The system architecture described herein does not require a window control system to actively generate models of the building. Instead, models specific to the building site are generated and maintained on a cloud network or other network separate from the window control system. For example, neural network models (e.g., DNN and LSTM) are initialized, retrained, and/or the live models executed on the cloud network or other network separate from the window control system and the tint schedule information from these models is pushed to the window control system 840.

Tint schedule information define rules that are derived from these models and that are pushed to the window control system. The window control system uses the tint schedule information derived from the predefined models, custom to the building in question, to make final tinting decisions implemented at the tintable windows. The 3D models are maintained on a cloud-based 3D modeling platform that can generate visualizations of the 3D model to allow users to manage input for setting up and customizing the building site and the corresponding final tint states applied to the tintable windows. Once the tint schedule information is loaded into the window control system, there is no need for modeling calculations to tie up computing power of the control system. Tint schedule information resulting from any changes to the models can be pushed to the window control system when needed. It would be understood that although the system architecture is generally described herein with respect to controlling tintable windows, other components and systems at the building could additionally or alternatively be controlled with this architecture.

In various implementations, system architecture includes cloud-based modules to setup and customize a 3D model of the building site. A cloud-based 3D model system initializes the 3D model of the building site using architectural model(s) as input, for example, an Autodesk®Revit model or other industry standard building model may be used. A 3D model in its simplest form includes exterior surfaces of structures of the building including window openings and a stripped version of the interior of the building with only floors and walls. More complex models may include the exterior surfaces of objects surrounding the building as well as more detailed features of the interior and exterior of the building. The system architecture also includes a cloud-based clear sky module that assigns reflective or non-reflective properties to the exterior surfaces of the objects in the 3D model, defines interior three-dimensional occupancy regions, assigns IDs to windows, and groups windows into zones based on input from users. Time varying simulations of the resulting clear sky 3D model (i.e. the 3D model with configuration data having the assigned attributes) can be used to determine the direction of sunlight at the different positions of the sun under clear sky conditions and taking into account shadows and reflections from the objects at the building site, sunlight entering spaces of the building, and the intersection of 3D projections of sunlight with three-dimensional occupancy regions in the building. The clear sky module uses this information to determine whether certain conditions exist for particular occupancy regions (i.e. from the perspective of the occupant) such as, for example, a glare condition, direct and indirect reflection condition, and passive heat condition. The clear sky module determines a clear sky tint state for each zone at each time interval based on the existence of particular conditions at that time, tint states assigned to the conditions, and the priority of different conditions if multiple conditions exist. The tint schedule information, typically for a year, is pushed to, e.g. a master controller of, the window control system at the building. The window control system determines a weather-based tint state for each zone at each time interval based on sensor data such as measurements from infrared sensors and/or photosensors. The window control system then determines the minimum of the weather-based tint state and the clear sky tint state to set the final tint state and send tint instructions to implement the final tint state at the zones of the tintable windows. Thus, in some embodiments, the window control system does not model the building or 3D parameters around and inside the building, that is done offline and therefore computing power of the window control system can be used for other tasks, such as applying tint states based on the model(s) and/or other input(s) received by the window control system.

Figure 8:
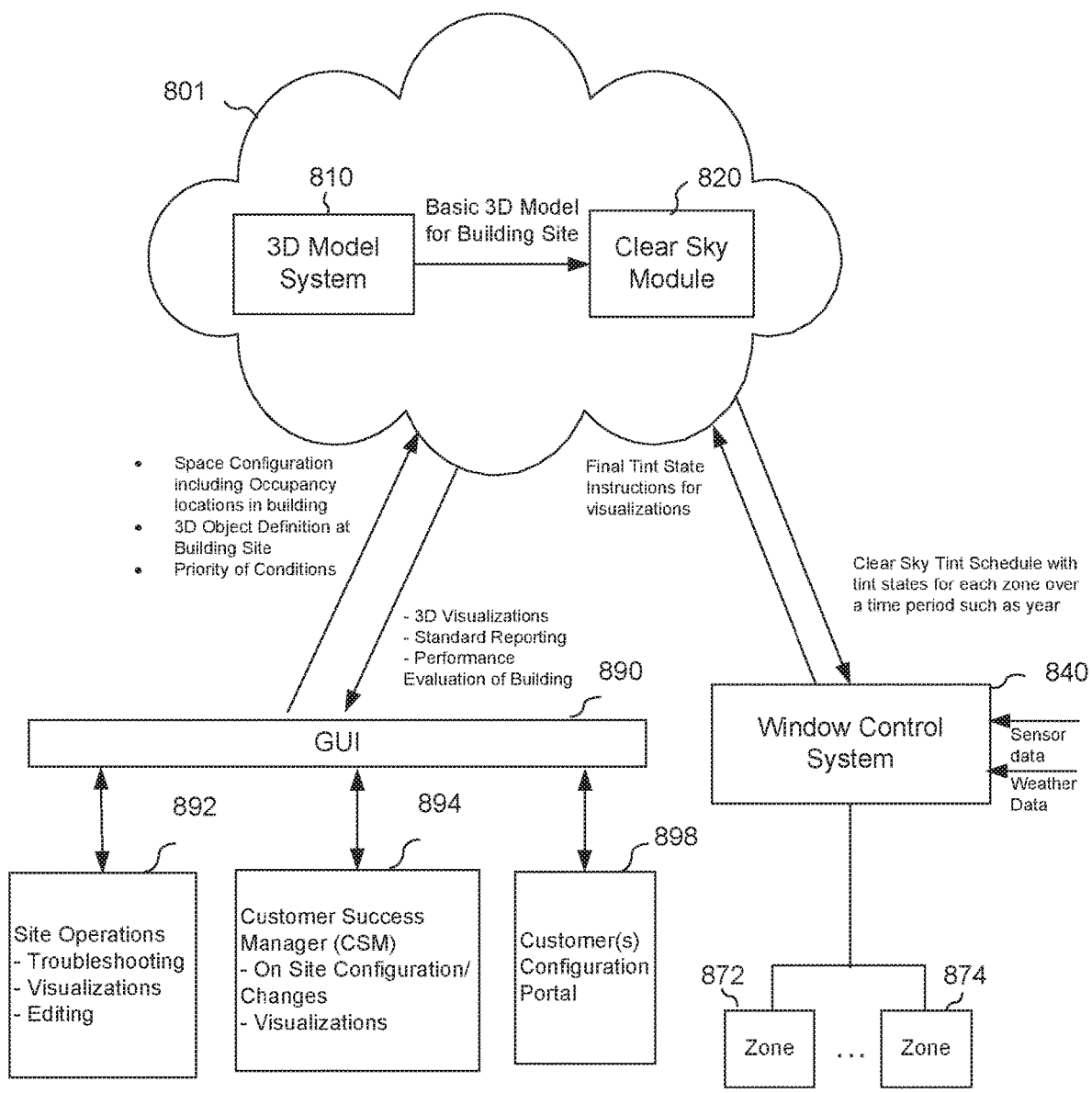
FIG. 8 is schematic diagram depicting the general system architecture of systems and users involved in maintaining clear sky models on a cloud network and controlling the tintable windows of a building based on data derived from output from the models, according to various implementations.

FIG. 8 is a schematic illustration depicting the general architecture 800 of systems and users involved in initializing and customizing models maintained in a cloud network 801 and controlling the tintable windows of a building based on output such as rules from the models, according to various implementations. The system architecture 800 includes a cloud-based 3D model system 810 in communication with a cloud-based clear sky module 820, where the combination of 810 and 820 is referred to Module A. In one embodiment, Module A provides inputs to a window control system 840. The 3D model system 810 can initialize and/or revise a 3D model of a building site and communicate the data for the 3D model to the clear sky module 820. The 3D model initialized by the 3D model system includes the exterior surfaces of the surrounding structures and other objects at the building site and the building stripped of all but walls, floors, and exterior surfaces. The cloud-based clear sky module 820 can assign attributes to the 3D model to generate clear sky 3D models such as, e.g., one or more of a glare/shadow model, a reflection model, and a passive heat model. The cloud-based systems are in communication with each other and with other applications via the cloud network using application program interfaces (APIs). Both the cloud-based 3D model system 810 and the clear sky module 820 include logic as described in more detail herein. It would be understood that the logic of these cloud-based modules as well as other modules described herein and others can be stored in computer readable medium (e.g. memory) of a server of the cloud network and that one or more processors on the server in the cloud network are in communication with the computer readable medium to execute instructions to perform the functions of the logic. In one embodiment, window control system 840 also receives inputs from a Module B, which is described further herein. In another embodiment, window control system 840 receives inputs from Modules A, C1 and D1.

The clear sky module 820 can use the 3D model of a building site to generate simulations over time for different positions of the sun under clear sky conditions to determine glare, shadows and reflections from one or more objects at and around the building site. For example, the clear sky module 820 can generate a clear sky glare/shadow model and a reflection model and using a ray tracing engine can determine the direct sunlight through the window openings of a building based on shadows and reflections under clear sky conditions. The clear sky module 820 uses shadow and reflection data to determine the existence of glare, reflection, and passive heat conditions at occupancy regions (i.e. likely locations of occupants) of the building. The cloud-based clear sky module 820 determines a yearly schedule (or other time period) of tint states for each of the zones of the building based on these conditions. The cloud-based clear sky module 820 typically pushes the tint schedule information to the window control system 840.

The window control system 840 includes a network of window controllers such as the networks described in FIGS. 6 and 7. The window control system 840 is in communication with the zones of tintable windows in the building, depicted in FIG. 8 as series of zones from a $1^{st}$ zone 872 to an $n^{th}$ zone 874. The window control system 840 determines final tint states and sends tint instructions to control the tint states of the tintable windows. The final tint states are determined based on the yearly schedule information, sensor data, and/or weather feed data. As described with respect to the illustrated system architecture 800, the window control system 840 does not generate models or otherwise waste computing power on modeling. The models, which are specific to the building site, are created, customized, and stored in the cloud network 801. The predefined tint schedule information is pushed to the window control system initially, and then again only if updates to the 3D model are needed (for example changes to the building layout, new objects in the surrounding area, or the like).

The system architecture 800 also includes a graphical user interface (GUI) 890 for communicating with customers and other users to provide application services, reports, and visualizations of the 3D model and to receive input for setting up and customizing the 3D model. Visualizations of the 3D model can be provided to users and received from users through the GUI. The illustrated users include site operations 892 that are involved in troubleshooting at the site and have the capability to review visualizations and edit the 3D model. The users also include a Customer Success Manager (CSM) 894 with the capability of reviewing visualizations and on-site configuration changes to the 3D model. The users also include a customer(s) configuration portal 898 in communication with various customers. Through the customer(s) configuration portal 898, the customers can review various visualizations of data mapped to the 3D model and provide input to change the configuration at the building site. Some examples of input from the users include space configurations such as occupancy areas, 3D object definition at the building site, tint states for particular conditions, and priority of conditions. Some examples of output provided to users include visualizations of data on the 3D model, standard reporting, and performance evaluation of the building. Certain users are depicted for illustrative purposes. It would be understood that other or additional users could be included.

Although many examples of the system architecture are described herein with the 3D Model system, clear sky module, and neural network models residing on the cloud network, in another implementation, one or more these modules and models do not necessarily need reside on the cloud network. For example, the 3D Model system, the clear sky module and or other modules or models described herein may reside on a standalone computer or other computing device that is separate from and in communication with the window control system. As another example, the neural network models described herein may reside on a window controller such as a master window controller or a network window controller.

In certain embodiments, the computational resources for training and executing the various models (e.g., a DNN and LSTM model) and modules of the system architecture described herein include: (1) local resources of the window control system, (2) remote sources separate from the window control system, or (3) shared resources. In the first case, the computational resources for training and executing the various models and modules reside on the master controller or one or more window controllers of a distributed network of window controllers such as the distributed network of the window control system 602 in FIG. 6. In the second case, the computational resources for training and executing the various models and modules reside on remote resources separate from the window control system. For example, the computational resources may reside on a server of an external third-party network or on a server of a leasable cloud-based resource such as might be available over the cloud network 801 in FIG. 8. As another example, the computational resources may reside on a server of a standalone computing device at the site separate from and in communication with the window control system. In the third case, the computational resources for training and executing the various models and modules reside on shared resources (both local and remote). For example, the remote resource such as a leasable cloud-based resource available over the cloud network 801 in FIG. 8 perform daily retraining operations of a DNN model and/or a LSTM model at night and the local resources such as a master window controller or a group of window controllers of the window control system 602 in FIG. 6 execute the live models during the day when tint decisions need to be made.

A. Cloud-Based 3D Modelling System

In various implementations, the system architecture has a cloud-based 3D modelling system that can generate a 3D model (e.g., solid model, surface model, or wireframe model) of the building site using a 3D modelling platform. Various commercially-available programs can be used as the 3D modelling platform. An example of such a commercially-available program is Rhino® 3D software produced by McNeel North America of Seattle Washington. Another example of a commercially-available program is Autocad® computer-aided design and drafting software application by Autodesk® of San Rafael, California. Other examples of tools that may be used to implement aspects of the invention are a reflected/direct glare tool available commercially as WRLD3d by WRLD of Dundee city DD1 1NJ, United Kingdom, and IMMERSIFY! VR for Revit and Rhino available from the Immersify Project at https://immersify.eu.

Figure 9:
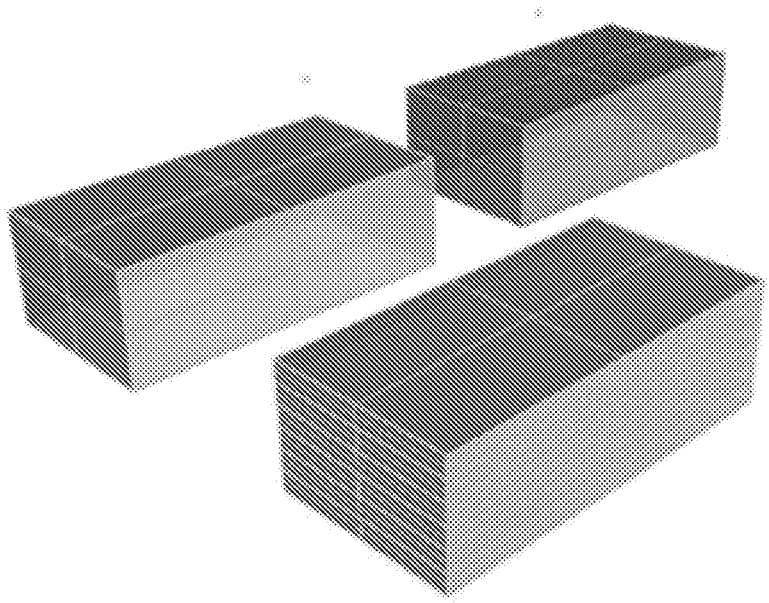
FIG. 9 is an illustration of a 3D model of a building site, according to one example.

The 3D model is a three-dimensional representation of the buildings and other objects at the site of the building with the tintable windows. A building site generally refers to a region surrounding the building of interest. The region is typically defined to include all objects surrounding the building that would cause shadows or reflections on the building. The 3D model includes three-dimensional representations of the exterior surfaces of the buildings and other objects surrounding the building and also of the building stripped of all its surfaces except walls, floors, and exterior surfaces. The 3D model system can generate the 3D model, for example, automatically using a 3D model such as a Revit or other industry standard building model and stripping the modelled building of all its surfaces except walls, floors, and exterior surfaces with window openings. Any other objects in the 3D model would be automatically stripped of all elements except exterior surfaces. As another example, the 3D model can be generated from scratch using 3D modelling software. An example of a 3D model of a building site having three buildings is shown in FIG. 9.

B. Cloud-Based Clear Sky Module

Recent installations of large numbers of tintable windows such as electrochromic windows, sometimes referred to as "smart windows," in large-scale buildings have created an increased need for complex control and monitoring systems that involve extensive computing resources. For example, a high number of tintable windows deployed in a large-scale building may have a huge number of zones (e.g., 10,000) which requires complex reflection and glare models. As these tintable windows continue to gain acceptance and are more widely deployed, they will require more sophisticated systems and models that will involve a large amount of data.

Figure 10:
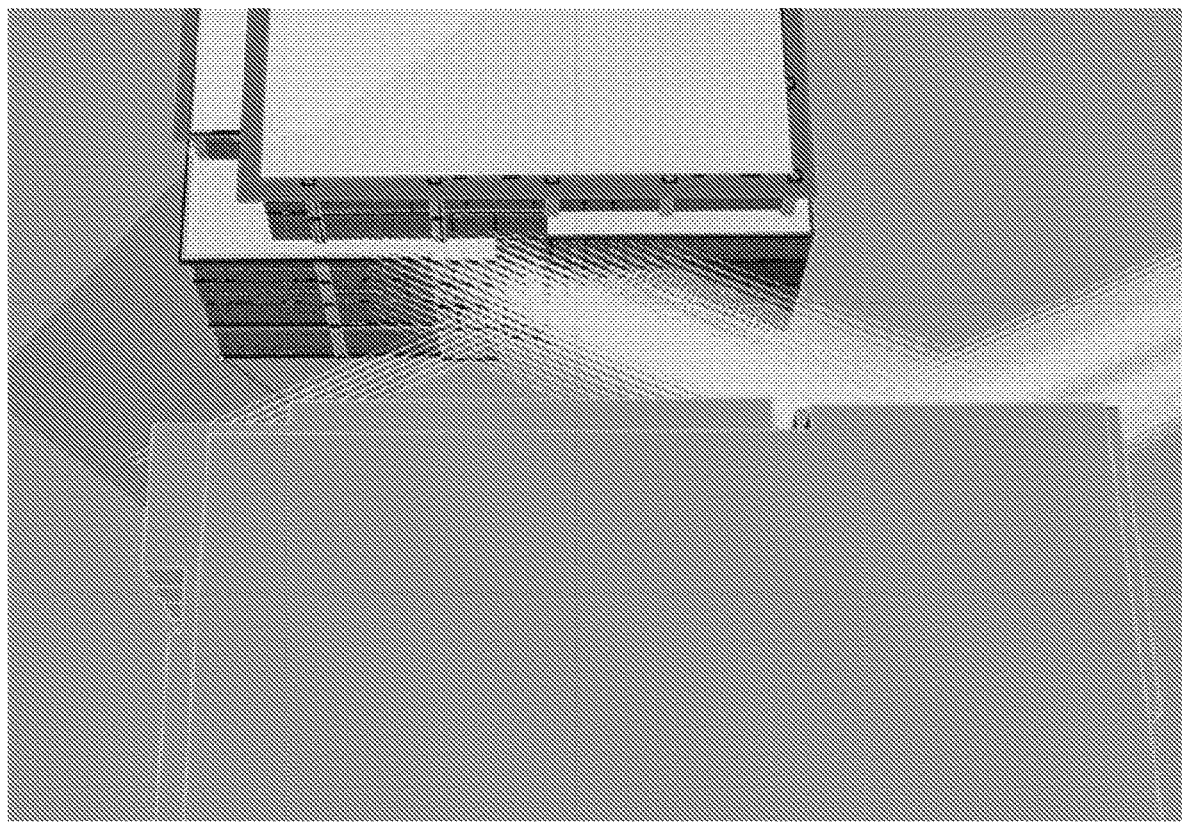
FIG. 10 is an illustration of a visualization of a glare/shadow and reflection model based on the 3D model and showing the rays of direct sunlight from the sun at one position in the sky under clear sky conditions, according to one example.

The system architecture described herein generates 3D model visualizations using 3D modelling platforms that can be implemented in the cloud, or if desired, locally. The models include, for example, a glare/shadow model, a reflection model, and a passive heat model. The 3D models are used to visualize effects of sunlight on the interior and the exterior of a building. FIG. 10 is an example of a visualization of glare, shadows, reflections, and heat present along exterior surfaces of a building according to the path of the sun at a particular time of day. The visualizations are generated under clear sky conditions that are based on a clear sky model for the location of the building. The visualizations can be used to evaluate and control glare in single and multiple occupancy regions and zones in any sized interior space on any floor of a building and can take into account the exterior of buildings and their features such a overhangs, columns, etc. that may be in the path of the sun. The representation can also take into account primary and secondary reflections as well a single and multiple reflections from complex curved and convex shapes of external objects and buildings, and their impact on occupancy regions and zones within a building. The visualizations can also be used to model the presence and effects of heat caused by direct radiation, radiation reflected and/or diffused by external objects and buildings, and as well, radiation occluded by external objects and buildings.

The clear sky module includes logic that can be implemented to assign attributes to the 3D model to generate a clear sky 3D model. The clear sky module also includes logic that can be used to generate other models to determine various conditions such as, for example, a glare/shadow model, a reflection model, and a passive heat model. These models of the building site can be used to generate a yearly schedule of tint states for the zones of the building that is pushed to the window control system at the building to make final tinting decisions. With this system architecture, most of the data can be kept on the cloud network. Keeping the models on the cloud network allows for easy access to and customization by customers and other users. For example, visualizations of various models can be sent to the users to allow them to review and send input, for example, to setup and customize the models and/or override final tinting schedules or other systems functions at the building. For example, the visualizations can be used by users to manage input used to assign rules to the clear sky model such as in zone management and window management as part of site set up or customization.

C. Graphical User Interface (GUI) for Site Setup and Customization

The system architecture also includes a GUI for interfacing with various customers and other users. The GUI can provide application services or reports to the users and receive input for the various models from the users. The GUI can, for example, provide visualizations of various models to the users. The GUI can also provide an interface for zone management, window management, and occupancy region definition to set up the clear sky model. The GUI can also provide an interface for entering priority data, reflective properties of exterior surfaces, override values, and other data. In addition, the users can use the GUI to customize the spaces of the 3D model, for example, after viewing visualizations of the clear sky model of the building site. Some examples of customizations include:

re-structure the building site (move buildings, revise exterior surface properties) to see changes to reflection, glare, and heat conditions or to tinting of zones of building re-structure internal structures (walls, floors) and external shell of building to see how changes will affect tint states manage zones of windows change materials used in building to see changes to reflection properties and corresponding changes in reflection model and tint states change tinting priorities to see changes in tint states as mapped to 3D model of building override tint states in schedule data revise buildings at building site add model of new condition D. Window Control System The system architecture described herein includes a window control system that includes a network of window controllers controlling the tint levels of the one or more zones of tintable windows at the building. Some examples of controllers that may be included in the window control system 840 of the system architecture are described with respect to FIGS. 6-8. Other examples of window controllers are described in U.S. patent application Ser. No. 15/334,835 filed on Oct. 26, 2016 and titled "CONTROLLERS FOR OPTICALLY-SWITCHABLE DEVICES," which is hereby incorporated by reference in its entirety.

Window control system 840 includes control logic for making tinting decisions and sending tint instructions to change tint levels of the tintable windows. In certain embodiments, the control logic includes a Module A having a cloud-based 3D model system 810 and a cloud-based clear sky module 820, and a Module B described further below, where Module B receives signals from a Module C with one or more photosensor values and/or from a Module D with one or more infrared sensor values (see FIG. 27). Module C may include one or more photosensors that take photosensor readings or may receive signals with the raw photosensor readings from one or more photosensors, e.g., residing in a multisensor device or a sky sensor. Similarly, Module D may include one or more infrared sensors and/or an ambient temperature sensor(s) that take temperature readings or may receive signals with the raw temperature measurements from one or more infrared sensors, e.g., residing in a multi-sensor device or a sky sensor.

E. General Process of System Architecture

Figure 11:
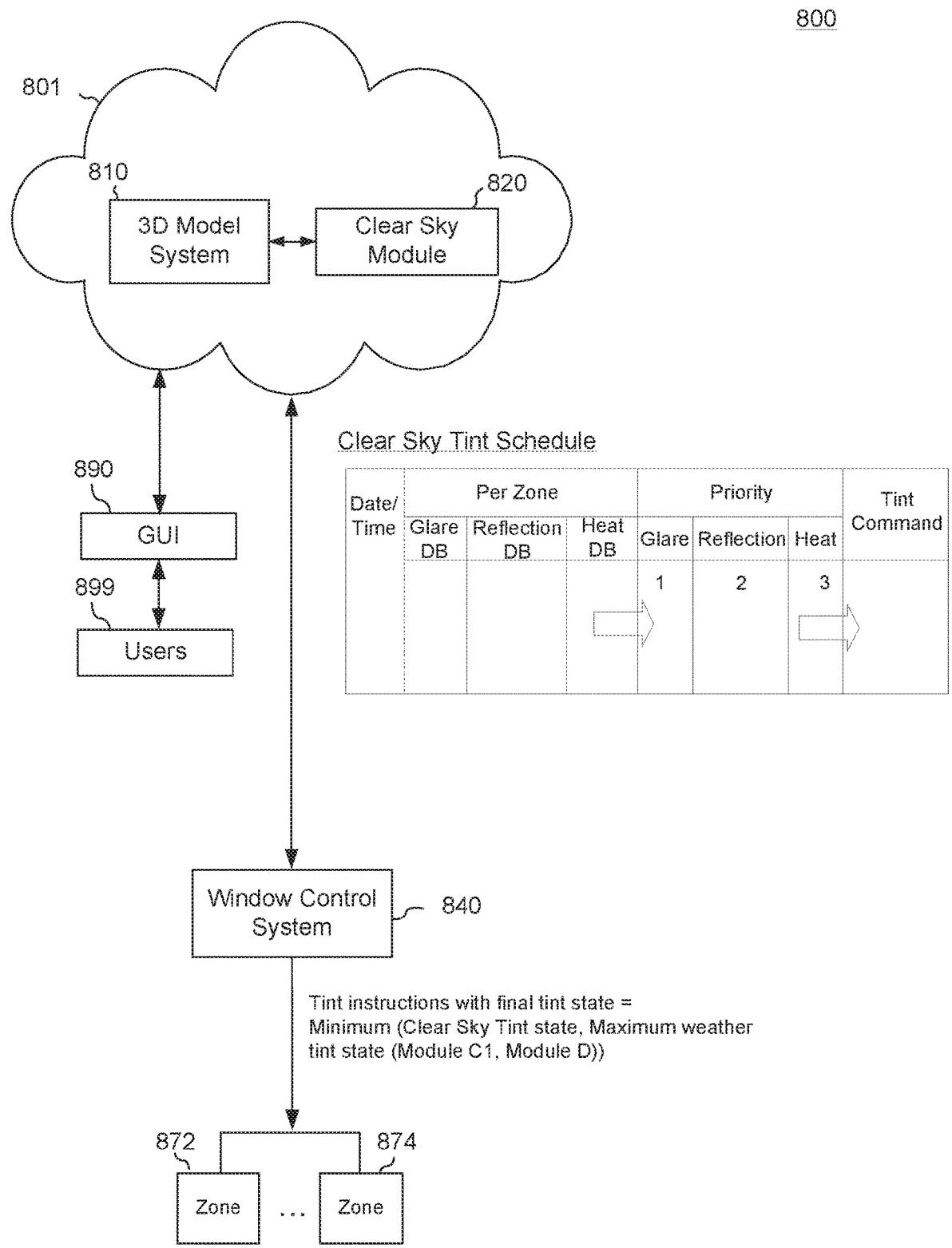
FIG. 11 is an illustrated example of the flow of data communicated between some of the systems of the system architecture shown in FIG. 8.

FIG. 11 is an illustrated example of the flow of data communicated between some of the systems of the system architecture 800 shown in FIG. 8. As shown, Module A (including 810 and 820) provides its information to the window control system 840. In one implementation, the control logic of the window control system 840 also receives one or more inputs from Module B and sets the final tint state for each zone based on outputs received from Module A and/or Module B. In another implementation shown in FIG. 28, the control logic of the window control system 840 also receives one or more inputs from Module C1 and Module D1 and sets the final tint state for each zone based on outputs received from Module A, Module C1, and Module D1.

Figure 12:
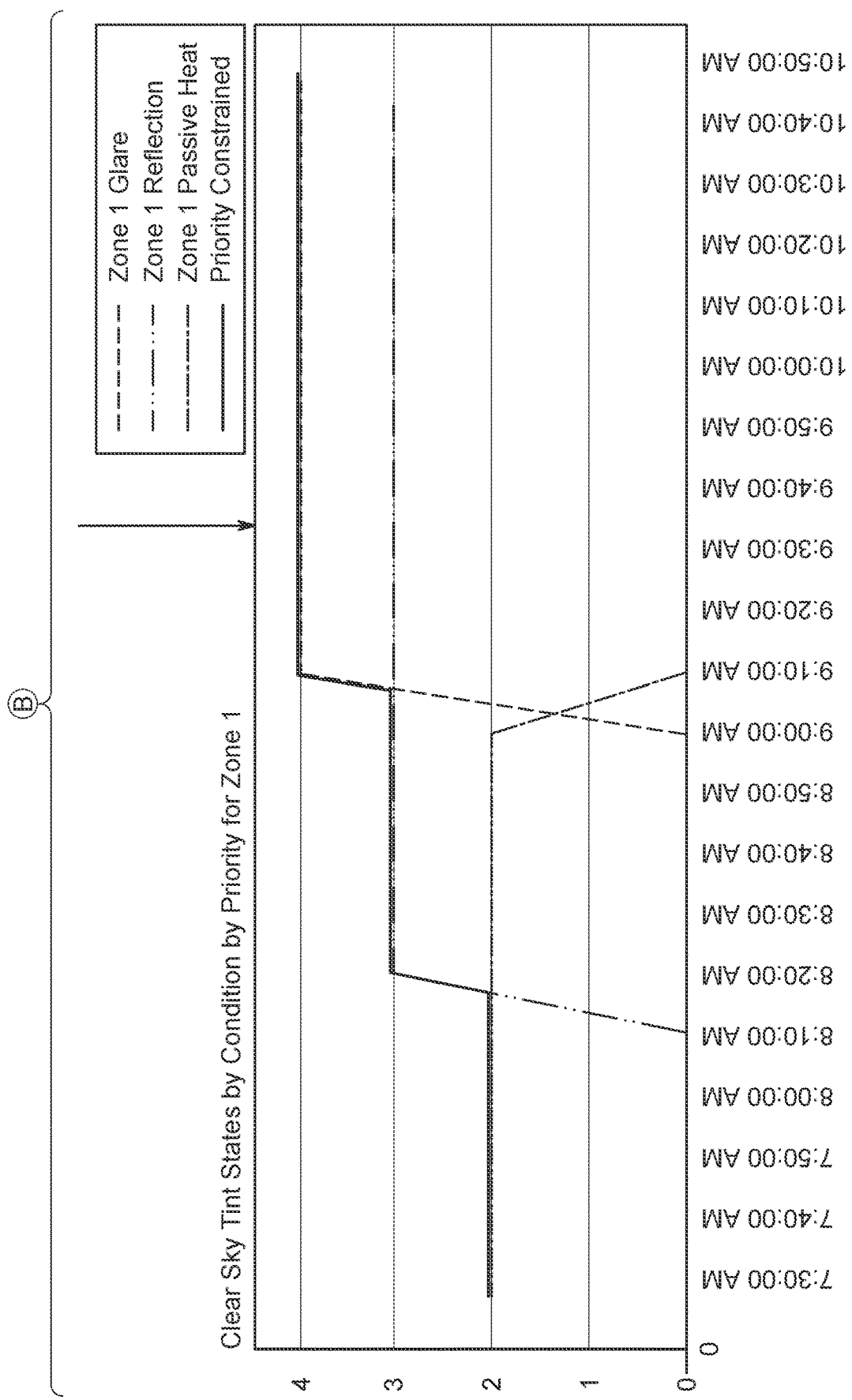
FIG. 12 is schematic illustration of an example of logic operations of a clear sky module in generating clear sky model schedule information, according to an implementation.

FIG. 12 is schematic illustration of an example of certain logic operations implemented by the clear sky module 820 to generate tint schedule information based on clear sky conditions. In this illustrated example, the clear sky module applies the tint state assigned to each condition to the condition values and then applies the priorities from the priority data to determine the tint state for each zone at a particular time. In another example, the clear sky module could apply the priorities from the priority data to the condition values to determine the condition that applies and then apply the tint state for that condition to determine a tint state for each zone at a particular time interval. In FIG. 12, the top table is an example of a table of condition values determined by the clear sky module including values of the glare condition, the direct reflection condition, and the passive heat condition for zone 1 at time intervals during a day. In this example, the condition values are binary values 0/1 of whether condition exists at different times during day: 0—Condition does not exist; and 1—Condition does exist. FIG. 12 also includes a second table that is an example of tint state output from the clear sky module. This tint state assigned to each zone for each condition. For example, Zone 1 is assigned for a glare condition to Tint 4, Zone 1 is assigned for a reflection condition to Tint 3, Zone 2 is assigned for a passive heating condition to Tint 1. When a condition is true, the clear sky module assigns a tint state to apply for that condition. Priority data generally refers to the list of priorities for applying conditions at each zone of the building. Priority data can be configurable by a user in certain cases. The third table illustrated in FIG. 12 is an example of a configurable priority table (e.g. configurable by a user) that let's system know which condition takes priority. In this example, priorities are given for glare condition, direct reflection condition, and passive heat condition for each zone of a building. The bottom table in FIG. 12 is an example of the tint states determined at Zone 1 over a day based on the priority data from the middle table applied to the condition values in the top table.

Figure 13:
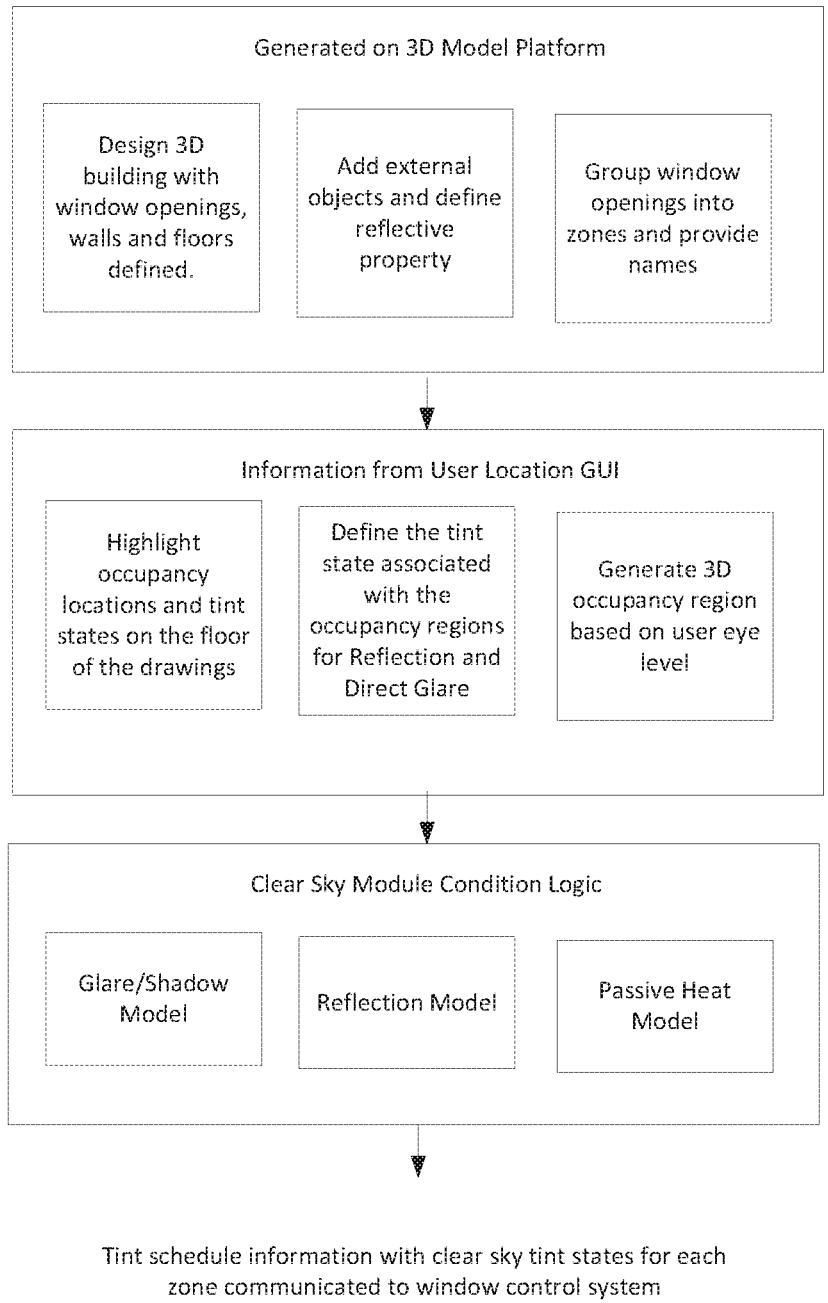
FIG. 13 is schematic depiction of the model data flow through the cloud-based systems of the system architecture shown in FIG. 8.

FIG. 13 is schematic depiction of the model data flow through the cloud-based systems of the system architecture of an implementation. A 3D model is generated on the 3D platform. The 3D model includes a 3D version of the building of with window openings, walls and floors defined. External surfaces of surrounding objects and their reflective properties are added to the 3D model. The window openings in the 3D model are grouped into zones and given names.

Information is received from the user, for example, via the user location GUI. For example, the user can highlight or otherwise identify the 2D areas of the occupancy locations and the desired tint states for these occupancy locations on the floor of the spaces of the 3D model of the building or in the architectural model used to generate the 3D model. The user can also use the GUI to define the tint state for each occupancy region that is associated with each condition such as, for example, direct glare condition and reflection condition. The user can also input a user level between a ground level up to a user eye level, which level can be used to generate a 3D extrusion of the 2D area to generate a 3D volume of the occupancy region. In one embodiment, if a user does not input a level, the level defaults to 6 feet. The clear sky module condition logic can be used to generate various condition models including, for example, a glare/shadow model, a reflection model, and a heat model. These condition models can be used to generate yearly schedule information communicated to the window control system.

Clear Sky Module—Models Setup/Customizations and Generating Scheduling Information The 3D model of the building site is initialized during a site setup process. In some implementations, the user is given the capability, e.g., through a GUI, of revising the model to customize the control of the tintable windows and/or other systems in the building. These customizations can be reviewed by the user through visualizations on the 3D modelling platform. For example, customers or other users can view what has been designed for the building after customization and how it will operate on a given day and provide "what if" scenarios. Also, different users can review the same 3D model stored on the cloud network to compare and discuss options that will cater to multiple users. For example, CSMs can review user locations, tint states by condition, priorities and expected behavior during clear sky conditions with facility managers.

The site setup process includes generating a 3D model of the building site and assigning attributes to the elements of the 3D model. The 3D model platform is typically used to generate a 3D model of the building site by stripping away unnecessary features from an architectural model of the building and creating external surfaces of objects surrounding the building.

Figure 14:
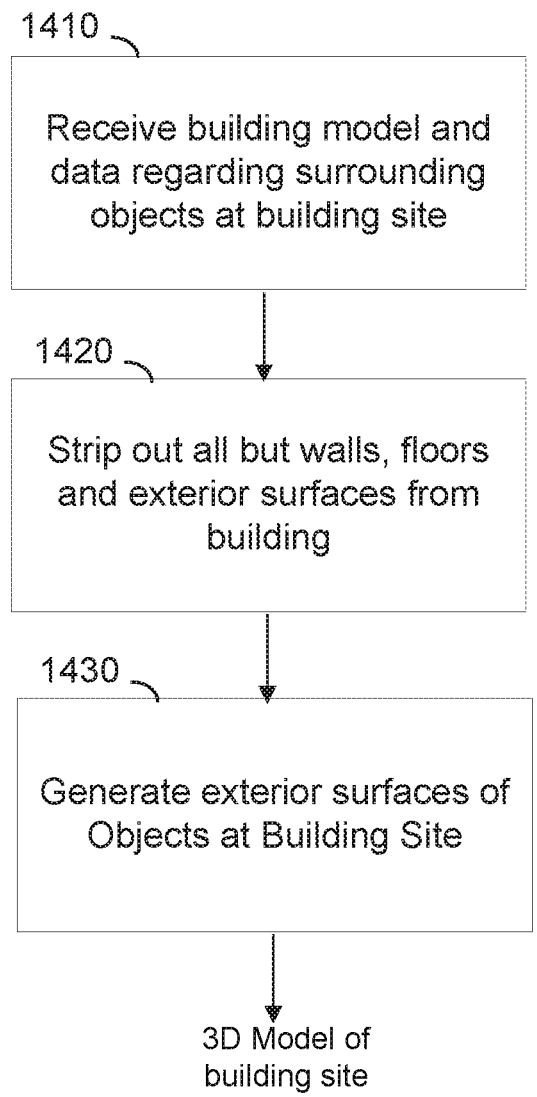
FIG. 14 is a flowchart of the general operations involved in initializing the 3D model on the 3D model platform, according to various implementations.

FIG. 14 is a flowchart of the general operations involved in initializing the 3D model on the 3D model platform according to various implementations. In one implementation, the 3D model is generated automatically from an architectural model of the building and/or the surrounding structures by stripping the architectural model of all extra elements. For example, an Autodesk® Revit model of a building may be received and stripped of all elements except walls, floors, and exterior surfaces including window openings. These operations may be implemented by the 3D modelling system. In FIG. 14, the 3D modelling system receives an architectural model for the building with the tintable windows for the structures and other objects surrounding the building at the building site (1410). At operation 1420, the 3D modelling system strips out all but the structural elements representing the window openings, walls, floors and exterior surfaces of the building with the tintable windows. At operation 1430, the 3D modelling system builds the exterior surfaces of buildings and other objects surrounding the building or removes all elements from the surrounding objects except the exterior surfaces. The output of operation 1430 is the 3D model of the building site. An example of a 3D model of a building site is shown in FIG. 9.

Figure 15:
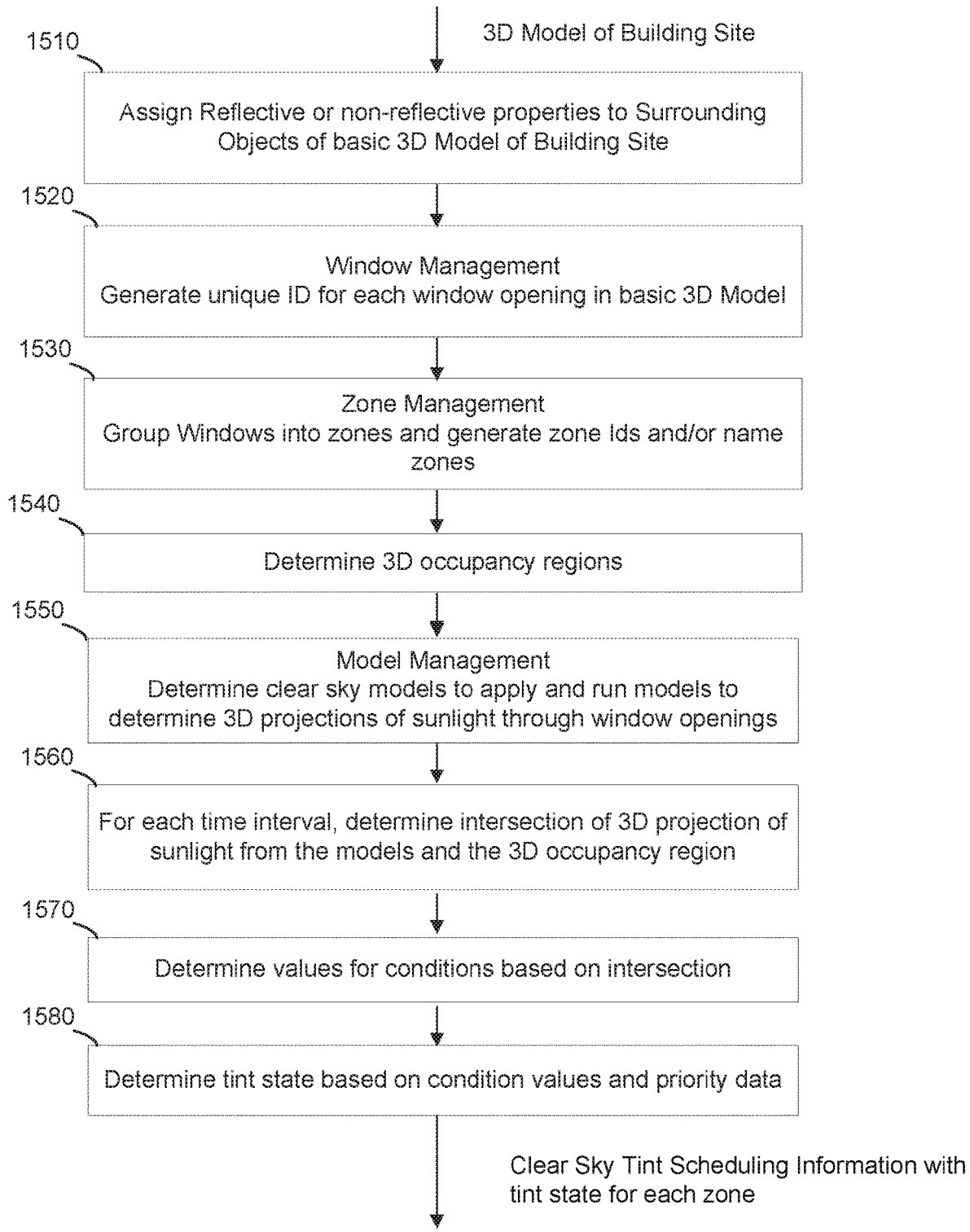
FIG. 15 is a flowchart of the general operations involved in assigning attributes to the 3D model, generating the condition models, and other operations involved to generate the clear sky scheduling information, according to various implementations.

FIG. 15 is a flowchart of the general operations involved in assigning attributes to the 3D model, generating the condition models, and other operations involved to generate the clear sky scheduling information according to certain implementations. One or more of these operations may be implemented using logic of the clear sky module. As depicted, the input for the operations is the 3D model of the building site from the 3D modelling system. At operation 1510, the reflective or non-reflective properties are assigning to the surface elements of objects surrounding the building of the 3D model of the building site. These reflective properties will be used to generate the reflective model to evaluate conditions. At 1520, a unique window ID is assigned to each window opening of the 3D model. In this window management operation, the window openings are mapped to unique window/controller IDs. In one implementation, these mappings may be validated and/or revised based on input from commissioning of the windows at installation in the building. At 1530, window openings in the 3D model are grouped into zones and zone IDs and/or names are assigned to the zones. In this zone management operation, window openings in the 3D model are mapped to zones. At 1540, the 3D occupancy regions in the model are generated and assigned tint states. For example, the user may identify 2D occupancy areas on floors of the 3D model and an eye level of an occupant and the logic of the clear sky module may generate extrusions of the 3D occupancy area to the eye level to generate the 3D region. At 1550, the clear sky models that will be applied are determined and the models are run to determine the 3D projections of sunlight through the window openings. In this model management operation, the various clear sky models, e.g., glare/shadow model and reflection model, are generated according to one implementation. The clear sky module includes a ray tracing engine that determines the directions of rays of sunlight based on different positions of the sun in the sky throughout a day of a year or other time period and determines the reflection direction and intensity from the location and reflective properties of the external surfaces of the objects surrounding the building. From these determinations, 3D projections of direct beam sunlight through the window openings in the 3D model can be determined. At 1560, the amount and duration of any intersection of the 3D projection of sunlight from the models and the 3D occupancy region is determined. At 1570, the conditions are evaluated based on the determined intersection properties at operation 1560. At operation 1580, the priority data is applied to the conditions values to determine a tint state for each zone of the building over time, e.g., in a yearly schedule. These tint states based on clear sky conditions are communicated to the window control system.

A. Window Management

During set up of the 3D model of the building site, each window opening is assigned a unique window id that corresponds to its local window controller. Assigning the window opening to a window id maps the window opening to a window controller. Each window id effectively represents each window controller that can be grouped into a zone. Alternatively, or additionally, after installation of the windows and their controllers in a building, commissioning operations may be used to determined which window is installed in which location and paired to which window controller. These associations from the commissioning process can then be used to compare to and validate the mapping in the 3D model or update the mapping in the configuration data of the 3D model. An example of a commissioning process that can determine such mappings is described in International application PCT/US2017/062634, filed on Nov. 11, 2017 and titled "AUTOMATED COMMISSIONING OF CONTROLLERS IN A WINDOW NETWORK," which is hereby incorporated by reference in its entirety. The mapping of the window opening to a window ID may also be revised based on other user customizations.

Figure 16:
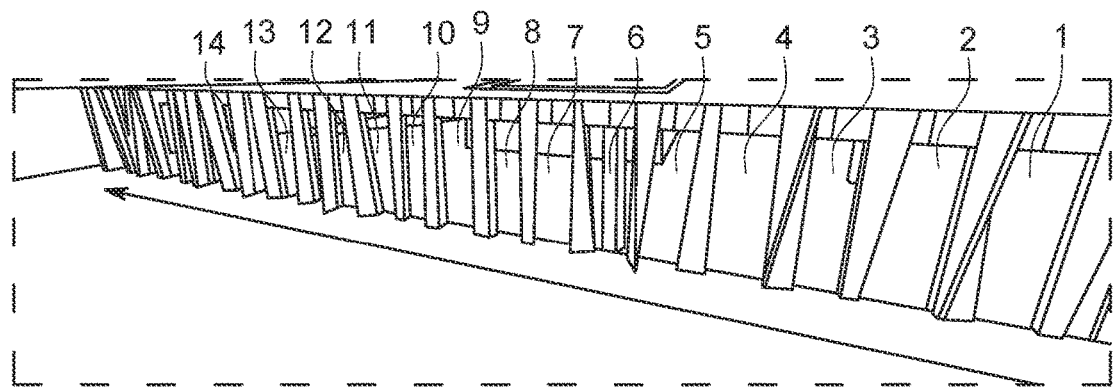
FIG. 16 is an example of a visualization of window management on the 3D modelling platform, according to various implementations.

In one implementation, the user can select window openings in the 3D model on the 3D platform and assign unique window ids. FIG. 16 is an example of such an implementation as applied to fourteen (14) window openings in a floor of a building. As shown, the user has assigned these window openings the window ids of 1-14.

B. Zone Management

Each zone of a building includes one or more tintable windows. The tintable windows are represented as openings in the 3D model. The one or more tintable windows in each zone will be controlled to behave in the same way. This means that if the occupancy region(s) associated with one of the windows in a zone experiences a particular condition, all the windows will be controlled to react to that condition. The configuration data with attributes of the 3D model include zone properties such as name, glass SHGC, and maximum internal radiation.

Figure 17A:
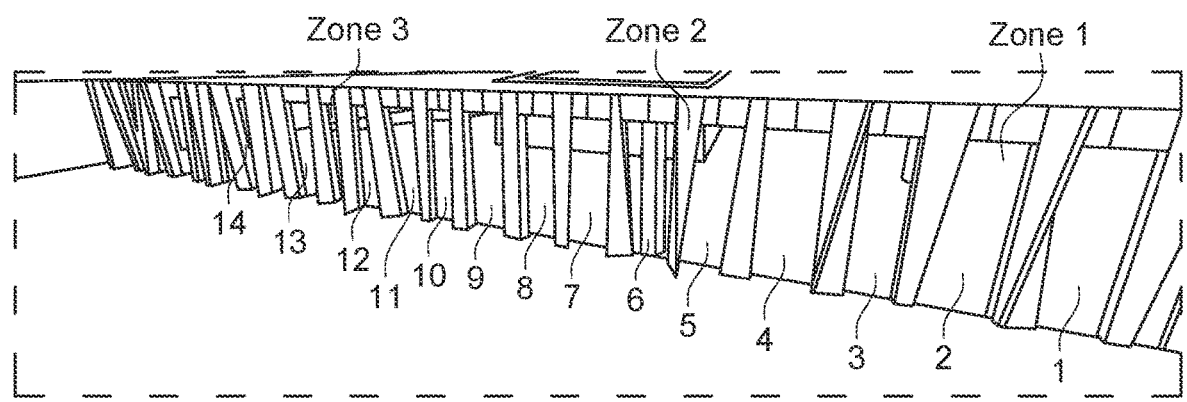
FIG. 17A is an example of a visualization of zone management on the 3D modelling platform, according to various implementations.
Figure 17B:
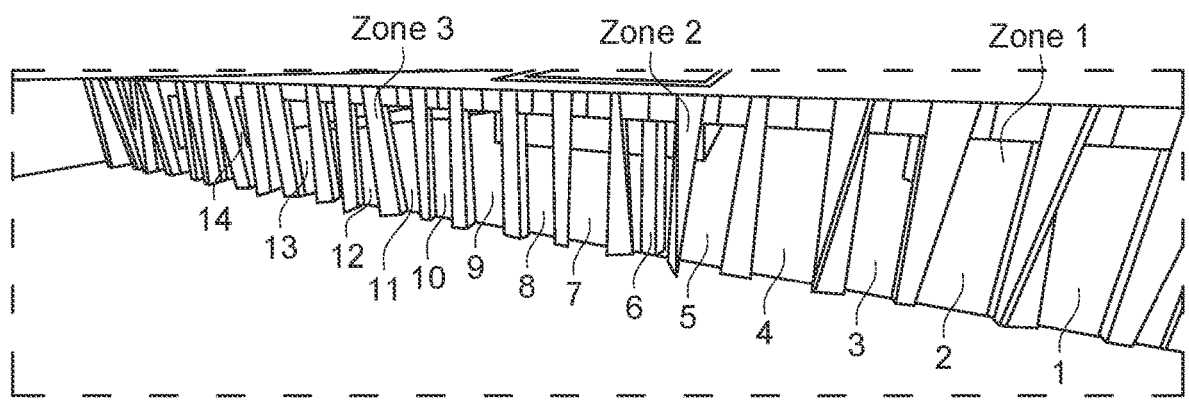
FIG. 17B is an example of a visualization of zone management on the 3D modelling platform, according to various implementations.

During zone management as part of site setup or customization of the 3D model, a user can define the window openings that will be grouped together in zones and assign properties to the defined zones. FIG. 17A is an example of an interface on the 3D modelling platform that allows a user to select window openings shown in FIG. 16 to group together as (map to) zones and name the zones. As shown, openings 1, 2, and 3 are defined as a "Zone 1," openings 4-7 are defined as "Zone 2," and openings 8-14 are defined as "Zone 3." In one aspect, the user can also combine zones so that they multiple zones behave in the same way. FIG. 17B is an example of an interface on the 3D modelling platform that allows a user to combine multiple zones from FIG. 17A. As shown, "Zone 1" and "Zone 2" are grouped together.

Figure 18:
FIG. 18 is an example of an interface that can be used by a user in zone management, according to various implementations.

FIG. 18 is an example of interface that can be used by a user to map the unmapped spaces of the 3D model to particular modelled zones. As shown, the user has selected the spaces of "Office 1," "Office 2," "Office 3," and "Office 4" to be mapped to "Zone 1." In this example, the windows associated with these spaces will be associated with "Zone 1." In one aspect, the user can select the "review mapping" button to visualize the mapped windows of the spaces in "Zone 1" on the 3D model of the building site.

Figure 19:
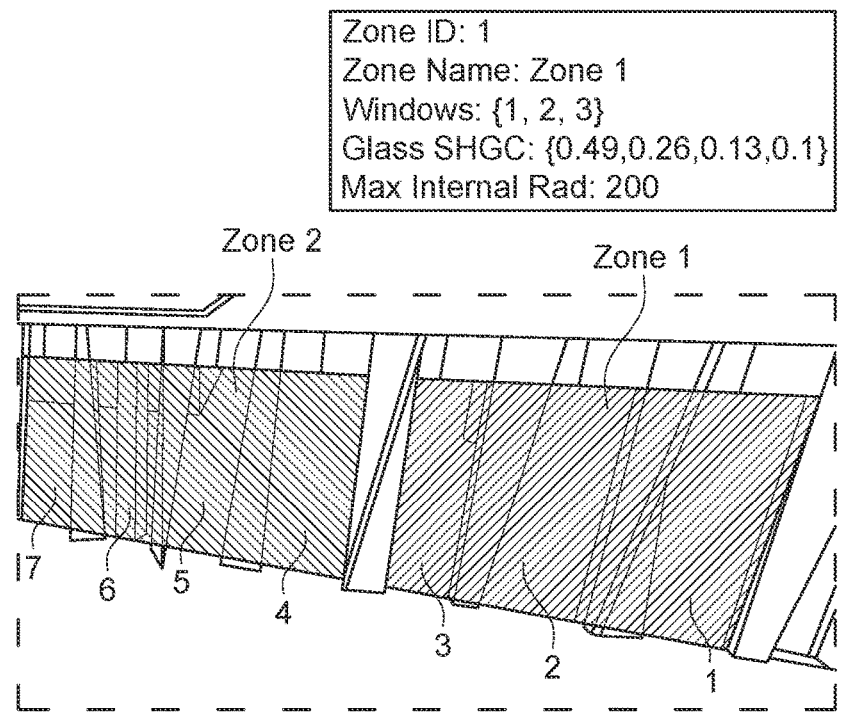
FIG. 19 is an example of an interface that can be used by a user in zone management to review the properties assigned to each zone, according to various implementations.

During zone management, each zone is assigned zone properties. Some examples of zone properties include: zone name (user defined), zone id (system generated), IDs of windows, glass SHGC, maximum allowable radiation into the space in watts per meter squared. FIG. 19 is an example of interface that can be used by review the properties assigned to each zone.

C. Generate 3D Occupancy Regions

As used herein, an occupancy region refers to a three-dimensional volume that is likely to be occupied during a particular time period. Occupancy regions are defined during site setup and can be re-defined during customization. Defining occupancy regions generally involves defining the three-dimensional volume by extruding a two-dimensional area to an occupant eye level, and assigning properties to the occupancy region. Some examples of properties include occupancy region name, glare tint state (tint state if glare condition exists), direct reflection tint state (tint states for different levels of direct reflection radiation), and indirect reflection tint state (tint states for different levels of indirect reflection radiation).

Figure 20A:
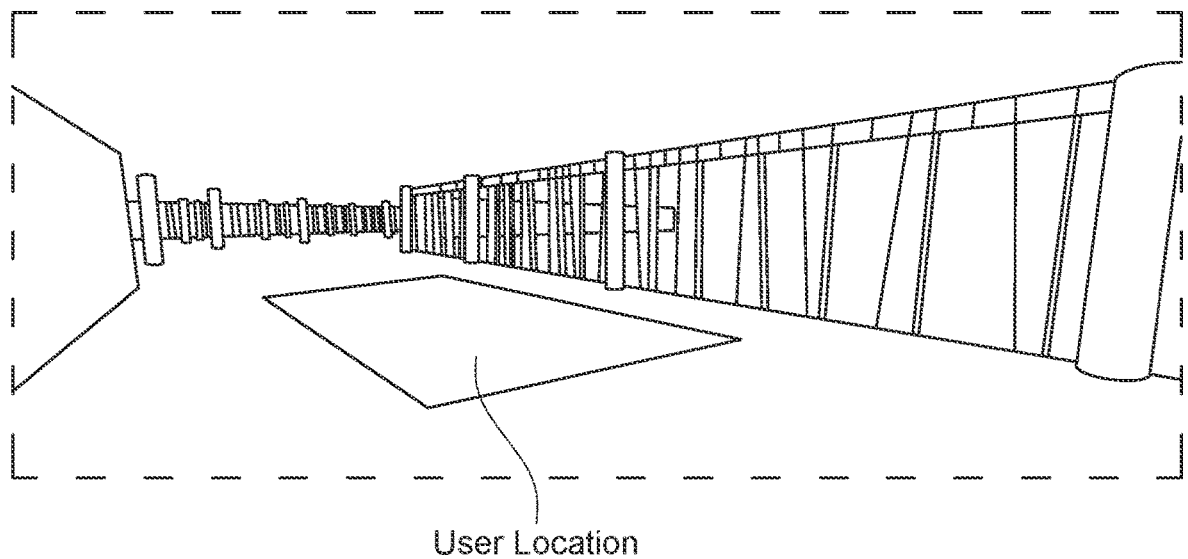
FIG. 20A is an illustrated example of a two-dimensional user location drawn on the floor of a 3D model, according to an implementation.
Figure 20B:
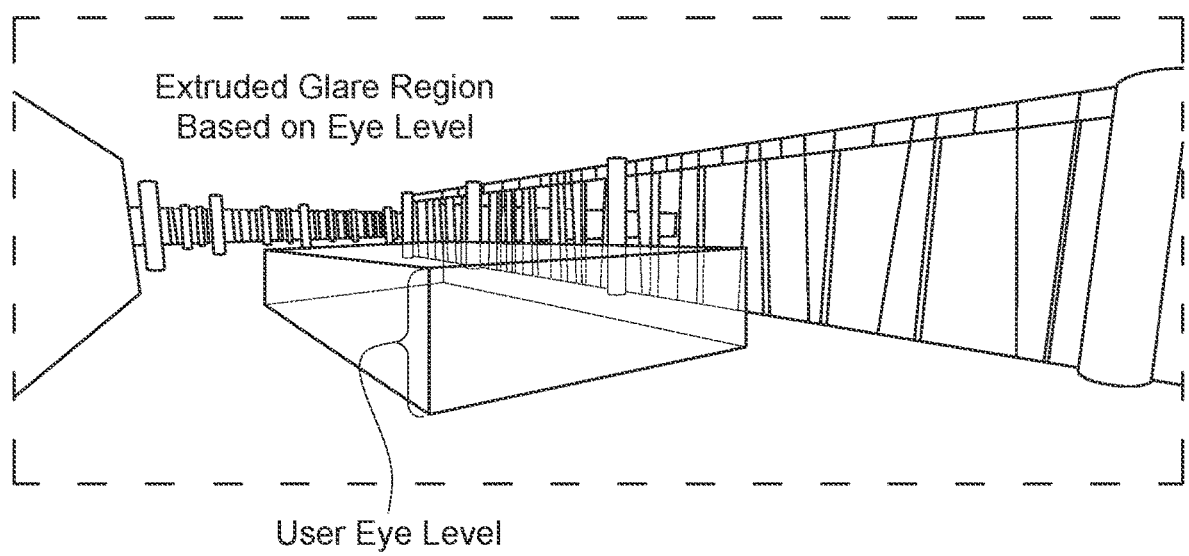
FIG. 20B is an illustrated example of a three-dimensional occupancy region generated by extruding the two-dimensional object in FIG. 20A to an upper eye level.

In certain implementations, an occupancy region is generated on the 3D modelling platform. The user draws or otherwise defines the user location as a two-dimensional shape (e.g., polygon) or shapes on the floor or other surface (e.g., desktop) of the 3D model and defines an occupant eye level. The clear sky module defines the three-dimensional occupancy region as an extrusion of the two-dimensional object from the surface to the occupant eye level (e.g., lower eye level or upper eye level). An example of a two-dimensional four-sided user location drawn on the floor of a 3D model is shown in FIG. 20A. An example of a three-dimensional occupancy region generated by extruding the two-dimensional object in FIG. 20A to an upper eye level is shown in FIG. 20B.

D. Clear Sky Models

In certain implementations, a glare/shadow model, a direct reflection model, and an indirect reflection model are generated based on the 3D model. These models are used to determine the 3D projections of sunlight through the window openings of the 3D model over time based on clear sky conditions. A raytracing engine is used to simulate the directions of rays of sunlight at the location of the sun during each time interval. The simulations are run to evaluate different glare conditions in each of the zones of a building such as a basic glare condition (direct radiation intersecting an occupancy region), direct reflection glare condition (single bounce reflection off a direct reflective surface to an occupancy region), indirect reflection glare condition (multiple bounce reflection off an indirect reflective surface(s) to an occupancy region). The simulations assume clear sky conditions and take into account shadowing on spaces and reflection by external objects surrounding the building. The simulations determine values of glare and other conditions in time intervals over a year or other time period. The schedule data includes values for each of the conditions and/or tint state for each time interval (e.g., every 10 minutes) over a time period such as a year.

Generally, the clear sky module includes logic to determine whether different conditions (e.g., glare, reflection, passive heat) exist at each zone of the building at each time interval (e.g., every ten minutes) of a time period such as a year. The clear sky module outputs schedule information of values for these conditions and/or associated tint states at each zone for each time interval. The value of a condition may be, for example, a binary value of 1 (condition does exist) or 0 (condition does not exist). In some cases, the clear sky module includes a raytracing engine that determines the direction of rays of sunlight (direct or reflected) based on the location of the sun at different times.

In one aspect, the glare condition is evaluated based on multiple glare areas from the models in a single occupancy region. For example, light projections can intersect different occupancy areas within a single occupancy region. In one aspect, the conditions are evaluated based on multiple elevations within in a single zone.

Glare Control

A determination of the glare condition is a function of the intersection of a 3D projection of sunlight from the glare (absence of shadow) model and/or the direct reflection (one bounce) model with the three-dimensional occupancy region. A positive determination of basic glare from the glare model is a function of the % of total intersection with the 3D occupancy region and the duration of the intersection. The determination of reflection glare based on the reflection model is a function of the duration of the intersection.

The clear sky module includes logic for evaluating the existence of a glare condition based on the glare (absence of shadow) model and/or the direct reflection (one bounce) model based on surrounding objects to the building.

According to one implementation, for each zone, the logic determines from the glare model if 3D projections of direct sunlight through the window openings of the zone intersect any of the three-dimensional occupancy regions in the zone. If the % intersection is greater than the minimum % of total Intersection (minimum threshold of overlap from the window projection into the occupancy region before glare condition is considered) and the duration of the intersection is greater than the minimum duration of intersection (minimum amount of time the intersection must occurs before it becomes significant), then a glare condition value (e.g., 1) and tint state associated with the glare condition is returned. If the logic determines from the glare model that a 3D projection of direct sunlight through the window openings does not intersect any of the three-dimensional occupancy regions in the zone, for example, zone is in a shadow, then a glare condition value (e.g., 0) and tint state associated with no glare condition is returned. The logic takes the maximum tint state of the zones that may be linked together. If there are no intersections, a lowest tint state is returned (e.g., tint 1).

In another implementation, the logic determines for each time interval, for each zone of tintable windows (collection of window openings), if the sun is directly intersecting any of the three-dimensional occupancy regions. If any of the occupancy regions are simultaneously intersected, output is condition does exist. If none of the occupancy regions are intersected, the condition does not exist.

Figure 21:
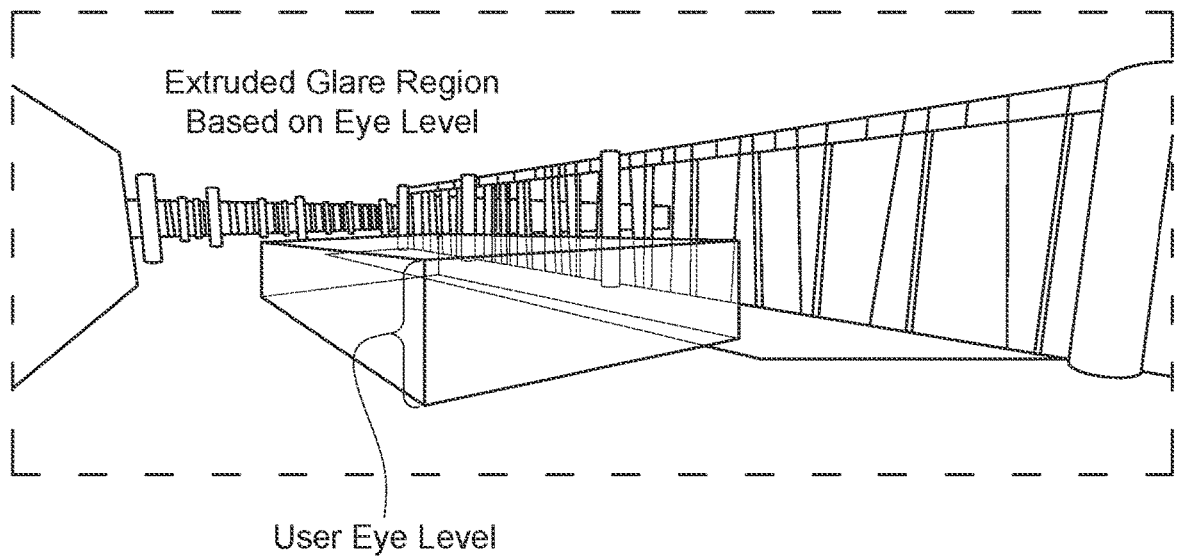
FIG. 21 is an illustrated example of using the glare/shadow model that returned a no glare condition based on the three-dimensional occupancy region shown in FIG. 20B.

FIG. 21 is an example of using a simulation of the glare/shadow model that did not return a glare condition based on basic glare. In this example, the simulation generated a low total intersection of glare with the 3D occupancy region and the glare was not present long throughout the day so that the clear sky module did not return a glare condition.

Figure 22:
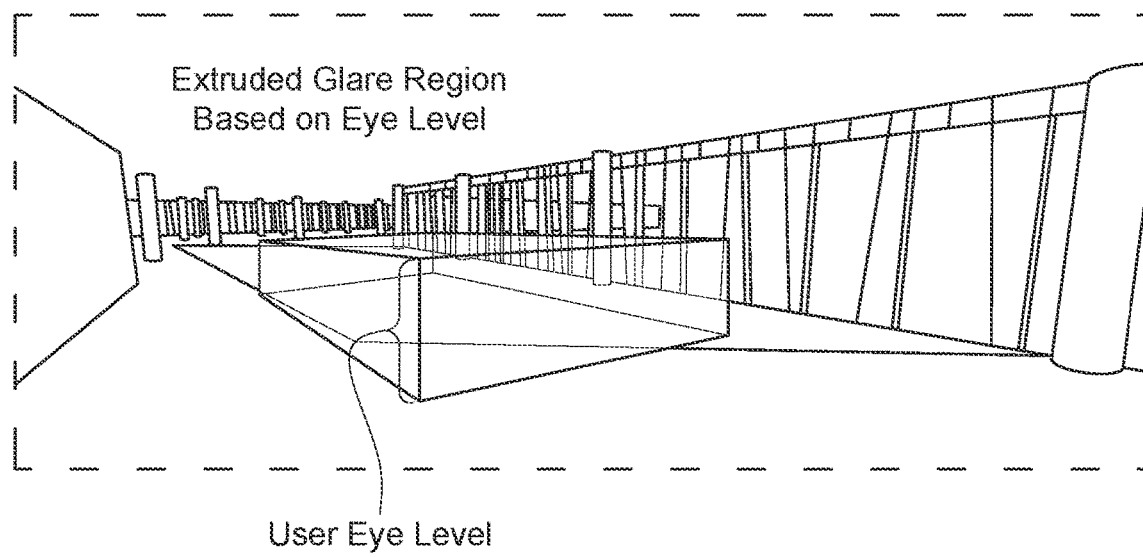
FIG. 22 is an illustrated example of using the direct reflection (one bounce) model that returned a glare condition based on the three-dimensional occupancy region shown in FIG. 20B.

FIG. 22 is an example of using a simulation of the direct reflection (one bounce) model that returned a glare condition based on glare from direct one-bounce reflection. In this example, the simulation generated a high total intersection with the 3D occupancy region and extended periods of glare occurred on this day so that glare value was returned.

Reflected Radiation Control

The clear sky module includes logic for evaluating the existence of a reflection condition under clear sky conditions based on the models and for determining the lowest state to keep the internal radiation below the maximum allowable internal radiation. The logic determines a radiation condition based on the direct normal radiation hitting the window openings of a zone. The logic determines a tint state based on the clearest tint state that can keep the normal radiation below the defined threshold for that zone.

The logic determines the external normal radiation on the tintable window from the 3D model and calculates the internal radiation for each tint state by multiplying the determined level of external radiation by the glass SHGC. The logic compares the maximum internal radiation for the zone to the calculated internal radiation for each of the tint states and chooses the lightest calculated tint state that is below the maximum internal radiation for that zone. For example, the external normal radiation from the model is 800 and the maximum internal radiation is 200 and the T1 SHGC=0.5, T2=0.25, and T3=1. The logic calculated the internal radiation for each tint state by multiplying the determined level of external radiation by the glass SHGC: Calc T1 (800)*.5=400, Calc T2 (800)*.25=200, and Calc T3 (800)*.1=80. The logic would select T2 since T2 is lighter than T3.

In another implementation, the logic determines for each zone of windows (collection of openings), if the sun has a single bounce off of the external objects. If there is a reflection to any of the occupancy regions, then reflection condition does exist. If reflection is not on any of the occupancy regions, the reflection condition does not exist.

Passive Heat Control

In certain implementations, the clear sky module includes logic for evaluating the existence of a passive heat condition that sets a darker tinting state in the windows of a zone based on output from the clear sky models. The logic determines the external solar radiation hitting the tintable windows under clear sky conditions from the clear sky models. The logic determines the estimated clear sky heat entering the room based on the external radiation on the tintable windows. If the logic determines that the estimated clear sky heat entering the room is greater than a maximum allowable value, then the passive heat conditions exists and a darker tint state is set to the zone based on the passive heat condition. The maximum allowable value may be set based on the external temperature to the building and/or user input. In one example, if the external temperature is low, the maximum allowable external radiation may be set very high to allow for an increased level of passive heat to enter the building space.

E. Building Site Clear Sky Model Customizations

Figure 23:
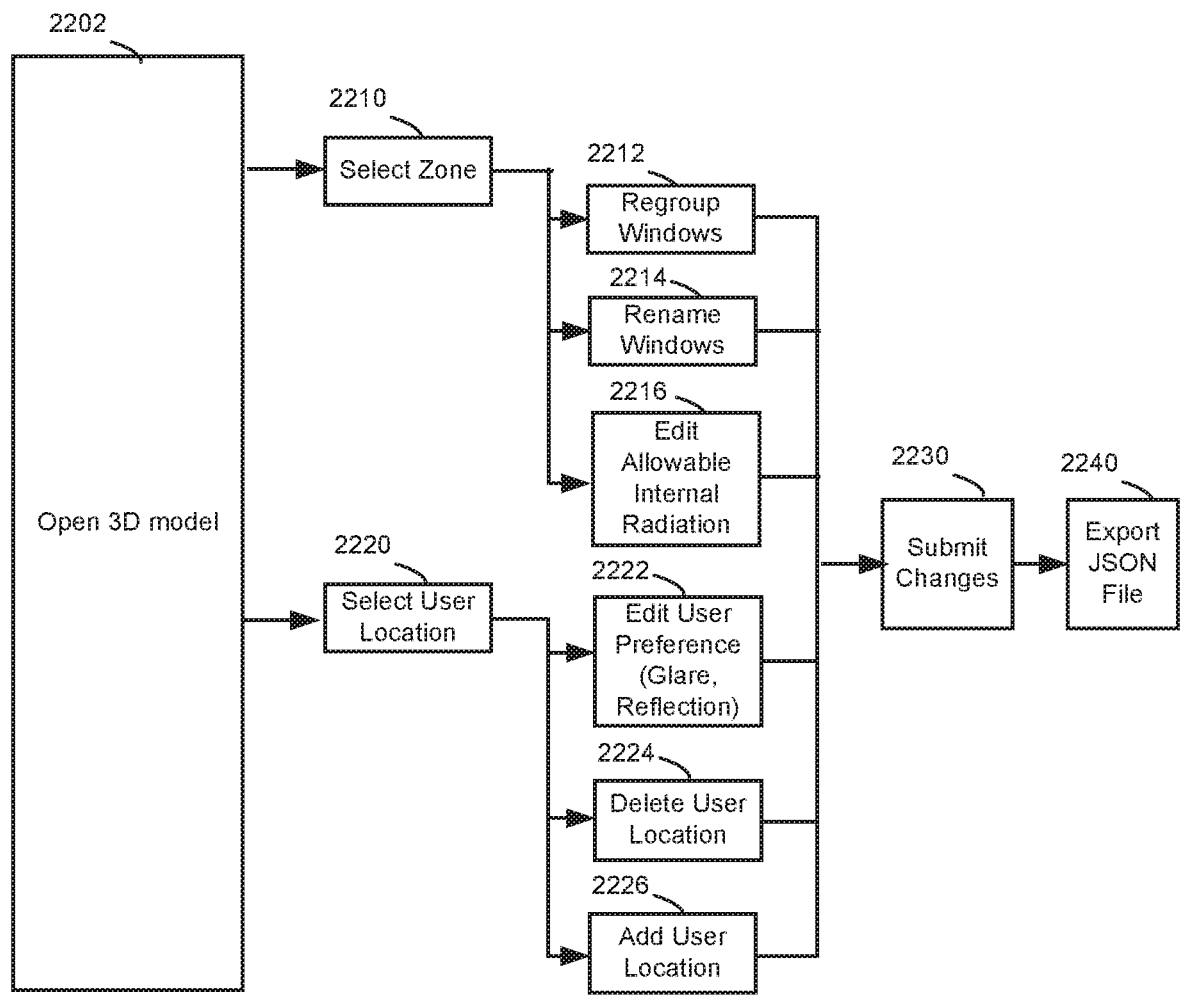
FIG. 23 is a flowchart of the actions and processes for implementing user input to customize the clear sky 3D model of a building site, according to one aspect.

FIG. 23 is a flowchart of the actions and processes for implementing user input to customize the clear sky 3D model of a building site, according to one aspect. These site editing operations can be implemented by logic on the clear sky module 820. The attributes of the clear sky model can be editable (customizable) and defined/redefined at any time. The user can enter input via a GUI, for example. In the flowchart, the process starts by opening the 3D model (2202). The user then has the options of selecting a zone to edit or a user location to edit (2210, 2220). If the user selects to edit a zone, the user can regroup the windows defined to that zone (2212), rename the zone (2214), and/or edit the allowable internal radiation or other property of the zone (2216). If the If the user selects a user location to edit (2220), the user edit the user preferences to select a glare model or a reflection model to map to the user location (2222), and or delete a user location (2224) or add a user location (2226). Once the edit is made or edits are made, the user submits the changes to update the clear sky 3D model of the building site (2230). The changes are used to generate new schedule data based on the revised clear sky 3D model and the schedule data is exported and communicated to the window control module (2240).

In certain implementations, the system architecture includes GUI that allows the user to make changes to attributes of the clear sky model to see the changes to the model and/or changes to the schedule data in visualizations on the 3D modeling platform. Visualizations of the building site on the 3D modeling platform can be used for the purposes of customization.

In one example, the GUI can include a slider or other interface that allows the user to quickly simulate daily changes in the path of the sun and to visualize glare, shadows, and heat caused by the sun over the course of a day.

In addition to visualizations of direct and indirect reflection, glare, shadows, and heat at one or more locations on or in a building, tint states of windows can also be visualized via interior or exterior views of the windows, where window tint is determined by control logic as described below. For example, a user can visualize window tints and changes made thereto by control logic for each time/location of the sun. Such visualizations can be used by a user to verify proper operation of the models and/or control logic.

III. Modules

Module A

Module A embodies control logic and rules that are used to control glare and reflectivity in a building under clear sky conditions. However, because the clear sky module used by Module A does not account for changes in the weather, tint decisions made by Module A alone can result in a less than optimal tint being applied to a window. In one embodiment, changes in weather are addressed via use of an additional Module B.

Figure 24:
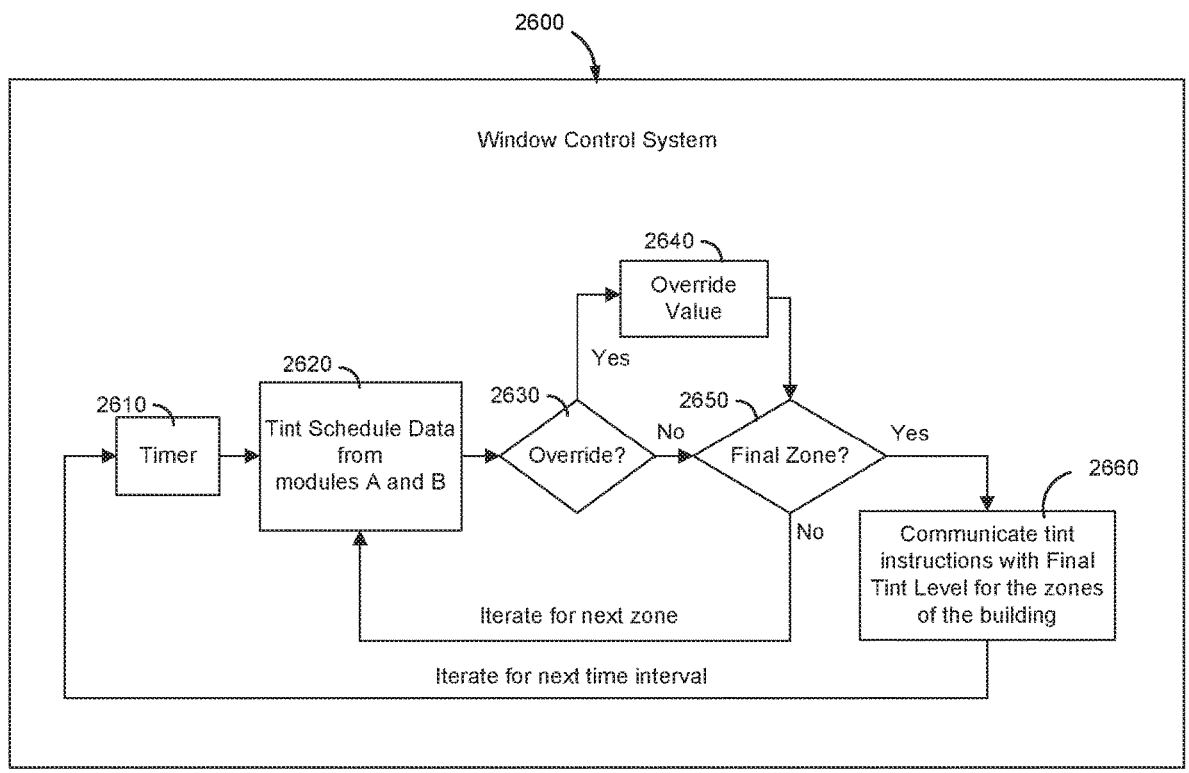
FIG. 24 depicts a window control system with general control logic to control the one or more zones of tintable windows in a building, according to various implementations.

FIG. 24 depicts a window control system 2600 with general control logic implemented by the window control system 2600 that communicates tint instructions to transition tintable windows within one or more zones in a building. At operation 2620, control logic determines a final tint level for each window and/or zone based on rules output by Module A and Module B. For example, in one embodiment, window control system 2600 includes a master controller that implements the control logic to make tinting decisions and communicate the final tint level for each zone to the local window controller(s) controlling the tintable windows of that zone. In one implementation, the tintable windows are electrochromic windows, each including at least one electrochromic device. For example, each tintable window may be an insulated glass unit with two glass lites having an electrochromic device on at least one of these lites. The control logic is performed by one or more processors of the window control system.

Figure 25:
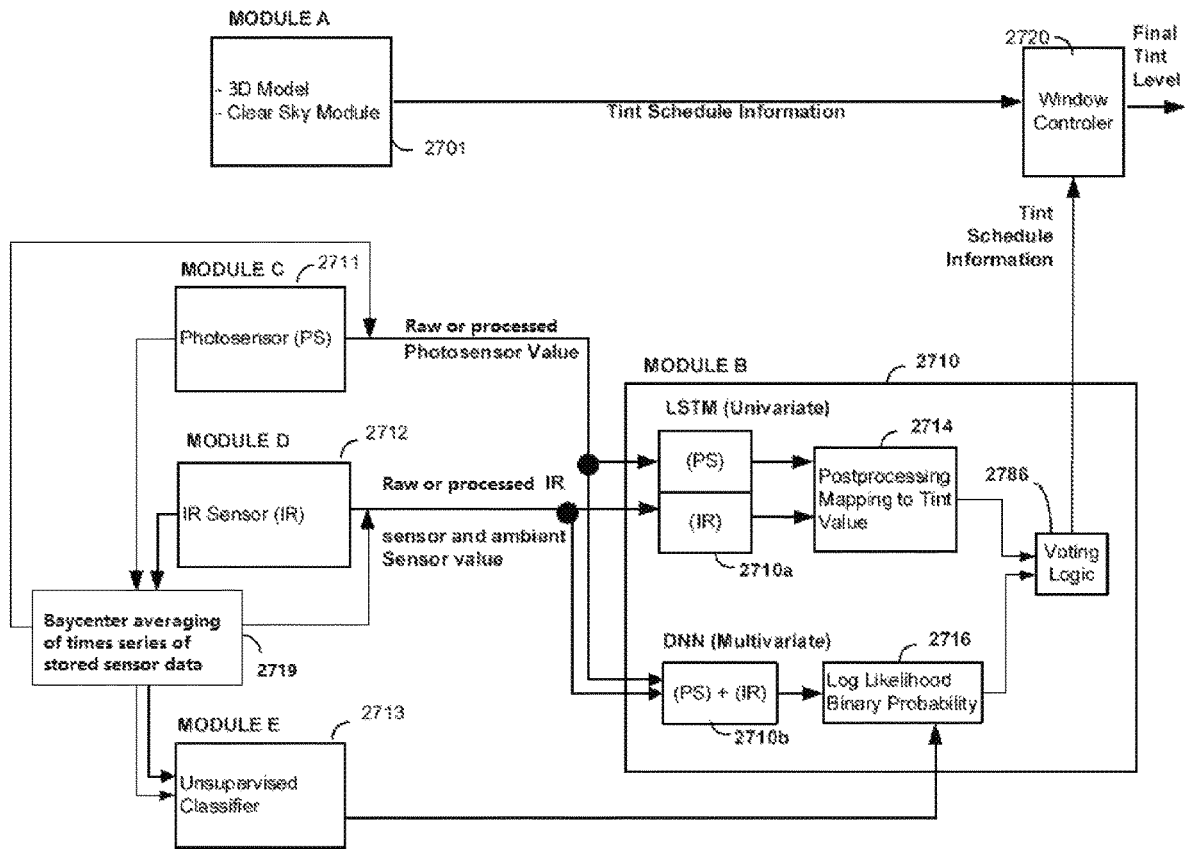
FIG. 25 depicts a flowchart with control logic for making tint decisions based on outputs from Modules A-E, according to various implementations.

FIG. 25 is another representation of a window control system 2700 that includes a window controller 2720, e.g., a master controller or a local window controller. The window control system 2700 also includes control logic implemented by one or more components (e.g., other controllers) of the window control system 2700. As illustrated, the window controller 2720 receives tint schedule information, e.g., rules, from other components of the window controller system 2700 in accordance with the illustrated control logic.

In FIG. 25, the control logic includes logic embodied by a Module B 2710. Module B 2710 is configured to forecast weather condition(s) at a particular geographical location of the site at a future time. In one embodiment, the forecasts are made based on location-specific measurements provided by Module C 2711 and Module D 2712. In one embodiment, the forecast of a weather condition is provided in the form of one or more rules that can be used to initiate changes in window tint at the current time so as to complete the transition by the future time so that the interior light intensity, glare and reflection at the future time is optimized for the weather conditions forecasted to occur at that future time. The tint transition occurs in anticipation of the future condition. By doing so, it appears to an observer as if the tint in the window is being controlled in response to real time, or close to real time, changes in weather conditions. Module B includes a LSTM (univariate) sub-module 2710*a*, a post processing mapping to tint value sub-module 2714, a DNN (multivariate) module 2710*b*, a binary probability sub-module 2716, and a voting sub-module 2786. The illustrated control logic also includes a Module A 2701 with a 3D model and a clear sky model, a Module C 2711 with logic for determining raw or filtered photosensor value(s) from photosensor reading(s), a Module D 2712 with logic for determining raw or filtered IR sensor and ambient sensor value(s) from infrared and/or ambient temperature reading(s), and a Module E with an unsupervised classifier sub-module 2713. These and other illustrated components are described in more detail throughout Section III.

Module C

In one embodiment, values from Module C 2711 are provided to Module B 2710 in the form of raw or filtered values/signals that are representative of current environmental conditions measured by one or more photosensors. In one embodiment, the raw or filtered signals/values are provided in the form of a filtered rolling mean of multiple photosensor readings taken at different sample times, where each photosensor reading is a maximum value of measurements taken by the photosensors. In one embodiment, each photosensor reading comprises a real-time irradiance reading.

Module D

In one embodiment, values from Module D 2712 are provided to Module B 2710 in the form of raw or filtered values/signals representative of current environmental conditions measured by one or more infrared (IR) sensors. In one embodiment, the raw or filtered values/signals are provided in the form of a filtered rolling median of multiple infrared sensor readings taken at different sample times, where each reading is a minimum value of measurements taken by the one or more infrared sensors.

In one embodiment, infrared sensor measurements and ambient temperature sensor measurements include sky temperature readings ($T_{sky}$), ambient temperature readings from local sensors at the building ($T_{amb}$) or from weather feed ($T_{weather}$) and/or the difference between $T_{sky}$-$T_{amb}$. The filtered infrared sensor values are determined based on the sky temperature readings ($T_{sky}$) and the ambient temperature readings from local sensors ($T_{amb}$) or from weather feed ($T_{weather}$). The sky temperature readings are taken by infrared sensor(s). The ambient temperature readings are taken by one or more ambient temperature sensors. The ambient temperature readings may be received from various sources. For example, the ambient temperature readings may be communicated from one or more ambient temperature sensors located onboard an infrared sensor and/or a standalone temperature sensor of, for example, a multi-sensor device at the building. As another example, the ambient temperature readings may be received from weather feed.

In one embodiment, Module D 2712 includes logic to calculate filtered IR sensor values using a Cloudy Offset value and sky temperature readings ($T_{sky}$) and ambient temperature readings from local sensors ($T_{amb}$) or from weather feed ($T_{weather}$), and/or a difference, delta ($\Delta$), between sky temperature readings and ambient temperature readings. The Cloudy Offset value is a temperature offset that corresponds to the threshold values that will be used to determine a cloudy condition by the logic in Module D. The logic of Module D may be performed by one or more processors of a network controller or a master controller. Alternatively, the logic of Module D may be performed by one or more processors of a sensor device comprised of one or more photosensor and infrared sensor.

At operation 2810, the processor(s) performing the operations of Module D receives as input sensor readings at a current time. The sensor readings may be received via a communication network at the building, for example, from a rooftop multi-sensor device. The received sensor readings include sky temperature readings ($T_{sky}$) and ambient temperature readings from local sensors at the building ($T_{amb}$) or from weather feed ($T_{weather}$) and/or readings of the difference between $T_{sky}$ and $T_{amb}$ ($\Delta$). The ambient temperature readings from local sensors at the building ($T_{amb}$) are measurements taken by ambient temperature sensors located either onboard an sensor device or separate from the sensor device. Ambient temperature sensor readings can alternatively be from weather feed data.

In one implementation, a Module D 2712 receives and uses raw sensor readings of measurements taken by two or more IR sensor devices at a building (e.g., of a rooftop multi-sensor device), each IR sensor device having an onboard ambient temperature sensor for measuring ambient temperature ($T_{amb}$) and an onboard infrared sensor directed to the sky for measuring sky temperature ($T_{sky}$) based on infrared radiation received within its field-of-view. Two or more IR sensor devices are typically used to provide redundancy. In one case, each infrared sensor device outputs readings of ambient temperature ($T_{amb}$) and sky temperature ($T_{sky}$). In another case, each infrared sensor device outputs readings of ambient temperature ($T_{amb}$), sky temperature ($T_{sky}$), and the difference between $T_{sky}$ and $T_{amb}$, delta $\Delta$. In one case, each infrared sensor device outputs readings of the difference between $T_{k}y$ and $T_{amb}$, delta $\Delta$. According to one aspect, the logic of Module D uses raw sensor readings of measurements taken by two IR sensor devices at the building. In another aspect, the logic of Module D uses raw sensor readings of measurements taken by 1-10 IR sensor devices at the building.

In another implementation, Module D 2712 receives and uses raw sky temperature ($T_{sky}$) readings taken by infrared sensors at a building which are directed to the sky to receive infrared radiation within their field-of-view and ambient temperature readings from weather feed data ($T_{weather}$). The weather feed data is received from one or more weather services and/or other data sources over a communication network. Weather feed data can include other environmental data associated with weather conditions such as, for example, cloud coverage percentage, visibility data, wind speed data, percentage probability of precipitation, and/or humidity. Typically, weather feed data is received in a signal through a communication network by a window controller. According to certain aspects, the window controller can send a signal with a request for the weather feed data through a communication interface over the communication network to one or more weather services. The request usually includes at least the longitude and latitude of the location of the window(s) being controlled. In response, the one or more weather services send a signal with weather feed data through the communication network through a communication interface to the window controller. The communication interface and network may be in wired or wireless form. In some cases, a weather service may be accessible through a weather website. An example of a weather website can be found at www.forecast.io. Another example is the National Weather Service (www.weather.gov). The weather feed data may be based on a current time or may be forecasted at a future time. Examples of logic that uses weather feed data can be found in international application PCT/US16/41344, filed on Jul. 7, 2016 and titled "CONTROL METHOD FOR TINTABLE WINDOWS," which is hereby incorporated by reference in its entirety.

In one implementation, a temperature value ($T_{calc}$) is calculated based on sky temperature readings from one or more infrared sensors, ambient temperature readings from either one or more local ambient temperature sensors or from weather feed, and a Cloudy Offset value. The Cloudy Offset value is a temperature offset which corresponds to the first and second threshold values used to determine the cloud condition in Module D 2712. In one implementation, the Cloudy Offset value is −17 millidegrees Celsius. In one example, a Cloudy Offset value of −17 millidegrees Celsius corresponds to a first threshold value of 0 millidegrees Celsius. In one implementation, the Cloudy Offset value is in the range of −30 millidegrees Celsius to 0 millidegrees Celsius.

In one implementation, the temperature value ($T_{calc}$) is calculated based on sky temperature readings from two or more pairs of thermal sensors, each pair of thermal sensors having an infrared sensor and an ambient temperature sensor. In one case, the thermal sensors of each pair are integral components of an IR sensor device. Each IR sensor device has an onboard infrared sensor and an onboard ambient temperature sensor. Two IR sensor devices are typically used to provide redundancy. In another case, the infrared sensor and ambient temperature sensor are separate. In this implementation, the temperature value is calculated as:

$$T_{calc} = \text{minimum}(T_{sky1}, T_{sky2}) - \text{minimum}(T_{amb1}, T_{amb2}, \ldots) - \text{Cloudy Offset} \quad \text{(Eqn. 1)}$$

$T_{sky1}$, $T_{sky2}$, . . . are temperature readings taken by the multiple infrared sensors and $T_{amb1}$, $T_{amb2}$, . . . are temperature readings taken the multiple ambient temperature sensors. If two infrared sensors and two ambient temperature sensors are used, $T_{calc} = \text{minimum}(T_{sky1}, T_{sky2}) - \text{minimum}(T_{amb1}, T_{amb2}) - \text{Cloudy Offset}$. Minimums of the readings from multiple sensors of the same type are used to bias the result toward lower temperature values that would indicate higher cloud cover and result in higher tint level in order to bias the result toward avoiding glare.

In another implementation, Module D 2712 may switch from using a local ambient temperature sensor to using weather feed data when ambient temperature sensor readings become unavailable or inaccurate, for example, where an ambient temperature sensor is reading heat radiating from a local source such as from a rooftop. In this implementation, the temperature value ($T_{calc}$) is calculated based on sky temperature readings and ambient temperature readings from weather feed data ($T_{weather}$). In this implementation, the temperature value is calculated as:

$$T_{calc} = \text{minimum}(T_{sky1}, T_{sky2}) - T_{weather} - \text{Cloudy Offset} \quad \text{(Eqn. 2)}$$

In another implementation, the temperature value ($T_{calc}$) is calculated based on readings of the difference, Δ, between sky temperature and ambient temperature as measured by two or more IR sensor devices, each having an onboard infrared sensor and ambient temperature sensor. In this implementation, the temperature value is calculated as:

$$T_{calc} = \text{minimum}(\Delta_1, \Delta_2, \ldots) - \text{Cloudy Offset} \quad \text{(Eqn. 3)}$$

$\Delta_1$, $\Delta_2$, . . . are readings of the difference, Δ, between sky temperature and ambient temperature measured by multiple IR sensor devices. In the implementations that use Eqn. 1, Eqn. 2, and Eqn. 3, the control logic uses the difference between the sky temperature and the ambient temperature to determine the IR sensor value input to Module D 2712 to determine a cloud condition. Ambient temperature readings tend to fluctuate less than sky temperature readings. By using the difference between sky temperature and ambient temperature as input to determine tint state, the tint states determined over time may fluctuate to a lesser degree.

In another implementation, the control logic calculates $T_{calc}$ based only on sky temperature readings from two or more infrared sensors. In this implementation, the IR sensor value determined by Module D 2712 is based on sky temperature readings and not on ambient temperature readings. In this case, Module D determines a cloud condition based on sky temperature readings. Although the above described implementations for determining $T_{calc}$ are based on two or more redundant sensors of each type, it would be understood that the control logic may be implemented with readings from a single sensor.

Module B

In one embodiment, Module B 2710 provides weather forecasts using a sub module 2710a having logic that uses machine learning and deep learning on a time series of weather data provided by Module C and Module D. Sub module 2710a includes a recurrent neural network model logic to implement long short-term memory (LSTM) to map sequence to sequence (e.g., using a seq2seq encoder/decoder framework) predictions as is known to those skilled in the art. With an LSTM seq2seq prediction or other LSTM prediction, a user-defined duration of historical weather data (e.g., 3 minutes of memory, 5 minutes of memory, etc.) can be used to generate short-term forecasts of a user-defined length (e.g., 4 minutes into the future) on a live, rolling basis, as new sensor values from Modules C and D are acquired. Such parametric flexibility ensures that memory of changing weather conditions are only retained on a scale that are useful to a forecasting window of interest.

In one embodiment, an LSTM seq2seq prediction is implemented such that it leverages discretization of sensor values from Modules C and D into three distinct ranges and corresponding tint recommendations (2, 3, and 4). The level of precision required by weather forecasts is thus defined by a timely correspondence to an appropriate range of sensor values as real-time data changes. This level of precision allows for periods of greater volatility (sudden changes in conditions) to be handled using forecast smoothing and other regularizing control structures designed to limit over-responsive model behavior. In one embodiment, implementation of LSTM seq2seq prediction uses a 5-minute rolling mean of maximum photo sensor readings and a rolling median of minimum IR sensor readings, and averages a series of four (4) forecasts at T+4 minutes to produce a representative measure of the immediate future. Within the constraints defined by an existing 5-minute window control system command cycle, this implementation supports the introduction of additional control structures to ensure that changes in commands are only made on a timeframe to which existing hardware is able to respond (e.g., ignoring command changes whose duration is less than a user defined number of minutes).

In one embodiment, the LSTM submodule 2710a of Module B 2710 processes outputs from Module C 2711 and Module D 2712 as univariate inputs according to LSTM seq2seq methodologies known to those skilled in the art, where one univariate variable corresponds to maximum photo sensor values provided by Module C and the other univariate input corresponds to minimum IR sensor values provided by Module D. Processing each input according to the LSTM seq2seq methodology provides a real value that is post processed and regularized by a post processing module 2714 to provide an output value that is mapped to a tint value. In some embodiments, it has been found that use of an LSTM seq2seq methodology is more suited for providing relatively short-term predictions than for providing longer term predictions.

To obtain relatively longer term weather forecast predictions based on values provided by Modules C and D, Module B 2710 includes a sub-module 2170b having logic that implements dense neural network (DNN) multivariate forecasting as is known to those skilled in the art. In one embodiment, the DNN methodology feature engineers relationships between photosensor and IR sensor values provided by Modules C and D that are most useful for forecasting weather or environmental conditions occurring on a longer timeframe. Where the LSTM methodology outputs real valued predictions (mapped onto their corresponding recommended tint regions), DNN forecasting is implemented as a binary classifier whose log-likelihood output probabilistically models sunny vs. non-sunny conditions. The use of binary classification entails flexibility in determining (optimizing, site-specifying, and user-personalizing) a confidence threshold (between zero and one) above which the model forecasts a sunny (rather than non-sunny) condition. Lower confidence thresholds may be set to proactively prevent high-risk glare conditions. Higher confidence thresholds may be set in the interest of maximizing interior natural light. In one embodiment, the DNN output is based on a user-configurable threshold where an output greater than or equal to the threshold is treated as a sunny condition (e.g. a binary value of 1) and where an output lower than the threshold is treated as a not-sunny condition (e.g. a binary value of 0).

In certain embodiments, the DNN and LSTM models reside either on a server on a cloud network and/or on a window controller such as a master window controller or group of window controllers of a distributed network of window controllers. Various commercially-available machine learning frameworks can reside on the cloud server or on the window controller(s) to define, train, and execute the DNN and/or LSTM models. An example of a commercially-available machine learning framework is TensorFlow® provided by Google®, California. An example of a commercially-available machine learning frameworks is Amazon® SageMaker® provided by Amazon Web Services of Seattle, Washington.

In one embodiment, the DNN submodule 2170b uses a DNN binary classifier that generates 8-minute weather forecasts using 6 minutes of history. Unlike univariate LSTM forecasting, the DNN binary classifier need not run in real-time, alleviating computational load on existing hardware. To account for site-specific differences (in geo-location, seasonal variation, and continuously changing weather fronts), the DNN binary classifier can be run overnight using two to three weeks of historical data, which is updated daily, dropping the oldest day and bringing in the most recent data in retraining the model each night. Such rolling daily updates ensure that the classifier adapts in keeping with the pace and qualitative nature of the changing weather conditions. Upon retraining, model parameter weights are adjusted to receive new inputs for generating forecasts for the duration of the subsequent day.

Together, multivariate DNN and univariate LSTM forecasting sub-modules 2710a, 2710b provide foresight in anticipating and responding to changes in the environment. In one embodiment, to mitigate the potential impact of long-term under-responsiveness by DNN and short-term over-reactivity by LSTM, Module B 2710 is configured to provide an output based on a rules-based decision made by the voting logic 2786. For example, if an LSTM output for (PS) maps to a tint state of 3 (i.e. sun is present), the LSTM output for (IR) maps to a tint state of 3 (i.e. sun is present), and the DNN output provides a binary output of "0" (where "0" indicates a forecast of "cloudy", and "1 indicates a forecast of "sunny"), a majority of LSTM (PS), LSTM (IR), and DNN (PS and IR) is used as a forecast that an environmental condition will be sunny at a future time. In other words, the agreement of two of LSTM (PS), LSTM (IR), and DNN (PS and IR) is the rule on which an output is provided to a window controller 2720. The above majority should not be considered limiting, for in other embodiments, other majorities and minorities provided by LSTM (PS), LSTM (IR), and DNN (PS and IR) could also be used to provide forecasts.

In one embodiment, future forecasts of weather conditions made by Module B 2710 are compared by window controller 2720 against tint rules provided by Module A 2701 and, for example, if the output of Module B 2710 provides an indication that a weather condition at a future time will be sunny, prior to that future time, control system 2720 provides a tint command according to the tint rules provided by Module A 2701. Visa-versa, if the output of Module B 2710 provides an indication that an weather condition in the future will be not be sunny, prior to the future time, control system 2720 provides a tint command that overrides tint commands determined by the clear sky module of Module A 2701.

Returning briefly to FIG. 24, in one embodiment, window controller 2600 includes control logic that determines whether there is an override to allow for various types of overrides to disengage the logic at an operation 2630. If there is an override, the control logic sets the final tint level for the zone to an override value at operation 2640. For example, the override may be input by a current occupant of the space that would like to override the control system and set the tint level. Another example an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building management may override the tint level from the control logic to ensure that all tintable windows have a high tint level. This override may override a user's manual override. There may be levels of priority in the override values.

At operation 2650, the control logic determines whether a tint level for each zone of the building being determined has been determined. If not, the control logic iterates to determine a final tint level for the next zone. If the tint state for the final zone being determined is complete, the control signals for implementing the tint level for each zone are transmitted over a network to the power supply in electrical communication with the device(s) of the tintable windows of the zone to transition to the final tint level at operation 2660 and the control logic iterates for the next time interval returning to operation 2610. For example, the tint level may be transmitted over a network to the power supply in electrical communication with electrochromic device(s) of the one or more electrochromic windows to transition the windows to the tint level. In certain embodiments, the transmission of tint level to the windows of a building may be implemented with efficiency in mind. For example, if the recalculation of the tint level suggests that no change in tint from the current tint level is required, then there is no transmission of instructions with an updated tint level. As another example, the control logic may recalculate tint levels for zones with smaller windows more frequently than for zones with larger windows.

In one case, the control logic in FIG. 24 implements a control method for controlling the tint level of all the electrochromic windows of an entire building on a single device, for example, on a single master window controller. This device can perform the calculations for each and every electrochromic window in the building and also provide an interface for transmitting tint levels to the electrochromic devices in individual electrochromic windows. Also, there may be certain adaptive components of the control logic of embodiments. For example, the control logic may determine how an end user (e.g. occupant) tries to override the algorithm at particular times of day and then makes use of this information in a more predictive manner to determine a desired tint level. For example, the end user may be using a wall switch to override the tint level provided by the control logic at a certain time on each day over a consecutive sequence of days to an override value. The control logic may receive information about these instances and change the control logic to introduce an override value that changes the tint level to the override value from the end user at that time of day.

Module E

Referring back to FIG. 25, in one embodiment, the window control system 2700 includes a Module E 2713 having control logic configured to provide statistically-informed foreknowledge of site-specific and seasonally-differentiated profiles of light and heat radiation present at the site based on past data. In one embodiment, location specific values provided by Module C 2711 and Module D 2712 are stored in memory by window control system 2700 as time series data from which the profiles by Module E 2713 are created. The ability to use past data (also referred to herein as "historical data") obtained at a specific location for which a forecast is desired to be made enables the forecast to potentially be more accurate. In one embodiment, constructing such profiles involves use of machine learning classification algorithms suitable for clustering time series information into groups whose longitudinal sensor values exhibit similar shapes and patterns. According to the desired level of granularity (for a given hour of day, time of day, week, month, or season of the year), identified cluster centroids will show the trajectory of the mean values of all records in that time frame whose similarity amongst themselves can be quantitatively distinguished from other groups of similar records. Such distinctions between groups allows for statistically founded inference with respect to "typical" environmental conditions desired to be monitored at a given location during a current timeframe.

Without ground truth knowledge of what counts as "typical" for a given location and timeframe, algorithmic classification of discrete weather profiles necessarily begins in an unsupervised fashion. Insofar as "correct" classes cannot be predefined, evaluating the performance of the classifier requires inferential decision making regarding how much of the output is actionable, i.e., the number of distinct clusters amongst which it is practically useful to distinguish.

In FIG. 25, univariate inputs (from Module C or Module D) of a desired length and granularity are passed to Module E 2713, which is configured to perform the functions of an unsupervised learning classifier know to those skilled in the machine learning arts. If a question of interest consists of profiling daytime weather patterns at a site over a given month, preprocessing by Module E 2713 results in an m×n dimensional data frame, where m is the number of daylight minutes, and n is the number of days for which photo sensor inputs have been collected. As different latitudes correspond to different sun trajectories during different seasons, different sensors pointing in different directions may be important at different times of day. Incorporating these differences can involve performing a data reduction technique (e.g., like Principal Component Analysis) to compress time series information from x number of sensors into a one-dimensional vector capturing they strongest radiation signals received from each cardinal direction. As the number of data points of daylight will vary from day to day, preprocessing the data input to the Module E 2713 also involves alignment of time indices. Similarity between individual time series vectors (i.e., cluster candidates) is most often measured as a function of pointwise (Euclidean) distance. Misalignment of time indices can result in misrepresentative distance calculations, distorting the clustering process.

One method for handling misalignment resulting from vector length differences involves dividing the original time series into equally sized frames and computing mean values for each frame. This transformation approximates the longitudinal shape of the time series on a piecewise basis. The dimensionality of the data can thus be reduced or expanded, such that clustering distance calculations can be unproblematically performed on n number of time series of equal length.

The alignment procedure provided by Module E 2713 may also be configured to perform a dynamic time warping (DTW) method. The DTW method stretches or compresses a time series by constructing a warping matrix, from which the logic searches for an optimal warping path that minimizes data distortion during realignment. This procedure ensures that the distance calculations performed by the clustering classifier do not find two sequences (with only slightly different frequencies) to be more "distant" than they actually are. As performing pointwise distance calculations across thousands of records is computationally expensive, the DTW method can be expedited by enforcing a locality constraint, or window, beyond which the DTW method does not search in determining the optimal warp path. Only mappings within this threshold window size are considered in calculating pointwise distance, substantially reducing the complexity of the operation. Other locality constraints (e.g., LB-Keogh bounding) can also be applied to prune out the vast majority of the DTW computations.

After preprocessing by Module E 2713, the data frame of time series vectors can be input to an unsupervised learning logic. As the appropriate number (k) of clusters may vary according to location, season, and other unquantified factors, use of a K-Means clustering logic, known to those skilled in the art, is identified as a suitable approach to be used by Module E 2713, allowing the user to define and hand-tune or fine-tune the number of clusters identified, to ensure that output is not only broadly representative, but also interpretable, actionable, and practically useful. Maintaining the example of the above-mentioned m×n dimensional data frame, execution of the K-Means clustering logic would begin by randomly choosing a k number of days from the n number of time series vectors as the initial centroids of the k number of candidate clusters. Locality constraints are applied before calculating the pointwise DTW distances between each centroid and all other time series vectors in the data frame. Vectors are assigned to the nearest (most similar) centroid before the centroids are recalculated to the mean values of all vectors assigned to the same group. This process repeats for a user-defined or other pre-defined number of iterations, or until further iterations no longer result in reassignment of vectors to different clusters. At the end of the process, the classifier of Module E 2713 will have clustered the data into k groups of vectors exhibiting similar patterns of longitudinal sensor values, which constitute the k most representative profiles of sensor data collected over a specified past timeframe. The more historical data that is used to construct these profiles, the more representative and informative these K-Means groupings will be.

The profiles determined by Module E 2713 can be used to generate information about prior distribution of radiation levels occurring within a specified range over a given time frame at a given geographical location. On the Bayesian-principled assumption that these "typical" profiles identified constitute a mixture of Gaussian (i.e., random normal) processes, one can quantify the certainty of forecasted sensor values occurring within a particular range as a function of the first (mean) and second (variance) moments of an underlying Gaussian process. This is to say that supervised, kernel-based models like Gaussian Process Regression can make use of the profiles identified by unsupervised clustering to produce a full posterior distribution for one's predictions (i.e., confidence intervals for predicted sensor values), providing insight into the possible (variance) and most likely (mean) outcomes. Accordingly, in one embodiment, the unsupervised machine learning techniques of Module E 2713 can be paired with supervised machine techniques of Module B 2710 to reinforce and improve weather predictions made by Module B 2710. In one embodiment, probabilistic confidence obtained using DNN sub-module 2710b uses the profiles provided by Module E 2713 to modify or better quantify its forecast. In some instances, a module may fail to function correctly, during which time, and until the failure is identified and corrected, window control system 2700 may be unable to provide its intended functionality. Between the costs of travel, materials used, maintenance services provided, and customer-impacting downtime of the system, the expenses entailed in dealing with such an event quickly accumulate. One type of failure that may occur is when one or more the sensors associated with Module C or D malfunctions. Although one or more sensor may fail to provide its intended functionality, the present invention identifies that location specific sensor data stored by window control system 2700 as time series data can be leveraged for purposes other than described previously above.

In one embodiment, if functionality associated with Module C 2711 and/or Module D 2712 fails or becomes unavailable, the present invention identifies that a Module 2719 configured with control logic to perform weighted Barycenter averaging can be applied to a historical sequence of sensor data obtained in the past to provide a distribution of sensor values that can be used as a substitute for current readings and used to provide a forecast of future weather conditions. In one embodiment, the substitute readings can be processed by a neural network, for example Module B. In one embodiment, days closer to the present are given a correspondingly heavier weight in averaging day-length time series sensor data across a rolling window of the recent past. In the event of hardware failure, these weighted Barycenter averages of historical sensor data can be supplied for the duration of any downtime required for repair.

Calculation of weighted Barycenter averages involves preprocessing and machine learning to temporally align coordinates and minimize the distances between time series profiles used in generating an optimal set of mean values that reflects the requirements of the weighting scheme. In one embodiment, an appropriate preprocessing technique is Piecewise Aggregate Approximation (PAA), which compresses data along the time axis by dividing time series into a number of segments equal to a desired number of time steps before replacing each segment by the mean of its data points. After applying PAA, all time series profiles included in the historical rolling window contain an equal number of time steps, regardless of seasonal differences in day length, which may change over the course of the specified time frame. Equal dimensions along the time axis are required to calculate the pointwise distances minimized by the optimization function used to perform Barycenter averaging.

Although a range of different distance metrics may be used to compute the Barycenters, other solutions such as Euclidean or Soft-Dynamic Time Warping (Soft-DTW) metrics can also be used to provide mean profiles. While the former is faster to compute and performs an ordinary straight-line distance between coordinates along the time axis, the latter is a regularized, smoothed formulation of the DTW metric, which applies a bounded window to its distance calculations to account for slight differences in phase. Constraints may be imposed on the Barycenter optimization function to determine the length of the rolling window of historical data to be used. Time frames with high optimization costs indicate volatile weather and warrant using a shorter rolling window of days to perform Barycenter averaging. Lower optimization costs correspond to more stable weather, from which a longer rolling window of informative historical data may be taken in performing Barycenter averaging. In one embodiment, can be generated on a site-specific basis with whatever historical data is available.

The barycenter averaging operation (e.g., in module 2719 or in module 2819) can be implemented to generate synthetic real-time raw sensor data from historical data if real-time data becomes unavailable. For example, barycenter averaging operation could be used to generate synthetic real-time photosensor and infrared sensor readings should the multi-sensor device or sky sensor at the site fail or otherwise become unavailable. To generate the synthetic real-time raw sensor data, barycenter averaging uses historical sensor data stored over a time frame to calculate pointwise weighted distance at each time index from sunrise to sunset to generate a likely radiation profile for the following day. In one example, historical sensor data over a time frame in the range of 7-10 days can be used. Barycenter averaging typically uses the same distance between time indexes for each day of the time frame e.g., at 1-minute time intervals. The number of time indexes changes depending on the length of the respective day between sunrise to sunset. The number of time indexes in consecutive days expands or shrinks to account for the seasonal changing of daylight minutes as days get longer or shorter. In certain embodiments, barycenter averaging is used to calculate a weighted average of historical sensor values for each time index over the time frame where the most recent values are weighted more heavily. For example, barycenter averaging can use stored historical photosensor readings taken at 12 noon each day over a time frame of 10 days, weighting readings from the most recent days more heavily (e.g., weighting 10 for day 10, 9 for day 9, 8 for day 8, etc.), to calculate a weighted average of the photosensor value at 12 noon. Barycenter averaging is used to determine the weighted average of the photosensor value at each time index to generate a mean profile of the synthetic real-time photosensor values over a day.

The barycenter averaging operation can be used to generate mean profiles of synthetic real-time sensor values such as photosensor values, infrared sensor values, ambient temperature sensor values, etc. The barycenter averaging operation can use the synthetic real-time sensor values taken from the mean profiles to generate input to the various modules and models that might be called upon to be executed over the course of the day. For example, the barycenter averaging operation can use the rolling historical data to generate synthetic photosensor values as input into a neural network model or other model, e.g., the LSTM neural network of module 2710a and the DNN of module 2710b.

Live Model Input and Output

A set of input features for each of the neural network models or other models is generally kept up to date and ready to be fed into the live models to forecast conditions at the site. In certain embodiments, the input features are based on raw measurements from sensors (e.g., photosensors, infrared sensors, ambient temperature sensors, etc.) at the site. In certain embodiments, the sensors are located in a single housing or otherwise centrally located, e.g., in a multi-sensor device located on a rooftop of a building or in a sky sensor. A multi-sensor device includes twelve (12) photosensors arranged radially and in various azimuthal orientations, one photosensor vertically-oriented (facing upward), two infrared sensors oriented upward, and two ambient temperature sensors. An example of such a multi-sensor device that can be mounted to the rooftop of a building is described in U.S. patent application Ser. No. 15/287,646, which is hereby incorporated by reference in its entirety. The information from multiple different sensors may be used in various ways. For example, at a particular time, measured values from two more sensors may be combined, e.g., a central tendency such a mean or average of the sensor values. Alternatively or in addition, at a particular time, only one measured value is used; e.g., a maximum value from all the sensors, a minimum value of all sensors, a median value of all sensor readings. In one embodiment, the model input features are based on a maximum value of multiple raw photosensor readings taken by the thirteen photosensors of the multi-sensor device and based on a minimum infrared sensor value, e.g., the minimum of the two infrared sensor readings less the minimum of the two ambient temperature sensor readings of the multi-sensor device. The maximum photosensor value represents the highest level of solar radiation at the site and the minimum infrared sensor value represents the highest level of clear sky at the site.

In certain embodiments, the set of input features fed into a neural network model or other model includes calculations of multiple rolling windows of historical sensor data. In one case, six (6) rolling windows ranging in length from five (5) to ten (10) minutes are used. Examples of rolling calculations include a rolling mean, a rolling median, a rolling minimum, a rolling maximum, a rolling exponentially weighted moving average, a rolling correlation, etc. In one embodiment, the set of input features includes six rolling calculations of a rolling mean, a rolling median, a rolling minimum, a rolling maximum, a rolling exponentially weighted moving average, and a rolling correlation for multiple rolling windows of historical data of each of a maximum photosensor value and a minimum IR sensor value where the forecasted output is learned as a function of a time frame of history of these inputs. For example, if the six (6) rolling calculations were used for five (5) rolling windows ranging in length from six (6) to ten (10) minutes for each of the maximum photosensor and minimum IR sensor values where the forecasted output is learned as a function of four (4) minutes of history, the set of input features is 240 (=6 rolling calculations×5 rolling windows×2 sensor values ×4 minutes). The rolling windows are updated on a regular basis, e.g., every minute, to drop the oldest data and bring in the more recent data. In some cases, the length of the rolling windows is selected to minimize the delays in queueing the data during live (real-time) prediction.

In certain embodiments, a machine learning submodule with a self-correcting feature selection process such as described below can be implemented to indirectly quantify and empirically validate the relative importance of all potential model inputs to reduce the number of features in the input set to a more performant input configuration. In these cases, the total number of input features can be reduced to a smaller subset that can be used to initialize and execute the model. For example, the a set of seventy two (72) input features based on the six rolling calculations for six (6) rolling windows ranging in length from five (5) to ten (10) minutes for both the raw maximum photosensor value and the minimum IR sensor value can be reduced to a subset of 50 input features.

In one embodiment, input features (e.g., a set of two-hundred (200) or more input features) are fed into a neural network. One example of neural network architecture is a dense neural network (DNN) such as one having seven (7) layers and fifty-five (55) total nodes. In some DNN architectures, each input feature is connected with each first-layer node and each node is a placeholder (variable X) that connects with every other node. The nodes in the first layer model a relationship between all the input features. The nodes in subsequent layers learn a relation of relations modeled in the previous layers. When executing the DNN, the error is iteratively minimized, updating the coefficient weights of each node placeholder.

In some cases, the model outputs one or more forecasted condition values in the future. For example, the model may output a forecasted condition at some point in the future, e.g., about five (5) to sixty (60) minutes in the future. In some embodiments, the model outputs a forecast condition at seven (7) minutes in the future (t+7 minutes). As another example, the model may output a forecasted condition several future times e.g., seven (7) minutes in the future (t+7 minutes), ten (10) minutes in the future, fifteen (15) minutes in the future (t+10 minutes). In other cases, the model outputs forecasted sensor values such as in the single DNN architecture embodiment.

Model Retraining

To account for site-specific differences in geo-location, seasonal variation and changing weather fronts, the various neural network models or other predictive models may be retrained on a regular basis. In certain embodiments, they are retrained every day, or on some other regular basis (e.g., between every 1 and 10 days), with updated training data. The models are retrained at a time, e.g., when the live models are not being executing such as during the night. In certain embodiments, the models are retrained with training data that includes historical data stored over a period of time such as, e.g., one week, two weeks, three weeks, or longer. The historical data may be updated on a regular basis to drop the oldest data and bring in the more recent data. For example, where the historical data is updated on a daily basis at night, the data from the oldest day is dropped and the most recent data from that day is inserted. These regular updates ensure the historical data is keeping with the pace and qualitative nature of the changing external weather conditions such as temperature, sun angle, cloud cover, etc. In other embodiments, the models are retrained with training data based on one or more blocks of historical data stored over periods of time. In yet other embodiments, the models are retrained using training data based on a combination of historical data and blocks of historical data. The training data includes feature input values of the types used as inputs by the model during normal execution. For example, as described, the feature input data may include rolling averages of sensor readings.

Training data includes values of model features based on historical data (rolling or otherwise) collected at the site. For example, training data may include the maximum photosensor values and/or the minimum IR sensor values of the historical readings of photosensors and infrared sensors at the site. In another example, training data may include model features based on calculations of rolling windows (e.g. a rolling mean, a rolling media, a rolling minimum, a rolling maximum, a rolling exponentially weighted moving average, and a rolling correlation, etc.) of historical readings of photosensors and infrared sensors collected at the site. Depending on the number and types of weather conditions covered by the training data, the training data might include data obtained over days, weeks, months, or years.

In certain embodiments, the training data fed into a neural network model or other model includes model input features that are based on calculations of multiple rolling windows of historical sensor data such as described above. For example, the set of training data may include six rolling calculations of a rolling mean, a rolling median, a rolling minimum, a rolling maximum, a rolling exponentially weighted moving average, and a rolling correlation for multiple rolling windows of historical data of each of a maximum photosensor value and a minimum IR sensor value where the forecasted output is learned as a function of a time frame of history of these inputs. If the six (6) rolling calculations were used for five (5) rolling windows ranging in length from six (6) to ten (10) minutes for each of the maximum photosensor and minimum IR sensor values where the forecasted output is learned as a function of four (4) minutes of history, the set of input features in the training data is 240.

In certain embodiments, a neural network model or other model is retrained using training data based on blocks of historical data collected over one or more periods of time during which various weather conditions existed at the site to optimize the model for these conditions and diversify the training data over subsets of the total domain. For example, the training data may include values of model features collected over periods of time during which a partly cloudy condition, a Tule fog condition, a clear sky condition, and other weather conditions existed at the site.

In some cases, the training data is designed with model features to capture all possible weather conditions at the site. For example, the training data may include all rolling historical data collected over the past year, the past two years, etc. In another example, the training data may include blocks of historical data obtained over periods of time during which each of the weather conditions was present at the site. For example, the training data may include one data set with data obtained during a Tule fog condition, one data set with data obtained during a clear sky condition, one data set with data obtained during a partial cloud condition, one data set with data obtained during a partial cloudy condition etc.

In other cases, the training data is designed with model features associated with a subset of all possible weather conditions at the site. For example, the training data may include blocks of historical data obtained over periods of time during which the subset of weather conditions occurred at the site. In this case, the model is optimized for the subset of weather conditions. For example, training data for a model optimized for a Tule fog condition might use input features obtained during the winter months and further during periods when the Tule fog was present.

As weather patterns change and/or construction occurs around a site, variations to microclimates, building shadowing, and other changes to local conditions at the site might occur. To adapt to changing conditions, training data might be designed with input features that target data obtained while these local conditions exist at the site. In one embodiment, transfer learning may be implemented to initialize a model being retrained with model parameters from a model previously trained for all previously existing weather conditions at the site. The model can then be retrained with training data obtained during the new local conditions to ensure the model is keeping up with the qualitative nature of the changing local conditions at the site.

In certain embodiments, the model being retrained is first initialized with model parameters (e.g., coefficient weights, biases, etc.) that are based on hyperparameters; for example, based on a random distribution of data. Various techniques can be used to determine the random distribution such as using a truncated normal distribution.

During model training, the model parameters (e.g., coefficient weights, biases, etc.) are adjusted and the error is iteratively minimized until convergence. The neural network model or other model is trained to set the model parameters that will be used in the live model on the following day. The live model being executed uses input features based on real-time sensor values to forecast conditions that will be used by the control logic to make tint decisions that day. The model parameters learned during the retraining process can be stored and used as a starting point in a transfer learning process.

Transfer Learning

Generally speaking, transfer learning operations use stored model parameters learned in a previous training process as a starting point to retrain new models. For example, a transfer learning operation can use the coefficient weights of node placeholders of a previously-trained neural network model to initialize one or more new models. In this example, the coefficient weights of node placeholders of the trained model are saved to memory and reloaded to initialize the new models being retrained e.g., on a daily basis. Initializing the new model with the model parameters of a pre-trained model can facilitate and expedite convergence to final optimized model parameters and generally speed up the re-training process. Transfer learning may also obviate the need for retraining the new model from scratch (with random initialization). For example, during the daily retraining process, the model may be initialized with the coefficient weights of node placeholders of a previously trained model. Model training may be characterized as fine tuning of coefficient weights and modifying a working parametrization. By starting with coefficient weights of a previously-trained model, the optimization of the coefficient weights typically begins closer to the global error minimum. This can reduce the number of updates to the coefficient weights and iterations during optimization, which can help reduce platform downtime and computational resources. In addition or alternatively, a transfer learning operation fixes transferred model parameters in the new model for certain layers/nodes and retrains only the unfixed layers/nodes, which may also reduce computational resources and platform downtime.

In certain embodiments, a transfer learning operation is included in the re-training process of a model. Each of the models being retrained is initialized with stored model parameters from a previous training process. In one embodiment, a transfer learning operation is included in the daily re-training of models that might be called upon to be executed over the course of the day. For example, a transfer learning operation might be included in the retraining operation 2903 of FIG. 27A. In these embodiments, transferring the knowledge acquired during initialization and daily re-training facilitates finer-grained adjustments to site-specific changes in conditions.

In one embodiment, a transfer learning operation initializes a model with stored model parameters from a previous training process that used training data from a block of historical data over a first period of time. For example, the previous training process may use a block of historical data over a time period of one (1) month, two (2) months, three (3) months, etc. During retraining of the initialized model, the model is retrained to update the model using training data based on rolling historical data over a second period of time. For example, the retraining process may use a rolling window with a second time period in the range of five (5) to ten (10) days. The time period of the block of historical data is longer than the time period of the rolling window.

In one embodiment, a transfer learning operation initializes a model with stored model parameters from a previous training process that used training data from a block of historical data over a first period of time (e.g., one (1) month, two (2) months, three (3) months, etc.). During retraining of the initialized model, the model is retrained to update the model using training data based on a targeted subset of weather conditions. For example, the training data may include data obtained during a new weather condition during a second period of time, e.g., that occurred during a two week period of time three months prior to the retraining. The retraining process uses the training data during the second period of time to retrain the model.

Single DNN Architecture (Recurrent LSTM Neural Network not Implemented)

In certain embodiments, a live model selection framework facilitates release of specialized models such as those optimized for use with only photo sensor input, only infrared sensor input, only weather feed data, etc. In these embodiments and others, the control logic executes a subset of the full ensemble of modules and models illustrated in FIG. 25. The unexecuted portions may be stored in memory and retrained for execution on a future day or may not be present in the architecture.

For example, in one embodiment, the control logic illustrated in FIG. 25 does not implement module B and module E, and instead executes Module C 2711, Module D 2712 and barycenter averaging Module 2719. In this embodiment, the recurrent LSTM neural network of module 2710a is not implemented and a single dense neural network (DNN) is implemented instead. According to one aspect, the single DNN is a sparse DNN with a reduced number of model parameters from the total number of model parameters that would be used typically in the DNN of module 2710b where the full ensemble of models and modules is implemented. In one example, the sparse DNN has 20% of the model features of the DNN of module 2710b. In one embodiment, the linear-kernel Support Vector Machine (SVM) or other similar technique is executed to eliminate model features of the sparse DNN to a subset of the total number of potential features of the DNN of module 2710b.

Figure 26:
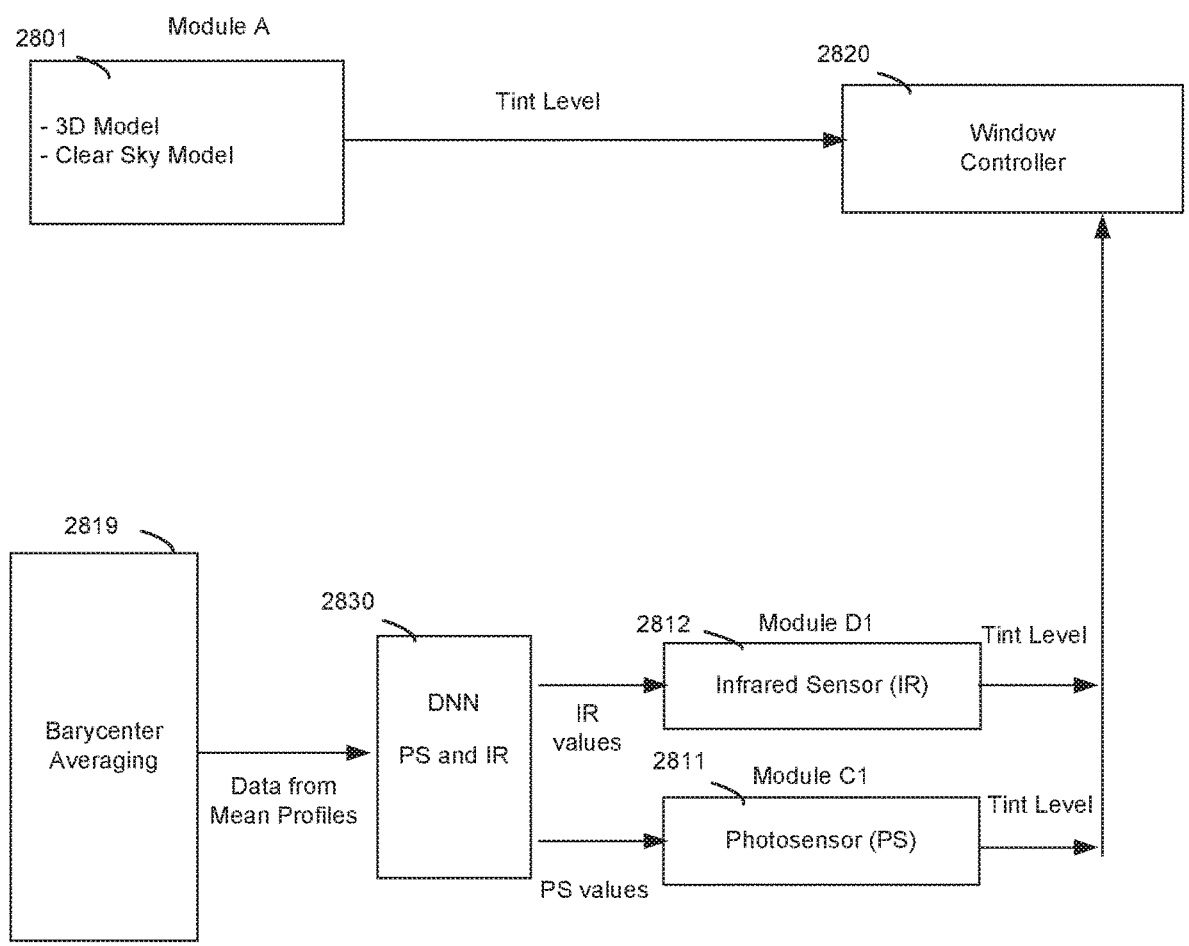
FIG. 26 depicts a flowchart with control logic for making tint decisions based on outputs from modules, according to various implementations.

FIG. 26 is a block diagram of a window control system 2800 with a single DNN architecture, according to an embodiment. The window control system 2800 includes a window controller 2820, e.g., a master controller or a local window controller. The window control system 2800 also includes control logic depicted by certain blocks. One or more components of the window control system 2800 implement the control logic. The control logic includes a barycenter averaging Module 2819, a DNN module 2830, a Module A 2801, a Module C1 2811, and a Module D1 2812. In one case, the DNN module 2830 includes a sparse DNN. Module A 2801 includes control logic that is similar to the logic of Module 2701 of FIG. 25.

The barycenter averaging Module 2819 can be executed to determine synthetic real-time sensor values based on historical sensor data and to determine mean sensor profiles for a day based on the synthetic real-time sensor values. For example, the barycenter averaging Module 2819 can be executed to determine a mean photosensor profile and a mean infrared sensor profile over a day. In one case, the barycenter averaging Module 2819 can be executed to additionally determine a mean ambient temperature sensor profile over a day. The barycenter averaging Module 2819 uses rolling historical data to generate synthetic values as input to the DNN module 2830. The live sparse DNN of DNN module 2830 uses input features based on the synthetic values from the barycenter averaging Module 2819 to output one or more forecasted IR sensor values that is used as input to Module D1 2812 and to output one or more forecasted photosensor values that is used as input to Module C1 2811. For example, the DNN module 2830 may output a forecasted IR sensor value and forecasted photosensor (PS) value at 7 minutes in the future, 10 minutes in the future, 15 minutes in the future, etc.

Module C1 2811 includes control logic that can be executed to determine a cloud cover condition by comparing the photosensor values output from the live DNN of DNN module 2830 with threshold values to determine a tint level based on the determined cloud cover condition. Module D1 2812 can be executed to determine a tint level based on infrared sensor values and/or ambient temperature sensor values output from the live DNN 2830. The window controller 2820 executes tint commands based on the maximum of the tint levels output from Module A 2801, Module C1 2811 and Module D1 2812.

Live Model Selection—Introduction and Context

In certain embodiments, control logic configured to determine window tint states dynamically selects and deploys particular models from a suite of available models. Each model may have a set of conditions under which it is better at determining window tint states than the other models in the suite. An architecture or framework for implementing this approach includes logic for selecting models and the suite of specialized models trained to produce best results on the specific conditions for which they are optimized. The framework may provide uninterrupted, real-time tint state decisions even though different models are deployed at different times.

Rather than deploying a single general purpose model to handle all possible external conditions encountered by a building throughout the day, week, season, or year, the model selection framework choses models dynamically. The model selection logic may select, at any moment in time, a model determined to be most performant in handling external conditions of a particular kind, as they arise. For example, the selection may be based on environmental conditions currently prevailing at a particular location (e.g., at the building site) and/or be based on conditions expected during a time of year, time of day, etc.

In certain embodiments, the model selection logic evaluates conditions and selects models while one of the available models is executing (live). This means that the tint determining logic can shift between models without any significant downtime. To do so, the control logic may continuously receive currently available data and dynamically deploy the models optimized for handling currently observed real-time conditions.

The dynamic model selection framework may also be employed to provide resilience for tint selection logic. In certain embodiments, model selection logic may account for situations where one or more types of feature input data (for the models) becomes temporarily unavailable. For example, a first model may require multiple types of input features including IR sensed values and a second model may require the same input features, but not the IR sensed values. If tint decision logic is going along, using the first model when suddenly an IR sensor goes off line, model selection logic may then switch over to the second model to continue making real time tint decisions. In some cases, model selection logic may account for situations where one or more of the models fails or otherwise becomes unavailable, and the logic must immediately choose a different model.

In some embodiments, a live model selection framework facilitates release of specialized models such as those optimized for use with only photo sensor input, allowing building sites outfitted with earlier (or multiple) versions of the sensor unit to realize the benefits of model-driven prediction.

Live Model Selection—Detailed Description

Overall Process (after Models have been Deployed)

Figure 27A:
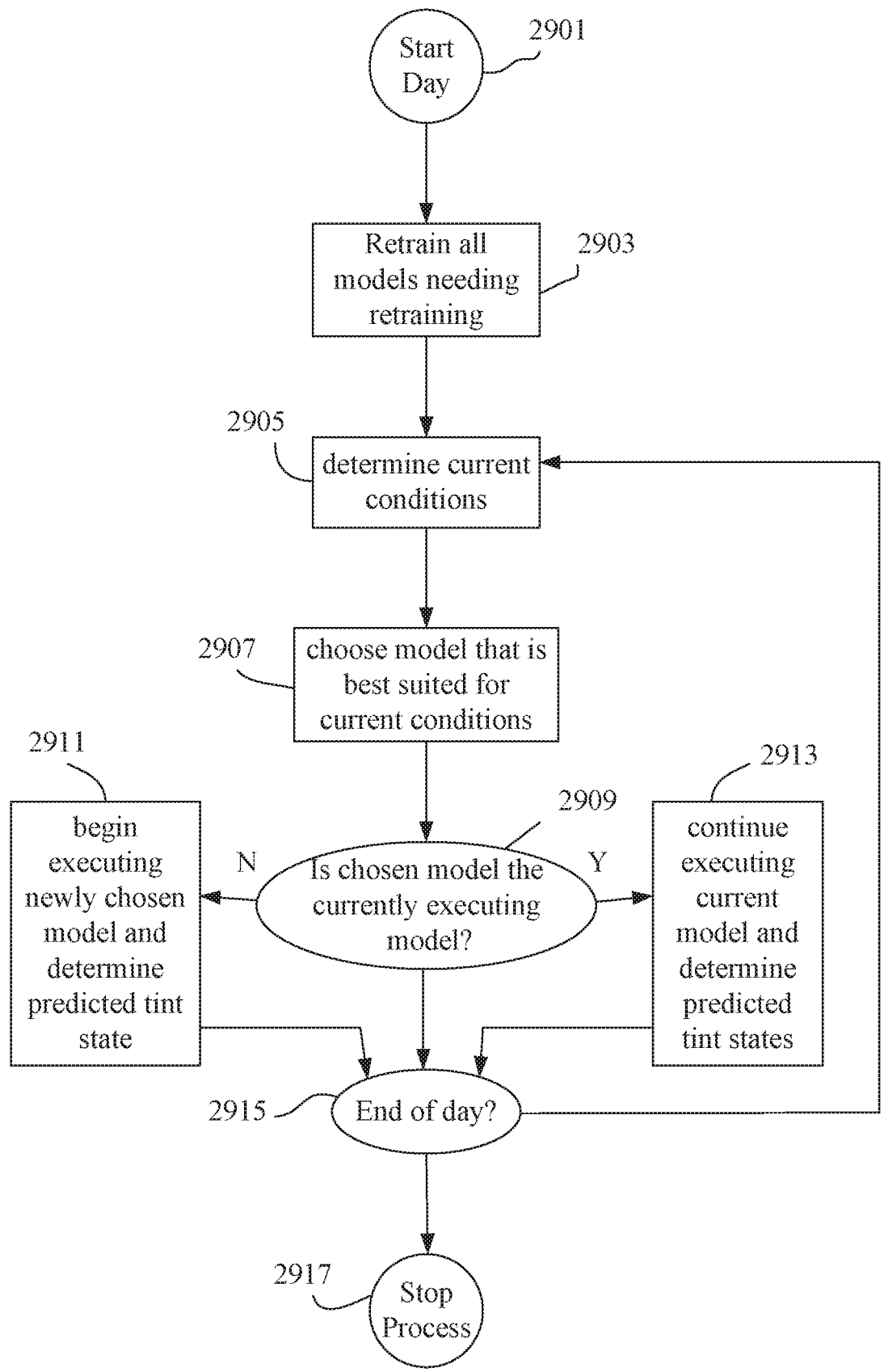
FIG. 27A presents a flow chart illustrating one approach to dynamic model selection.

FIG. 27A presents a flow chart illustrating one approach to dynamic model selection. The depicted process begins at an operation 2901 which may be associated with a recurring event such as the start of a new day, sunrise, etc. The timing of such event need not be the same every day, and in some cases it need not even be based on a recurring daily event. Regardless of the basis of the event, the process initializes or otherwise prepares the various available models for execution at an operation 2903. In the depicted embodiment, that operation involves retraining all the models that might be called upon to execute over the course of the day or other time period until the process begins again. The performance of tint condition determining models improves significantly when they are frequently retrained, e.g., on a daily or even more frequent basis.

At an operation 2905, the current conditions are provided to the model selection logic. This operation may be performed before, during, or after all models are made ready for execution by retraining or other operations. The current conditions may be related to external weather conditions (e.g., temperature, sun angle, cloud cover, etc.) which may be determined by one or more sensors such as IR sensors and/or photosensors described herein. Or the current conditions may be based on the set of input features that are currently available (e.g., weather data feed from the internet, IR sensor data, photosensor data, etc.). When only a subset of available input features are available, certain models in the suite may not be usable.

At an operation 2907, the model selection logic actually selects a model for execution and it does so by considering the current external conditions. For example, if the current weather conditions indicate fog or a similar condition, the model selection logic may automatically select a model that was trained and/or optimized for accurately choosing tint states under foggy conditions. In another example, if a primary model requires, as input features, a weather feed, IR sensor data, and photosensor data, and that primary model is executing when a communications link fails and the weather feed suddenly becomes unavailable, the model selection logic may automatically trigger execution of a backup model that requires as input features only IR sensor data and photosensor data.

When the model selection logic identifies a model to execute based on the current conditions, the logic must ensure continued seamless operation. To this end, the logic may determine whether the model chosen in operation 2907 is the currently executing model. See decision operation 2909. If so, it permits the currently executing model to continue to execute and determine future tint states. See operation 2913. If not, it transitions to the newly chosen model and allows it to begin determining future tint states. See operation 2911.

Regardless of whether the models switch or remain constant, the process may continue to cycle through repeated checks of current conditions (operation 2905) and choices of best models for the conditions (operation 2907) until a window tinting is no longer required, such as at sundown or the end of the day. See decision operation 2915. When the ending event is determined by operation 2915, process control is directed to end state 2917, and no further model selection is preformed until the next occurrence of starting event 2901.

Multiple Models

As indicated, tint decision logic may employ architectures having multiple models available for determining which tint state of windows best accounts for near term weather conditions. Of course, the number of models available for selection depends on many case-specific factors such as the number of unique and potentially fragile input feature sources, the range of qualitatively different weather conditions in a particular location, the available training and/or computational resources, etc. In certain embodiments, the number of models available to select from is at least three. In certain embodiments, the number of models available is between about two and twenty, or between about three and ten.

In many implementations, all models available for selection provide a similar output such as a tint decision or information that tint control logic can use to determine what tint state to propose based on current conditions. For example, in some embodiments, each model is configured to output a tint state from among two or more possible tint states (e.g., two, three, four, or more possible tint states). In other embodiments, each model is configured to output predicted glare conditions, thermal flux, etc.

The models available for selection may or may not require similar inputs. In cases where the model selection framework is intended to provide feature input redundancy, one or more of the models may require one set of feature inputs while one or more other models require a different set of feature inputs.

All models available for selection may be of the same, similar, or unrelated model types. For example, all of the models may be artificial neural networks having the same or similar architecture, e.g., they may all be recurrent or convolutional neural networks with the same architecture. Or some of the models may have a first neural network architecture while others have a different neural network architecture. Or one or move models may be neural networks, while one or more others may be regression models, random forest models, etc. In certain embodiments, some or all of the models are feedforward neural networks. In certain embodiments, one or more of the models are dense neural networks.

Situations where Live Model Selection May be Used and Types of Models Used in Each Situation Feature source resilience: In this case, the models available for selection are designed to work with different sets of input features. Typically, a given neural network works only with only a specified set of input feature types (e.g., a particular model may require four inputs from IR sensors and one input from a weather feed). A neural network has a set of input nodes, each dedicated to receiving only one type of input feature. Further, models requiring different sets of input features are trained differently (with different training sets) and may have different internal architectures. For example, if two tint prediction models are neural networks, their first layers may have different numbers of nodes (based on expected numbers of distinct input features) and/or different types of nodes. In short, each available model will have an architecture and training approach that is specific for its own set of expected input features.

In certain embodiments, feature source resilience is provided not only by using a model selection framework as described here, but also a supplemental Barycenter averaging framework or module as described elsewhere herein. In certain embodiments, when sensor data is available, Barycenter averaging is used to generate confidence intervals for data produced during live prediction.

External condition-specific models: In this case, the models available for selection are designed or optimized for different types of external conditions such as different weather conditions (e.g., sunny, foggy, rapidly passing clouds, thunderstorms, smog, fires in area, etc.). In certain embodiments, the model selection logic identifies a current type of external conditions, from among various possible types of external conditions. The model selection logic then selects the model optimized to perform best under the current external conditions. In certain embodiments, characteristics of distinct external conditions are determined using an algorithmic classifier such as an unsupervised learning model.

Setting Up Live Model Selection Framework

Feature Source Resilience Case:

In this case, the tint prediction models in the suite of models are chosen to complement one another in terms of input features set. For example, a first model in the suite may require a first set of input features (e.g., feature A, B, and C) and a second model in the suite may require a second set of input features (e.g., features A and C). Depending on the complexity of the input features, additional or different models may be provided in the suite. For example, a suite may additionally include a third model requiring input features A, B, and D and a fourth model requiring input features C, E, and F. In general, for feature resilience, the number of models in a suite of models may be determined by a balance of the computational expense and the number of points of potential failure. In certain embodiments, there are only two available models. In some embodiments, there are two more embodiments. In further embodiments, there are four or more models.

In one example, a live model selection framework employs (i) a primary model that performs best and uses a first set of input features (e.g., IR and photosensor data), and (ii) one or more fallback models that do not perform as well but use an input feature set that does require the entire first set of input parameters. For example, the backup model may require only photosensor readings and weather feed as input features. Or, a backup model may require only IR sensor readings and weather feed as input features. If the primary model is executing, when suddenly the IR sensor or photosensor become unavailable, the model selection logic may choose an appropriate fallback model to step in and execute.

External Conditions Variations Case:

In this case, the suite of models is chosen based on a number of qualitatively distinct weather conditions typically encountered in a given location where the tint selection logic operates. Note that this framework may be contrasted with a framework that employs only a general purpose model.

A general purpose model trains on whatever information is available, over all types of weather conditions. Such model can, in theory, predict all types of future weather conditions, and hence determine appropriate tint states for all types of weather. However, this flexibility may come at a cost of reduced accuracy in some contexts. Trained models optimized to predict future conditions in certain specific contexts often outperform general purpose models within the contexts. One example of a context where special purpose models can outperform general purpose models is in the context of fast moving clouds.

As an example of why different models can provide better results, a model optimized on foggy or mostly cloudy conditions might saturate if exposed to data from sunny conditions, and so would be inappropriate for determining tint states during sunny conditions, but would perform better than a general purpose model during foggy conditions. For example, a foggy or cloudy condition optimized model may provide a finer grained or more nuanced picture of condition variations during fog or cloud cover. Training such a model employs training data having lower intensity radiation values.

When using a suite of models specialized for the external conditions variation case, the live model framework set up may involve first identifying groups or types of environmental conditions that can profit from having their own models, each optimized to predict future external conditions within the realm of a particular type of external condition.

In one approach, a set up process identifies possible classes of weather condition based on recurring sets of feature values (e.g., measured visible and/or IR values) such as feature value profiles (time sequence of feature values over, e.g., a portion of a day or all of day). The feature profiles, for a given location, may be collected over many days, e.g., 100 days or 300 days or 500 days. And then, using an algorithmic classification tool, the produce identifies clusters of feature profiles. Each cluster can represent an environmental condition requiring a separate model.

In another approach, the set up involves identifying different types of weather conditions expected to require different models (e.g., fog, smog, cloud free skies, passing cumulus clouds, cirrus clouds, thunderstorms, etc.)). For each of these different weather conditions, the process collects feature values (which may be provide over time as a profile) and algorithmically determines patterns associated with the different weather conditions.

In certain embodiments in a suite of models, there are four or more models, each designed and trained to excel at predicting a particular type of weather condition. In certain embodiments, there are seven or more such models.

In various embodiments, the distinct external condition types or clusters are identified by analyzing historical data—e.g., radiation profiles, which may be provided as intensity versus time data sets—and then clustering these profiles based on an appropriate classification algorithm. The collection of profiles may be taken over a long period, e.g., months or even one or more years. In some embodiments, the profile contains sequential values of a single measured value is used; e.g., raw photosensor measurements of external radiant flux as a function of time.

In certain embodiments, a cluster of profiles is used to generate an average or representative profile that may then be used for comparison against current radiation data to determine which model to use. Determining which cluster a current condition is closest to may be accomplished using various distance metrics including, for example, a simple Euclidean distance.

The clustering algorithm produces a number of clusters of distinct radiation profiles (e.g., at least the number of models that are available to be selected). In an appropriately designed clustering algorithm, clusters are based on properties that are meaningful given the tint control logic, e.g., have different window tint sequences for given sensor readings. Examples of divergent conditions giving rise to qualitatively different radiation profile clusters include weather that produces rapidly moving clouds (e.g., cumulus clouds), low hanging clouds or fog, clear and sunny conditions, snow, etc.

Suitable clustering algorithms may take many different forms. In one approach, radiation profiles are provided and compared with one another to generate point-wise distances. In multidimensional profile space, the profiles will naturally cluster into different groups that are often associated with different weather conditions. However, this is not necessary, nor is it necessary to explicitly identify different weather conditions associated with these different clusters.

In certain embodiments, profiles of measured radiation values over time are collected and used identify clusters. The radiation profiles may be of various lengths. For example, in some cases, they are day-long radiation profiles. The radiation profiles used in clustering may be collected over a period of days, weeks, months, a year or more, etc. Each profile may have radiation values collected every few seconds, every minute, every few minutes, every half hour, or every hour. In certain embodiments, the values are at least taken on the order of minutes. These profiles are used as basis of clustering. They may be clustered in an unsupervised fashion, simply considering which profiles form distinct clusters.

To facilitate the clustering process, and possibly reduce the computational effort, the data in the radiation profiles may be reduced in size by any of various techniques. One approach maps the profiles to a reduced dimensional space that is still effective for clustering. Such an approach to clustering may be implemented with an autoencoder such as Google's seq2seq framework in Tensorflow. Certain techniques provide an unsupervised pretraining that identifies general characteristics of related profiles that may ultimately be clustered together. Alternatively, or in addition, the computing problem may be reduced by combining data from two or more days into a single profile. For example, techniques such as Barycenter averaging may be employed to combine profiles from two or more days. In certain embodiments, a k-means clustering technique is used.

After clusters have been identified, they may be tested. Any various clustering tests or validation procedures may be used. Examples include:
1. Inertia (the sum of the distances of samples [i.e., data instances] to their closest cluster center)
2. Silhouette Scores (the difference between the mean intra-cluster distance and the mean nearest-cluster distance for each sample, divided by the maximum of the two)
3. Calinski-Harabaz Scores (the ratio between within-cluster and between-cluster dispersion) (cf. Rousseeuw, P. (1986). Silhouettes: a Graphical Aid to the Interpretation and Validation of Cluster Analysis. In: Journal of *Computational and Applied Mathematics*. 20. 53-65). (cf. Calinski T. and Harabasz J. (1974). A Dendrite Method for Cluster Analysis, In: *Communications in Statistics*, 3:1, 1-27, In some cases, a test checks for and compares within cluster distances and inter-cluster distances.

Figure 27B:
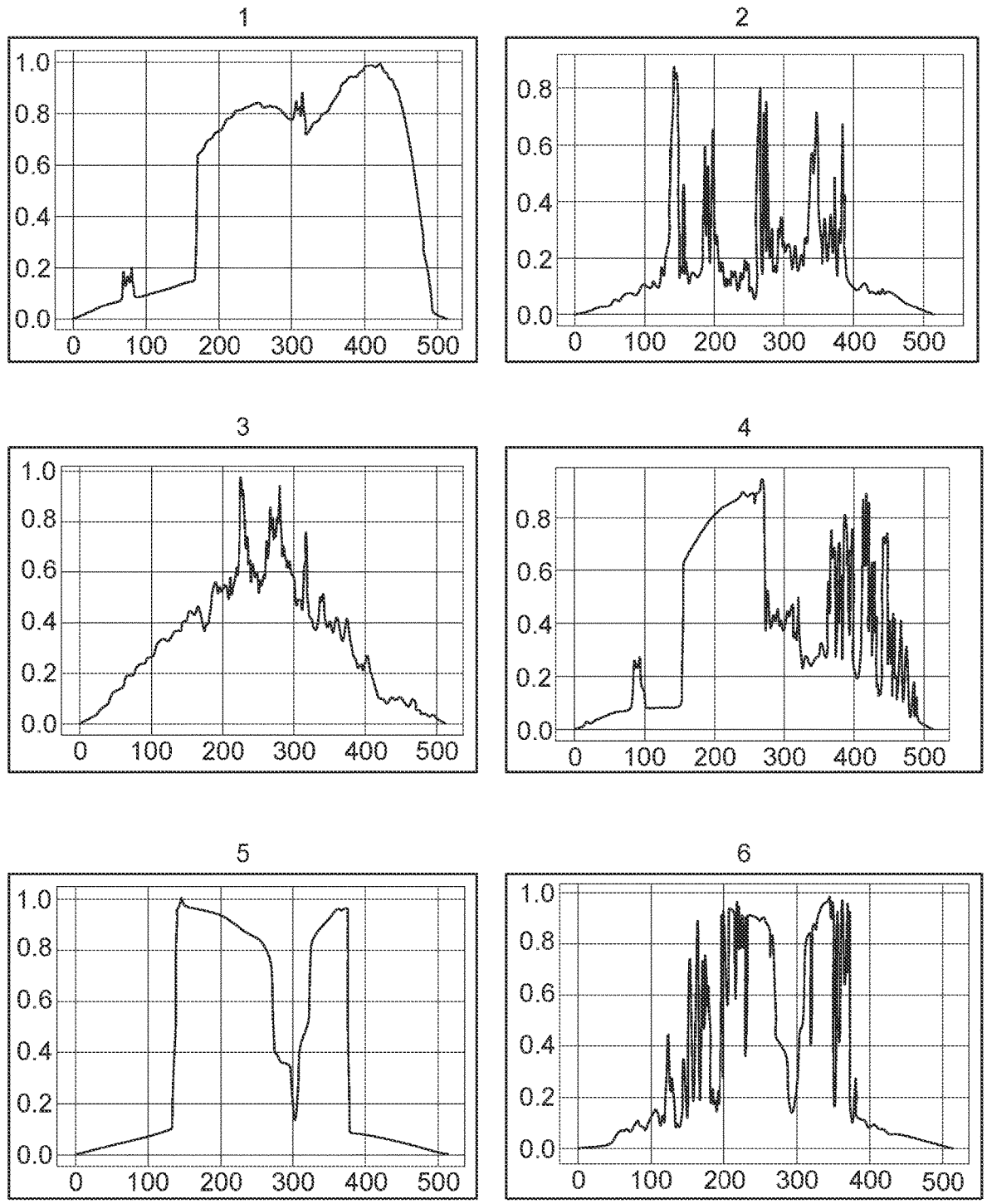
FIG. 27B presents example characteristic radiation profiles for different clusters or models that may be used in live model selection.

It has been found that clusters of radiation profiles sometimes have recognizable characteristics. FIG. 27B depicts examples of characteristic radiation profiles from different clusters. This figure illustrates characteristic profiles of radiation profiles in different clusters.

The labeling is as follows:
1. Sunny
2. Cloudy
3. Partially Cloudy
4. Mix Sunny/Partially Cloudy
5. Sunny with Occlusion
6. Partially Cloudy with Occlusion All profiles are day length with minute-level resolution. The Y-axis are the photo sensor values, scaled from (0-779 Watts/sq. meter) to (0 to 1).

In certain embodiments, the clustering logic identifies distinguishing characteristic features for the individual clusters of radiation profiles. Various techniques may be employed for this purpose. One embodiment employs shapelet analysis. Certain subsets of radiation data points in a profile may serve as a characteristic feature. A shapelet identification algorithm may be used. When using live model selection, the current conditions may be processed, e.g., in real time, to produce a shapelet or other feature that is compared against corresponding characteristics for the various clusters associated with the various available live models. Based on which cluster the current conditions associate with, a live model may be selected.

In certain embodiments, the clustering is conducted using supervised or unsupervised learning. In some cases, the clustering is conducted using unsupervised learning, and optionally using information collected and conclusions drawn using the logic in Module E discussed in the context of FIG. 25.

Producing Models

When the different types of models are identified for inclusion in the framework, those models must actually be generated or obtained. Thus, the relevant work flow generates or selects models based on data for profiles or other information for the specific models.

In the case of input feature resilience, the different models must be trained with different training sets that use different combinations of input features. For example, one model may be trained using data having IR sensor readings and corresponding weather feed information while another model may be trained using data having photosensor readings along with corresponding IR sensor readings and weather feed information. Yet another model may be trained using photosensor readings and corresponding weather feed information. Each of these models may have different architectures.

In the case of a suite of models optimized for different external conditions (e.g., different weather types), the individual models are each trained on data collected for their own specific types of external conditions. For each external condition identified in the setup, the workflow trains a model using only data obtained when such condition occurs. For example, the work flow may develop and test a first model using training data from a first weather condition (e.g., foggy mornings), develop and test a second model using training data from a second weather condition (e.g., passing clouds), and so on. In certain embodiments, each trained model's performance is tested against some benchmark (such as the performance of a model trained with data from multiple different weather conditions).

Criteria for Deciding which Model to Use (in Real Time)

Various factors may be used by model selection logic to actually select a model to use for immediate or near term tint state determination. The process of deciding which model to use in real time typically depends on the immediate or anticipated conditions and the differences between the models that are available for selection. For example, in the feature source resilience case, the model selection logic may monitor input parameter sources for possible problems. If a failure is observed that has or will likely result in an input feature becoming unavailable for a currently executing model, the model selection logic may immediately or promptly shift to a different model for which all the required input features are currently available.

In one example, a primary model performs best and uses a first set of input features (e.g., IR sensor and photosensor data), and one or more fallback models do not perform as well but use an input feature set that does require the entire first set of input parameters. For example, the backup model may require only photosensor readings and weather feed as input features. Or, a backup model may require only IR sensor readings and weather feed as input features. Then, if the primary model is executing, when suddenly the IR sensor or photosensor become unavailable, the model selection logic may choose an appropriate fallback model to step in and execute.

In the case where the suite of models includes models optimized to handle different types of external conditions, the selection logic may monitor external conditions and regularly determine which model is likely to perform best given those conditions.

In some embodiments, such model selection logic uses a set of current data (e.g., local IR sensor and/or photosensor readings) and/or current information (e.g., weather feeds) to assess a current external condition (e.g., based on a radiation profile). The model selection logic associates the current external condition with the most similar cluster or classification, which implicates a particular model. Various techniques may be employed to identify the cluster or classification that is most similar to the current conditions. For example, if the cluster or classification is represented by a region or point in multidimensional space, the model selection logic may determine distances such as Euclidean distances between the current conditions and each of the clusters or classifications. Non-Euclidean techniques may also be employed. In some embodiments, k-means is used to associate with current conditions. After clustering the current conditions, the logic selects for execution the model that is associated with the cluster or classification associated with the current conditions.

As an example, if a radiation profile changes due to, for example, fog lifting or a storm front approaching, processed sensor readings may indicate that external conditions have transitioned from one classification of radiation profiles to another classification of radiation profiles, and this transition requires selection of a new model that is optimized for the new radiation profiles.

Timing

The model selection logic may select models at particular frequencies appropriate for real time control of window tinting, e.g., from seconds to hours. That is, the model selection logic may determine which model to use at a defined frequency such as every few seconds, every few minutes, or every few hours. In certain embodiments, the model selection logic determines which model to use at a frequency between about 5 seconds and 30 minutes. In certain embodiments, the model selection logic determines which model to use at a frequency between about 30 seconds and 15 minutes. In some embodiments, the model selection logic selects models when triggered to do so by a detected event such as a change in a detected radiation profile that is greater than a defined threshold.

Retraining and Otherwise Keeping Models Ready for Use

Within a suite of models, those that are not currently used to determine tint states may need to be kept ready for execution. To this end, all models in a suite may be retrained every day, or on some other regular basis (e.g., between every 1 and 10 days). In certain embodiments, the models are retrained at a time when the live models are not being executing (e.g., sometime during the night such as at midnight).

When tint decisions are being made (e.g., during daylight hours), all models must be ready for deployment. Thus, the data required by all models, particularly data that includes historical components such as rolling average sensor data, must be kept up to date and ready to serve as feature inputs for newly selected models, even if it is not used in a currently executing model. In other words, in various embodiments, all input features for all models are constantly generated or otherwise kept up to date and ready to be fed to the models.

Further, if a model that is not currently used to determine tint states is a recurrent neural network, it may be necessary to feed it input features, and have it execute even though its outputs are not currently used, so that it is ready to immediately provide useful outputs should it be selected. If the model is a non-time dependent (i.e., it does not include a memory and/or does not have a feedback loop as in the case of a feedforward neural network), it need not execute prior to being called upon to determine tint states.

Architecture Example

Figure 28:
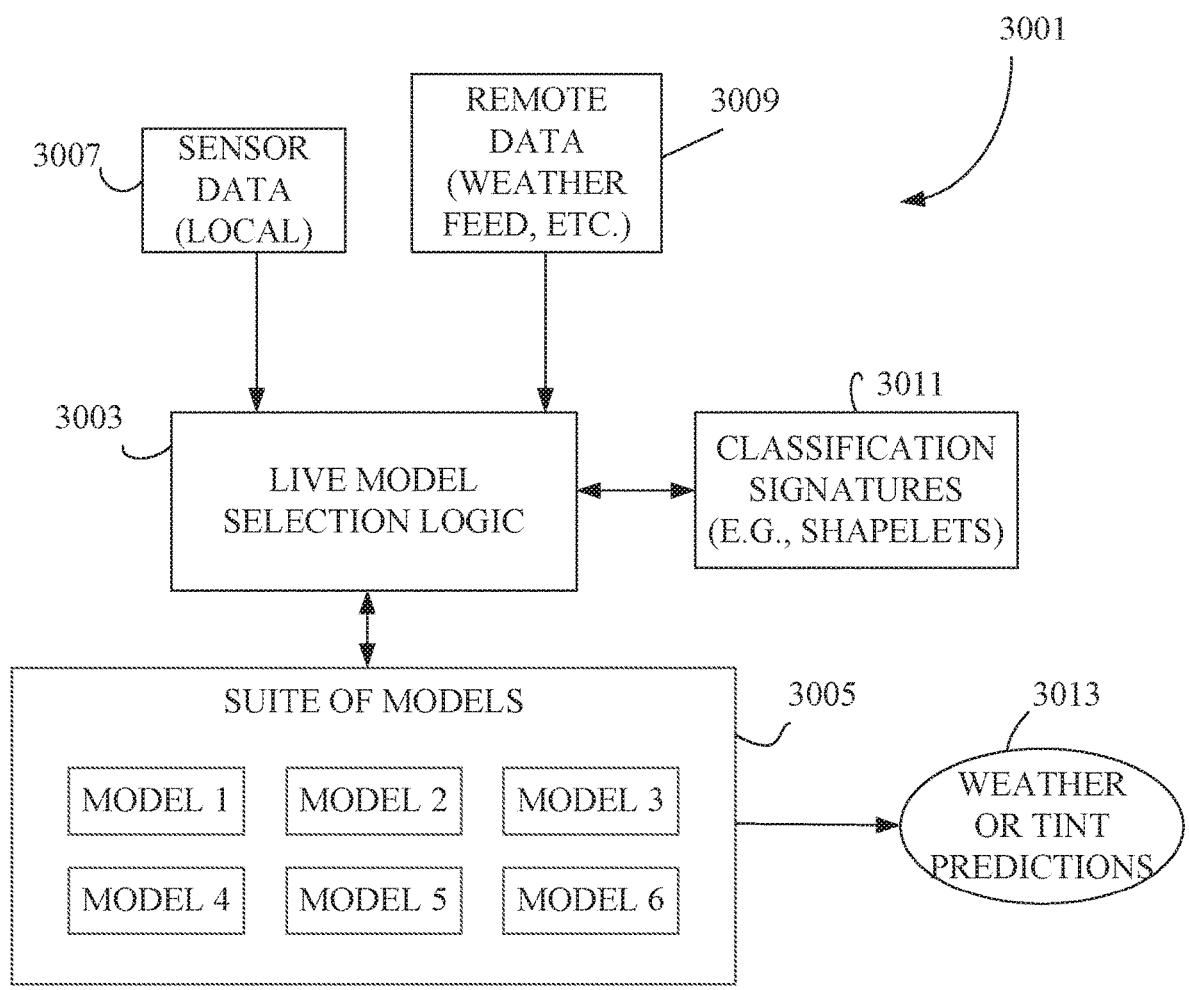
FIG. 28 presents a block diagram of an example of an architecture for dynamic model selection.

FIG. 28 presents a block diagram of an example architecture 3001 for a live model selection framework. As shown, the framework relies on live model selection logic 3003, which may be implemented as program instructions and associated processing hardware. Logic 3003 receives various inputs relevant to the current exterior conditions. In the depicted embodiment, these inputs include local sensor data 3007 and remote data 3009 such as a weather feed provided over the internet. The live model selection logic 3003 may also access signatures 3011 or other stored information that allows the logic to compare current conditions against previously classified condition types. In certain embodiments, the classification signatures are shapelets. By applying classification logic for the current conditions, live model selection logic 3003 determines which type of model from among multiple condition-specific models it should select to predict future conditions. When it makes this decision, logic 3003 selects a model from among those in a suite 3005 of available condition-specific models. In the depicted embodiment, there are six available models.

Live Model Selection—Example

In certain embodiments, a live model selection framework employs sensor data and/or current condition information. Examples of sensor data include photodetector and IR sensor inputs, and/or a live weather feed from, e.g., a selected third-party API.

Input resilience is one application of this framework. In a prediction model that leverages live weather data from a third-party API in addition to Photo and IR sensor input from a hardware unit (e.g., a rooftop sensor unit such as those described in US Patent Application Publication No. 2017/0122802, published May 4, 2017), there are three possible points of failure. Because any one of the three inputs could be present or absent during a connection failure event, there are 8 (or 2³) possible input combinations, which only a framework that supports live model selection can seamlessly handle without downtime.

Unlike sensor data, third-party weather data cannot be reliably synthesized from historical values using, e.g., a weighted barycenter averaging technique. However, experimental results have shown that it is helpful to supplement the model with real weather data when connection to one or both of the sensor inputs is missing and must be synthesized. Because a given model typically performs only when all expected inputs are provided, two models must be ready for deployment in the event of connection failure-one which includes network placeholders ready to receive input from the live weather feed, and another which does not.

With such an architecture, a live model selection framework only makes use of real weather data when it is available, and the framework only synthesizes sensor values for whichever inputs are missing, retaining every real data point received. In this way, the presence or absence of input each minute drives model selection in real time, ensuring that the presently deployed model supports the combination of inputs currently being received.

This approach (and the associated architecture) enables deployment of a single framework with specialized models to sites currently outfitted with only the Photo Sensor hardware unit. Should the site prefer to maintain both versions of hardware when receiving an upgrade (e.g., one type of sensor on one building, and an upgraded version of the sensor on another), the live model selection framework supports simultaneous deployment of two prediction models, each optimized for the input it receives from its corresponding hardware unit. In this way, the framework provides versatility in the sensor forecasting software.

To validate the resiliency of the live model selection framework, an extreme volatility stress test was devised that randomizes input to the prediction module each minute. Such a test simulates a scenario in which the presence or absence of any one of the three inputs is determined at random. From one minute to the next, all, none, only one, or any combination of two inputs is made available to a prediction module, which selects in real time one of two models designed for those inputs. For the duration of each of the seven days during which the prediction module was subjected to the stress test, deployment of the live model selection framework resulted in zero downtime, successfully generating minute-level predictions throughout the day.

Figure 29:
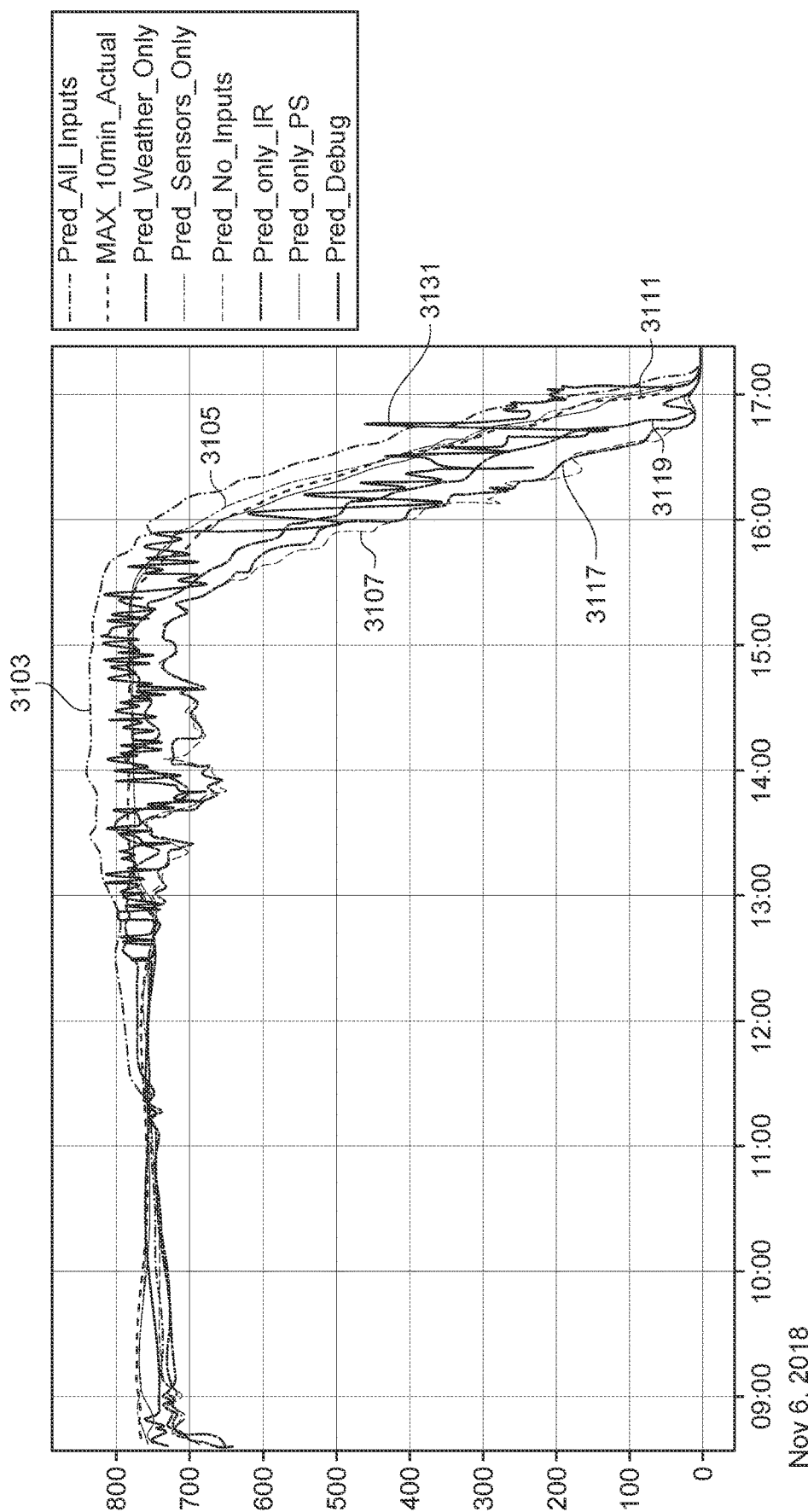
FIG. 29 presents results of a stress test running from noon to sunset for a dynamic model selection process.

FIG. 29 presents results of the stress test running from noon to sunset. The orange line (3103) represents predictions generated using all inputs (Photo Sensor, IR, Forecast IO data from a weather feed). The blue line (3111) represents the actual values being predicted; e.g., actual measured radiant intensity from outside. The light green line (3119) represents predictions generated using Forecast IO data and synthetic Photo Sensor and IR data. The synthetic data was generated from Barycenter averaging of data from recent days. The purple line (3105) represents predictions generated using only real Photo Sensor and IR data. The red line (3107) represents predictions generated using only synthetic Photo Sensor and IR data. The dark green line (3117) represents predictions generated using synthetic Photo Sensor data and real IR data. The yellow line represents predictions generated using real Photo Sensor data and synthetic IR data. And the brown line (3131) represents predictions generated by a model subjected to the stress test, in which the presence or absence of any of the three inputs to the model is randomized from minute-to-minute. In other words, the predictions shown in the brown line were generated using live model selection of two models, one designed for accepting photosensor data, IR sensor data, and Forecast IO data, and the other designed for receiving only photosensor and IR sensor data. All other curves were generated using only a model that accepts data from all three sources: photosensor data, IR data, and Forecast IO data. Because the live model selection run (brown line) transitioned back and forth between two models, the predictions generated fluctuate across the range of predicted values output by all the previously described models. However, while the brown line (3131) fluctuates, it stays reasonably close to the actual measured values of radiant flux (blue line 3111), hence indicating that it provides a reasonable prediction under challenging conditions.

Recursive Feature Elimination—Introduction and Context

The power of deep learning relies on the informative signal strength of input features whose relations are represented by the layers of the network architecture. However, no amount of domain knowledge can determine in advance which baseline input feature set results in best predictive performance in all geographical locations and all times of year. Often there are many possible input features for a neural network, sometimes hundreds or more. As mentioned herein, some examples have about 200 available input features. However, using all those features can lead to certain problems such overfitting and possibly requiring extra computation resources that add expense of slow the process.

Because neural networks are in some regards "black box" algorithms, it is not possible to directly quantify the relative importance of input features. For such networks not only model relations between inputs, but also relations of relations (of relations . . . ), for however many layers of representation are constructed, effectively bury the relative importance of input features. This characteristic of deep learning models makes it difficult to determine whether the set of input features currently being used is indeed optimal. A different set of input features trains a different set of relations (of relations . . . ), and the neural representation of an alternative baseline feature set may be more successful in minimizing overall prediction error. The diverse range of site-specific external conditions and their distinct and irregular rates of change make hand-tuning of model input features impractical.

Recursive Feature Elimination—Feature Filtering (General)

In certain embodiments, machine learning is used to automate a feature selection process that might otherwise require monitoring by a team of specialists tasked with regularly updating model parameters. In certain embodiments, automated feature selection is implemented by integrating a machine learning module into an initialization architecture for models that predict future values of window tinting and/or local weather conditions. Such feature selection module may be configured to quantify and empirically validate relative feature importance. Such information allows, in certain embodiments, automatic re-initialization of predictive models with new inputs and updating of the feature set for changes in, e.g., different locations and/or at different times of year.

Thus, the conditions prevailing at a particular time and place may determine which input feature set is best for minimizing prediction error. And site-specific changes in conditions over time will drive re-initialization of the model with an improved set of inputs, enabling it to automatically self-correct and update its existing parameterization.

The process effectively filters one or more of the various available input features. While various filtering processes may be employed, the following discussion focuses on a recursive feature elimination process (RFE) that may be implemented with a regression or classification methodology such as a support vector machine or a random forest technique.

The disclosed techniques allow a recursive feature elimination system to identify particular feature inputs, from among all possible feature inputs, that are likely to be most valuable on any given day. Thus, a relatively small set of input features may be used to initialize and run a model. As a consequence, reduced computational resources are needed to execute prediction routines. It may also reduce the model error, i.e., inaccurate predictions of future external conditions relevant to choosing tint appropriate window tint states.

As suggested, RFE may be used to capture behavior differences in weather data and characteristics at different locations (even within the same city or neighborhood) as well as different times of year. Therefor an input feature set that works well at one location might not work as well at a different location. Similarly, a feature set that works well in early February might not work as well in mid-March. Every time a new input feature set is selected, it may be used to re-initialize a neural network, such as a dense neural network or a recurrent neural network used to predict future tint states and/or weather conditions.

In certain embodiments, the feature elimination system identifies the relative importance of feature inputs. The process may employ various feature derived from photosensor and/or IR sensor input as described herein.

In certain embodiments, the model that is periodically reinitialized as described herein is any of the neural networks described elsewhere herein, such as a dense neural network and/or a recurrent neural network (e.g., a LSTM). In certain embodiments, the model is configured to predict external conditions at least about five minutes into the future. In certain embodiments, the prediction extends further into the future, such as at least about 15 minutes or at least about 30 minutes. In some embodiments, it extends to a period that is no longer to the longest period of time required to transition from any one tint state to a different tint state.

Recursive Feature Elimination—Identifying Feature Subsets

In certain embodiments, a submodule for filtering input features is configured to perform a support vector regression, or more specifically, a linear kernel support vector machine. This type of algorithmic tool generates coefficients of all the available input parameters. The relative magnitudes of the coefficients can serve as quantitative indicators of the associated input parameters relative importance. A feature filtering submodule may be embedded in a feature engineering pipeline used in preprocessing input to the neural network during model training. As an example, see FIG. 30 described below.

In certain embodiments, a support vector machine is used in a regression context rather than a classification context (the other commonly used case for support vector machines). Mathematically, both processes generate hyperplanes and identify data points closest to the hyperplane. Through this process, a support vector machine identifies coefficients for the feature inputs that can be used to specify their importance. This generation of coefficients for different feature types is common to partial least squares and principle component analysis. However, unlike principle component analysis, the support vector machine does not combine feature types into vectors. It presents the independent feature inputs separately.

The "support vectors" of a support vector machine are data points lying outside an error threshold of which the support vector machine is tolerant in regressing potential model inputs on the forecasted target variable (e.g., W/m2 for photosensors, degrees Fahrenheit or Centigrade for IR Sensors, etc.). When training the support vector machine, only these data points are used to minimize the prediction error, ensuring that relative feature importance is quantified with respect to those conditions which pose greatest difficulty to the model.

In certain embodiments, the regression analysis employs historical data points taken for a given time (e.g., noon on a particular winter day), and each data point includes a value of a single putative input feature (e.g., a rolling mean value of an IR sensor reading over the last 10 minutes) and an associated raw measured external radiation value (e.g., a radiation value measured by an external photosensor, which may be the same photosensor providing some of the putative input features values). The raw measured external radiation value may serve as a label or independent variable for the regression analysis.

Typically, the input to the regression analysis is a single data point for each putative input feature. Of course, some input data points (putative input features) have an associated time value, and aside from that time value they represent feature types that are identical to one or more other input points. As explained elsewhere herein, some or all input features are time-lagged, for example by four or more time steps. For example, a five-minute rolling median of the a minimum measured IR value may be represented by four model parameters (its value at time index 't', 't-1', 't-2', and 't-3'), only some of which may be selected by RFE. Thus, at every minute (e.g., in every row in an input data structure), the model contains some information about how that feature has changed over the previous four minutes.

Support vector regression (or another regression technique) may be used to develop an expression or relationship between coefficients (with their putative input features) and an external radiation value. The expression is a function of input feature values and their associated coefficients. For example, the expression may be a sum of the products of the coefficients and the values of their associated putative input features.

An error minimization routine is used adjust the coefficients so that the calculated radiation value generated by the function matches the actual radiation value that was measured (e.g., a photosensor value taken to generate the feature values). The regression technique may use calculations employed by a support vector machine to classify labelled points. Essentially, the process eliminates those features that contribute the least to minimizing the error of predictions. Regardless of the specific technique employed, the process generates a regression expression with coefficients for each of the feature values.

Initially, the feature elimination process applies a regression to all potential input features and through this process ranks the features based on coefficient magnitudes. One or more putative input features with low magnitude coefficients are filtered out. Then the process applies the regression again, but this time with a reduced set of putative input features, the set having been reduced by eliminating certain low ranking input features in the previous regression. The process may be continued recursively for as many cycles as is appropriate to reach a desired number of input features. For example, the process may continue until a user-defined stop criterion or a desired number of remaining predictors is reached.

The resulting feature set can then be used to initialize the neural network with the most performant input configuration. The decision to re-initialize the model with a new configuration of input features may be made with respect to how well the existing input features perform on the same validation set of recent historical data.

While support vector regression is suitable one technique for filtering or eliminating putative input features, it is not the only suitable technique. Other examples include random Forest regression, partial least squares, and principal component analysis.

Recursive Elimination

A "recursive" elimination process runs a filtering algorithm (e.g., a linear kernel support vector regression) multiple times, each time attaining a greater degree of filtering. Through this approach, the process step-wise eliminates the least important feature inputs via multiple runs of the filtering algorithm. A parameter, which may be a user-definable parameter, specifies how many features are to be selected at the end of the recursive filtering process.

in some embodiments, a fixed number of features are eliminated each time a support vector machine runs with a set of potential input features. For example, in each iteration, a single feature is eliminated, and then the support vector machine is rerun with one less data point. As an example, if there are initially 200 available input features, and each time a support vector machine is run, one more input feature is eliminated, the support vector machine would have to run 100 times to reduce the number of input features from 200 to 100.

In certain embodiments, an RFE process removes between about 20 and 70% of the initial number of available features. In certain embodiments, an RFE process removes at least about 50 features. In certain embodiments, an RFE process removes between about 50 and 200 features. As an example, there are initially 200 distinct input features and over the course of an RFE process, 100 of these features are filtered, to reduce the number input features to 100 features at the end of the process.

The input feature elimination may be flexible in identifying features to filter. For example, in a given iteration, a feature of any type may be filtered. Consider for example the case where there are 50 input features based solely on static sensor readings, and those 50 input features are available over each of four different time steps (e.g., each of four successive minutes prior to the current time). Thus, there are 200 available input features. An elimination procedure may consider elimination some features at one time step, other features at a different time step, still other features at a third time step, and so on. Further, some feature types may be preserved at more than one time step. Hence, the elimination procedure may eliminate features on the basis of feature type (e.g., a rolling photosensor mean value versus a rolling IR sensor median value) and on the basis of time increment (compared to the current time).

Recursive Feature Elimination—Re-Initialize Model with a New Parameter Subset

In computational model design, there may be various stages of model definition and development. One of these stages is initialization. In some embodiments, each time a new set of input feature types is defined, the process initializes or re-initializes a model.

1. Model architecture—in the case of a neural network, this may represent the overall structure of the network including the number layers, the nodes in each layer, and the connections between nodes in adjacent layers.
2. Model hyperparameter optimization—hyperparameters are set before training. As an example, a hyperparameter may be an initial (prior to training) set of parameter values for one or more parameters in activation functions of individual nodes in a network. In another example, hyperparameters to be optimized include initial (again before training) weights of individual nodes. Hyperparameters are also sometimes used to define how a model learns. For example, they can set the rate at which a model learns in, e.g., a gradient descent technique.
3. Initialization—once the hyperparameters are set, a model is initialized by defining the set of input feature types that will be used. The initial training of the neural network model with the set of input features is an initialization. Each time a model is re-initialized, it is trained with a new set of input feature types.
4. Learning—with an initialized model, a training algorithm uses a training set of data having values of the input features and associated labels to train a model.

Recursive Feature Elimination—Example Process Flow

Figure 30:
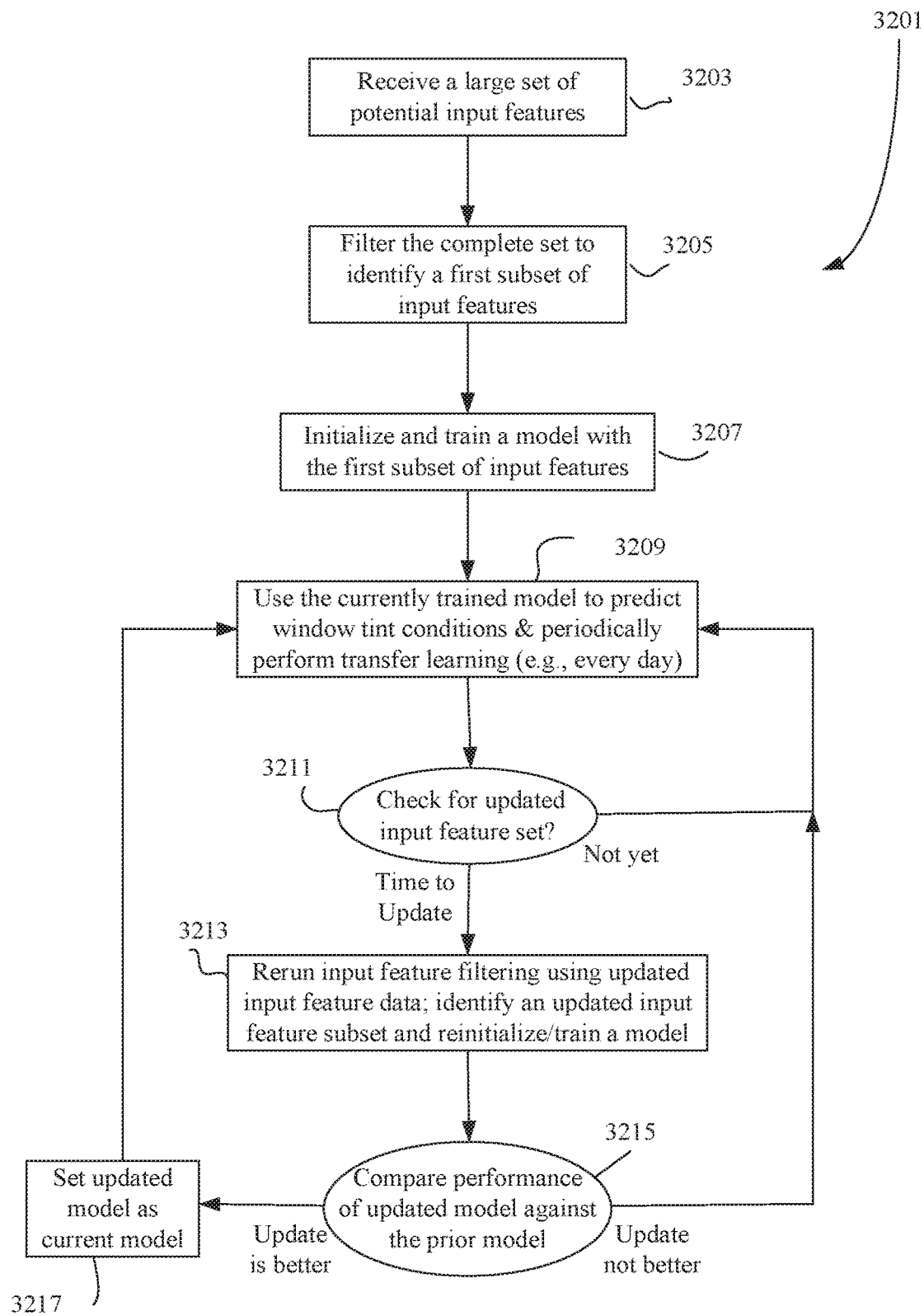
FIG. 30 presents a flow chart of a process for model updating that employs periodic input feature filtering.

FIG. 30 presents a flow chart 3201 showing one implementation of a process for model updating that employs periodic input feature filtering. The following operations may be performed.

a) Receive a large set of potential input features (e.g., 100 more features derived from historical values of frequency specific sensor readings). See operation 3203.
b) Conduct an initial feature filtering (e.g., use SVM RFE) on the complete set to identify a first input feature subset. See operation 3205.
c) Initialize and train a model with the current subset of input features. See operation 3207.
d) Use the currently trained model to predict window tint conditions & periodically perform transfer learning (e.g., every day) See operation 3209.
e) Check whether to revise the input feature set (e.g., wait a threshold number of days since the model was last re-initialized, such as about three to ten days). See operation 3211.
f) When needed, rerun input feature filtering using the large set of potential input features, but updated with data obtained since time when the model was last initialized. Identify an updated input feature subset and re-initialize and train a model. See operation 3213.
g) Compare the performance of the updated model with new feature set against the prior model, which is typically the current model. See operation 3215.
h) If the new performs better, set it as the "current" model (see operation 3217) and loop back to operation 3209 (d) with the new model and updated feature subset; if not, continue to use the prior model as indicated at operation 3217.

To ensure that premature model re-initialization does not undermine the performance gains made by other periodic optimization routines such as a transfer learning process (which may be performed regularly such as nightly using a re-training module), the predictive ability of models produced by RFE and re-initialization may be compared against the predictive ability of models optimized by transfer learning or other routine retraining technique. This is illustrated by operations 3215 and 3217 in FIG. 30. If the routine model outperforms the model with RFE re-initialization, the prior input feature set is retained. Optionally, the coefficient weights of the existing predictors are updated so they can be reused to initialize the next regression analysis. If the RFE re-initialization model outperforms the normal re-training model, the input feature set self-corrects, requiring no user intervention.

Embedding SVM-based recursive feature elimination into the (re-)training module allows the conditions prevailing at a given location and time of year to drive model parameterization and re-initialization. In this fashion, the neural representation of model inputs is prompted to undergo continuous competition with itself. The result is an application of artificial intelligence that learns from the most difficult scenarios, remembers what is still useful, forgets what is not, and self-corrects when finding a better solution to the problem at hand.

Figure 31:
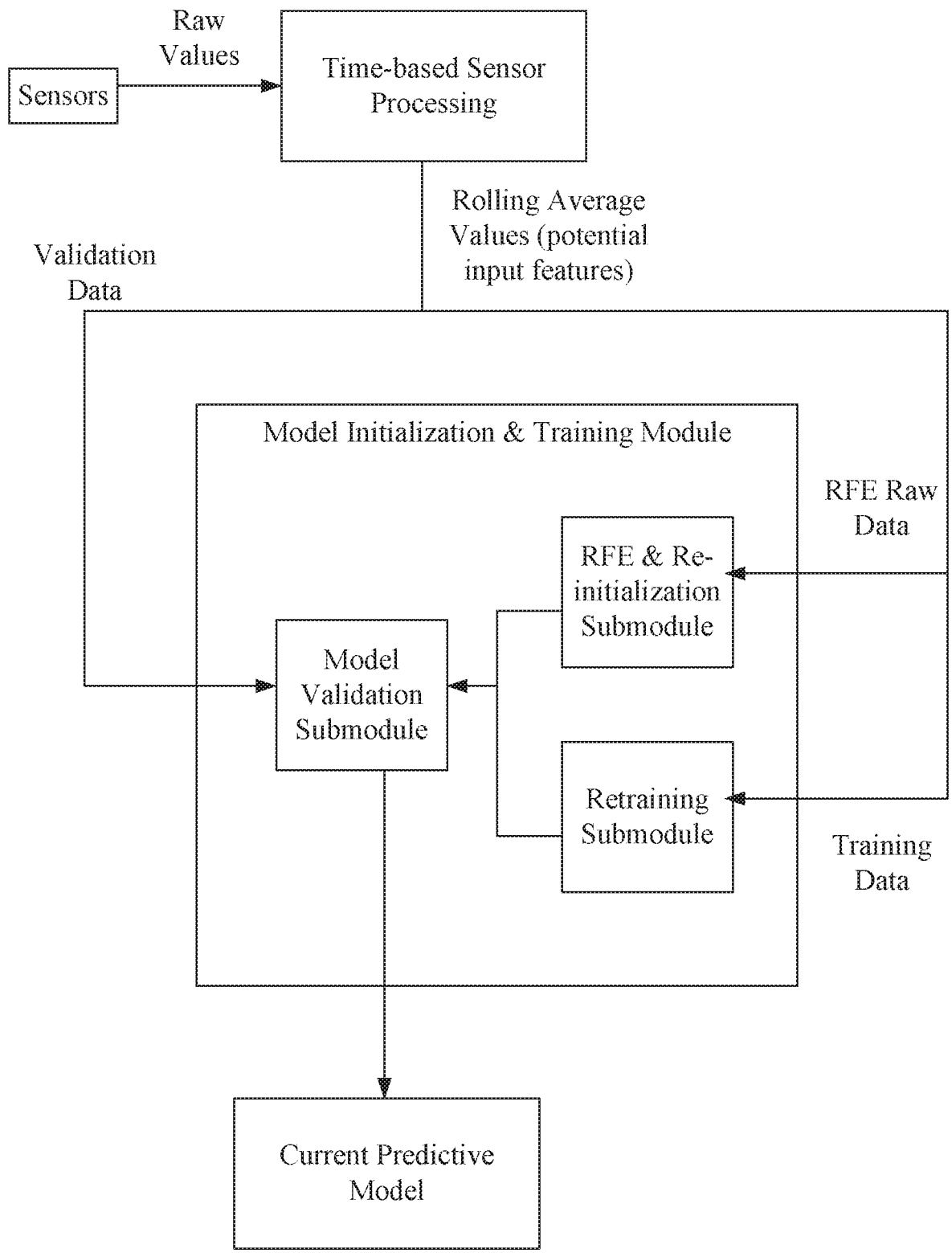
FIG. 31 represents an example of a model re-initializing and re-training architecture.

FIG. 31 represents an example of a re-training architecture.

Recursive Feature Elimination—Summary Points

▶ Refining the input feature set over time and by location can filter out extraneous input
  ▶ Spreading meaningful signal over less useful features impedes model convergence
  ▶ A machine learning submodule is embedded in a deep learning pipeline
  ▶ Feature importance can be quantified using linear kernel support vector regression (SVR)
  ▶ SVR model fitting focuses on the most difficult data points, known as 'support vectors'
  ▶ Features contributing less to the minimization of the loss function are recursively eliminated
  ▶ User input defines the number of features to be retained from the original (e.g., 200+ features)
  ▶ Model initialization can apply RFE to identify an optimal baseline feature set
▶ The optimal feature set is not static, varying by location and changing throughout the year
▶ The most performant model parameterization is unknown, and hand-tuning is impractical
▶ RFE can be leveraged to automate self-correcting feature selection
▶ Transfer Learning and RFE model re-initialization may be periodically pitted against one another
  ▶ Model performance is validated on the most recent historical data
  ▶ If Transfer Learning outperforms RFE re-initialization, features are retained and weights updated
  ▶ If RFE re-initialization outperforms Transfer Learning, the feature set self-corrects
▶ The prevailing conditions thus drive parameterization and model re-initialization It should be understood that control logic and other logic used to implement techniques described above can be implemented in the form of circuits, processors (including general purpose microprocessors, digital signal processors, application specific integrated circuits, programmable logic such as field-programmable gate arrays, etc.), computers, computer software, devices such as sensors, or combinations thereof. Based on the disclosure and teachings provided herein, a person of ordinary skill in the art will know and appreciate other ways and/or methods to implement the disclosed techniques using hardware and/or a combination of hardware and software.

Any of the software components or functions described in this application, may be implemented as code to be executed by a processor using any suitable computer language such as, for example, Java, C++ or Python using, for example, conventional or object-oriented techniques. The code may be stored as a series of instructions, or commands on a computer readable medium, such as a random-access memory (RAM), a read only memory (ROM), a programmable memory (EEPROM), a magnetic medium such as a hard-drive or a floppy disk, or an optical medium such as a CD-ROM. Any such computer readable medium may reside on or within a single computational apparatus, and may be present on or within different computational apparatuses within a system or network.

Further, although the present invention discloses use of particular types of recursive neural networks, use of other neural network architectures to make short and/or longer term predictions of environmental conditions, for example, but not limited to, recurrent multilayer perception (RMLP), gated recurrent unit (GRU), and temporal convolutional neural network (TCNN) architectures known to those skilled in the art.

Although the foregoing disclosed embodiments for controlling lighting received through a window or a building's interior have been described in the context of optically switchable windows such as electrochromic windows, one can appreciate how the methods described herein may be implemented on appropriate controllers to adjust a position of a window shade, a window drapery, a window blind, or any other device that may be adjusted to limit or block light from reaching a building's interior space. In some cases, methods described herein may be used to control both the tint of one or more optically switchable windows and the position of a window shading device. All such combinations are intended to fall within the scope of the present disclosure.

One or more features from any embodiment may be combined with one or more features of any other embodiment without departing from the scope of the disclosure. Further, modifications, additions, or omissions may be made to any embodiment without departing from the scope of the disclosure. The components and modules of any embodiment may be integrated or separated according to particular needs without departing from the scope of the disclosure.

Accordingly, although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A method for controlling at least one tintable window, the method comprising:
  receiving sensor readings from one or more sensors associated with a facility;
  providing the sensor readings to at least one machine learning model configured to determine a forecast of an environmental condition of the facility at a future time, wherein the environmental condition comprises a weather condition at a geographic location corresponding to the at least one tintable window, and wherein the future time is based at least in part on a duration of time for the at least one tintable window to transition to a determined tint state from a present time;

determining the tint state of the at least one tintable window of the facility based at least in part on the forecast of the environmental condition; and providing instructions to transition the at least one tintable window to the tint state determined.

2. The method of claim 1, wherein the environmental condition further comprises a sun position.

3. The method of claim 1, wherein the at least one machine learning model comprises a plurality of neural networks, and wherein the forecast of the environmental condition is based at least in part on a combination of outputs of the plurality of neural networks.

4. The method of claim 3, wherein the forecast of the environmental condition corresponds to a majority output of the plurality of neural networks.

5. An apparatus for controlling at least one tintable window, the apparatus comprising at least one controller configured to:
operatively couple to the at least one tintable window of a facility, one or more sensors of the facility, and at least one machine learning model;
receive, or direct receipt of, sensor readings from the one or more sensors;
provide, or direct provision of, the sensor readings to the at least one machine learning model configured to determine a forecast of an environmental condition of the facility at a future time, wherein the environmental condition comprises a weather condition at a geographic location corresponding to the at least one tintable window, and wherein the future time is based at least in part on a duration of time for the at least one tintable window to transition to a determined tint state from a present time;
determine, or direct determination of, the tint state of the at least one tintable window based at least in part on the forecast of the environmental condition; and
provide, or direct provision of, instructions to transition the at least one tintable window to the tint state determined.

6. The apparatus of claim 5, wherein the at least one tintable window comprises an electrochromic device.

7. The apparatus of claim 5, wherein the at least one tintable window comprises two or more tintable windows associated with a zone of the facility.

8. The apparatus of claim 5, wherein the one or more sensors comprise one or more photosensors and/or one or more infrared sensors.

9. The apparatus of claim 5, wherein the one or more sensors reside on a multi-sensor device.

10. The apparatus of claim 5, wherein the at least one controller is part of a hierarchical control system.

11. The apparatus of claim 10, wherein the hierarchical control system comprises at least three levels.

12. A system for controlling at least one tintable window, the system comprising:
a network configured to:
operatively couple to the at least one tintable window of a facility, one or more sensors of the facility, and at least one machine learning model;
transmit sensor readings from the one or more sensors;
transmit the sensor readings to the at least one machine learning model configured to determine a forecast of an environmental condition at the facility at a future time, wherein the environmental condition comprises a weather condition at a geographic location corresponding to the at least one tintable window, and wherein the future time is based at least in part on a duration of time for the at least one tintable window to transition to a determined tint state from a present time;
transmit a determination of the tint state of the at least one tintable window of the facility based at least in part on the forecast of the environmental condition; and
transmit instructions to transition the at least one tintable window to the tint state determined.

13. The system of claim 12, wherein the network is configured to transmit communication abiding by a control communication protocol for automatic control of a building.

14. The system of claim 12, wherein the network is configured to utilize a wireless communication protocol to receive and/or transmit signals.

15. The system of claim 14, wherein the wireless communication protocol comprises a communication protocol for radio frequency and/or infrared signal transmission.

16. The system of claim 12, wherein the network is configured for power transmittance, and is operatively coupled to a power source.

17. A non-transitory computer-readable program instructions for controlling tintable windows, the non-transitory computer-readable program instructions, when read by one or more processors, cause the one or more processors to execute operations comprising:
receiving, or directing receipt of, sensor readings from one or more sensors of a facility;
providing, or directing provision of, the sensor readings to at least one machine learning model configured to determine a forecast of an environmental condition of the facility at a future time, wherein the environmental condition comprises a weather condition at a geographic location corresponding to at least one tintable window, and wherein the future time is based at least in part on a duration of time for the at least one tintable window to transition to a determined tint state from a present time;
determining, or directing determination of, the tint state of the at least one tintable window of the facility based at least in part on the forecast of the environmental condition; and
providing, or directing provision of, instructions to transition the at least one tintable window to the tint state determined,
wherein the one or more processors are operatively coupled to (i) the at least one tintable window of the facility, (ii) the one or more sensors of the facility, and (iii) the at least one machine learning model.

18. The non-transitory computer-readable program instructions of claim 17, wherein providing the sensor readings to the at least one machine learning model comprises selecting an input feature set relevant to the facility at the future time, wherein the input feature set is used to initialize the machine learning model.

19. The non-transitory computer-readable program instructions of claim 18, wherein selecting the input feature set uses a support vector machine and/or a random forest technique.

20. The non-transitory computer-readable program instructions of claim 17, wherein the at least one machine learning model comprises a long short-term memory (LSTM) network and/or a dense neural network (DNN).

21. The non-transitory computer-readable program instructions of claim 20, wherein the LSTM network provides a forecast of the environmental condition over a shorter time frame than the DNN.

22. An apparatus for controlling at least one tintable window, the apparatus comprises:
- a multi sensor device of a facility comprising sensors disposed in a housing, which multi sensor device comprises sensors configured to an environment and output sensor measurements,
- the multi sensor device configured to operatively couple to a network configured to (i) communicate the sensor measurements to a machine learning model that determines a forecast of an environmental condition of the facility at a future time, wherein the environmental condition comprises a weather condition at a geographic location corresponding to the at least one tintable window, and wherein the future time is based at least in part on a duration of time for the at least one tintable window to transition to a determined tint state from a present time, and (ii) provide instructions to transition the at least one tintable window to the tint state determined based at least in part on the forecast of the environmental condition.

23. The apparatus of claim 22, wherein the tint state is selected from a group of discrete tint levels.

24. The apparatus of claim 23, wherein the group of discrete tint levels comprises four tint levels.

25. The apparatus of claim 22, wherein the sensors include a temperature sensor, humidity sensor, and/or radiant sensor.

26. The apparatus of claim 22, wherein the sensors include a photosensor, and/or infrared sensor.

27. The apparatus of claim 22, wherein the sensors include an environmental sensor.

28. The apparatus of claim 22, wherein the network facilitates environmental control of the facility that comprises control of a carbon dioxide level in the facility.

* * * * *